(12) United States Patent
Lambert et al.

(10) Patent No.: US 11,808,597 B2
(45) Date of Patent: Nov. 7, 2023

(54) SYSTEMS AND METHODS FOR USING A DIRECTIONAL INDICATOR ON A PERSONAL MOBILITY VEHICLE

(71) Applicant: Lyft, Inc., San Francisco, CA (US)

(72) Inventors: Michel Lambert, New York, NY (US); Roy Evans Williams, III, Englewood Cliffs, NJ (US); Mario Gomez-Hall, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 224 days.

(21) Appl. No.: 16/902,866

(22) Filed: Jun. 16, 2020

(65) Prior Publication Data

US 2020/0400457 A1  Dec. 24, 2020

Related U.S. Application Data

(63) Continuation-in-part of application No. 16/448,668, filed on Jun. 21, 2019, now Pat. No. 10,746,557, and a continuation of application No. 16/448,660, filed on Jun. 21, 2019, now Pat. No. 10,704,919.

(51) Int. Cl.
*G01C 21/36* (2006.01)

(52) U.S. Cl.
CPC ................ *G01C 21/3632* (2013.01)

(58) Field of Classification Search
CPC ............ G01C 21/3453; G01C 21/3423; G01C 21/3632; G01C 21/20; G01C 21/265
See application file for complete search history.

(56) References Cited

U.S. PATENT DOCUMENTS

| 5,146,231 A | 9/1992 | Ghaem |
| 6,076,041 A | 6/2000 | Watanabe |
| 6,195,609 B1 | 2/2001 | Pilley |
| 6,377,889 B1 | 4/2002 | Soest |

(Continued)

FOREIGN PATENT DOCUMENTS

| GB | 2538145 | 11/2016 |
| JP | 3820845 B2 * | 9/2006 |

(Continued)

OTHER PUBLICATIONS

Machine translation of the description of JP 3820845 B2, Sep. 13, 2006, pp. 1-3 (Year: 2006).*

(Continued)

*Primary Examiner* — Anne Marie Antonucci
*Assistant Examiner* — Jared C Bean
(74) *Attorney, Agent, or Firm* — Baker Botts L.L.P.

(57) ABSTRACT

The disclosed computer-implemented method may include receiving, by a computing device, directional information for a waypoint along a route of travel of a personal mobility vehicle, determining, by the computing device and based on the directional information, a bearing of the waypoint from a current location of the personal mobility vehicle, and displaying, by a display device included in the personal mobility vehicle and configured to display navigational information within an illumination pattern, an indication of the bearing within the illumination pattern for navigating the personal mobility vehicle along the route of travel to the waypoint. Various other methods, systems, and computer-readable media are also disclosed.

13 Claims, 27 Drawing Sheets

(56) References Cited

U.S. PATENT DOCUMENTS

| | | | |
|---|---|---|---|
| 9,193,442 | B1 | 11/2015 | Young |
| 9,194,715 | B2 | 11/2015 | Yang |
| 9,418,672 | B2 | 8/2016 | Pylappan et al. |
| 10,037,029 | B1 | 7/2018 | Russell |
| 2002/0040271 | A1 | 4/2002 | Park |
| 2004/0167714 | A1 | 8/2004 | Macphail |
| 2004/0243307 | A1 | 12/2004 | Geelen |
| 2005/0004723 | A1 | 1/2005 | Duggan |
| 2005/0049780 | A1 | 3/2005 | Friedrichs |
| 2005/0273252 | A1 | 12/2005 | Nix |
| 2006/0099959 | A1 | 5/2006 | Staton et al. |
| 2007/0078599 | A1 | 4/2007 | Yoshioka |
| 2007/0100545 | A1 | 5/2007 | Morita et al. |
| 2007/0168126 | A1 | 7/2007 | Wence |
| 2010/0250116 | A1 | 9/2010 | Yamaguchi |
| 2010/0256900 | A1 | 10/2010 | Yamaguchi et al. |
| 2011/0029234 | A1 | 2/2011 | Desai |
| 2011/0054783 | A1 | 3/2011 | Kishikawa et al. |
| 2011/0112760 | A1 | 5/2011 | Serbanescu et al. |
| 2011/0301837 | A1 | 12/2011 | Wellmann |
| 2012/0136566 | A1 | 5/2012 | Bamba |
| 2012/0150431 | A1 | 6/2012 | Ooka |
| 2012/0224060 | A1 | 9/2012 | Gurevich |
| 2014/0343843 | A1 | 11/2014 | Yanku |
| 2015/0025660 | A1 | 1/2015 | Prassler |
| 2015/0054760 | A1 | 2/2015 | Amaru |
| 2015/0198456 | A1 | 7/2015 | Ishikawa et al. |
| 2015/0260525 | A1 | 9/2015 | Parthasarathy |
| 2016/0258764 | A1 | 9/2016 | Phuyal |
| 2016/0290814 | A1 | 10/2016 | Heed et al. |
| 2016/0363665 | A1 | 12/2016 | Carlson |
| 2017/0082450 | A1* | 3/2017 | Alberola ................ B60K 35/00 |
| 2017/0154531 | A1 | 6/2017 | Funabashi |
| 2017/0316702 | A1 | 11/2017 | Pouillard et al. |
| 2018/0066957 | A1 | 3/2018 | Stroila et al. |
| 2018/0208199 | A1 | 7/2018 | Fujita et al. |
| 2020/0175429 | A1* | 6/2020 | Beaurepaire ........... G06Q 50/30 |

FOREIGN PATENT DOCUMENTS

| | | | |
|---|---|---|---|
| WO | WO 2012/097834 | 7/2012 | |
| WO | WO-2019166609 A1 * | 9/2019 | ............. B62J 50/20 |

OTHER PUBLICATIONS

Blubel Cycling Navigation device kickstarter campaign page; https://www.kickstarter.com/projects/372524908/blubel-the-cycling-navigator-powered-by-community; pp. 1-5 (Year: 2017).*

Bryanne Robinson, "Hands-Free Cycling Navigation Through Blubel", Oct. 4, 2016, 4 pages, retrieved from the Internet: <URL:https://popupcity.net/hands-free-cycling-navigation-through-blubel/.

Stuart Clarke, "Beeline navigation system could revolutionise how we cycle in cities (video)-", Cycling Weekly, Aug. 12, 2015, 9 pages, retrieved from the Internet: <URL:http://www.cyclingweekly.com/news/product-news/beeline-navigation-system-could-revolutionise-how-we-cycle-in-cities-video-186828>.

* cited by examiner

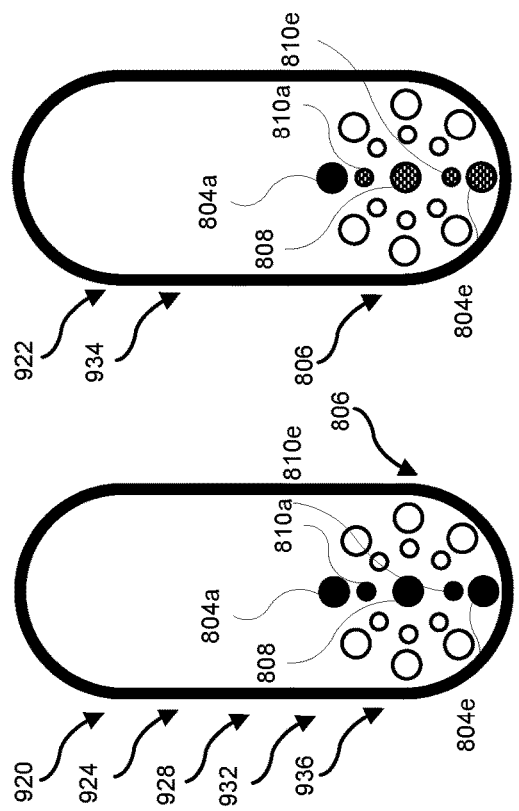
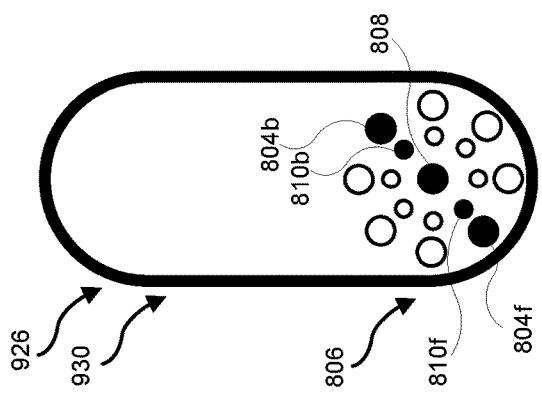
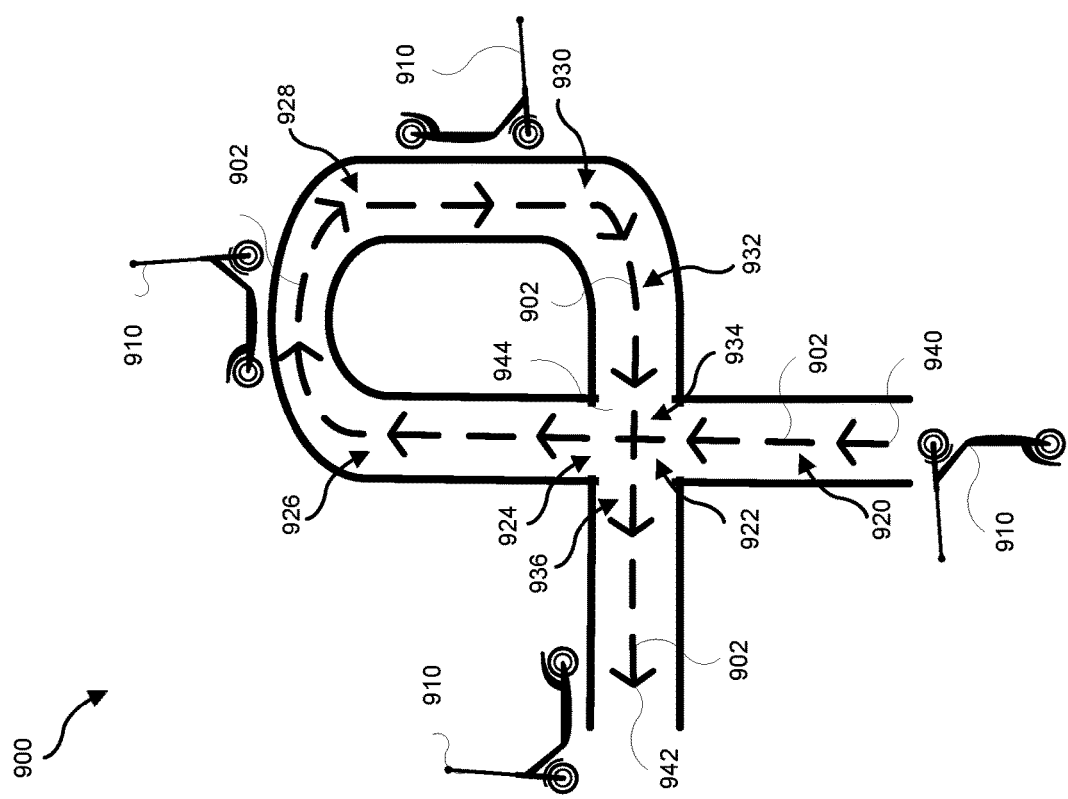

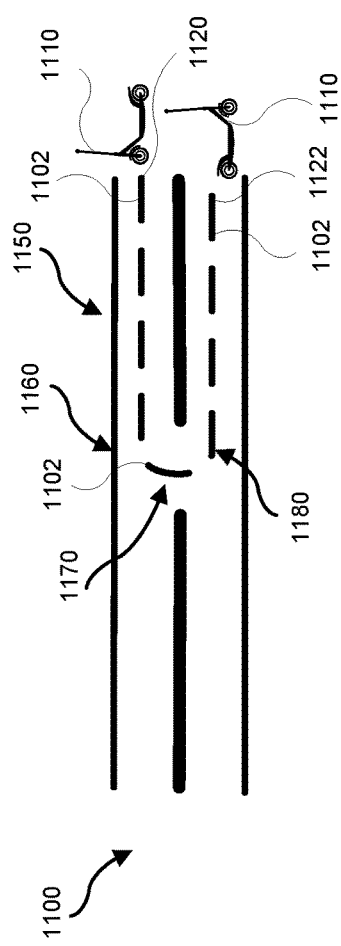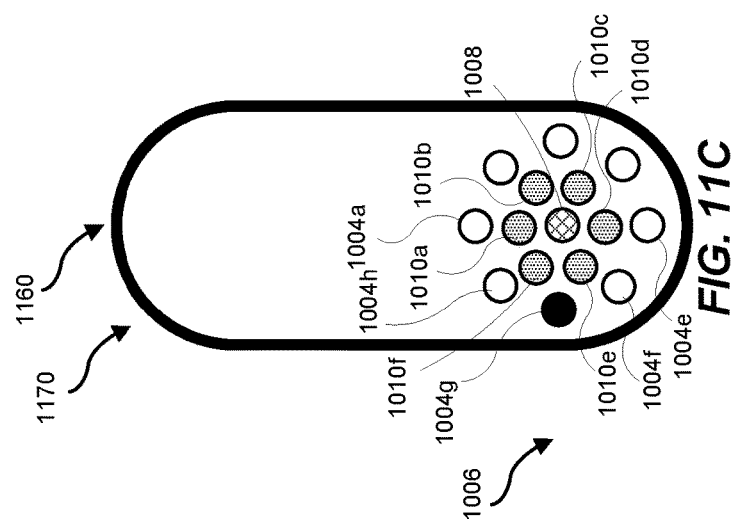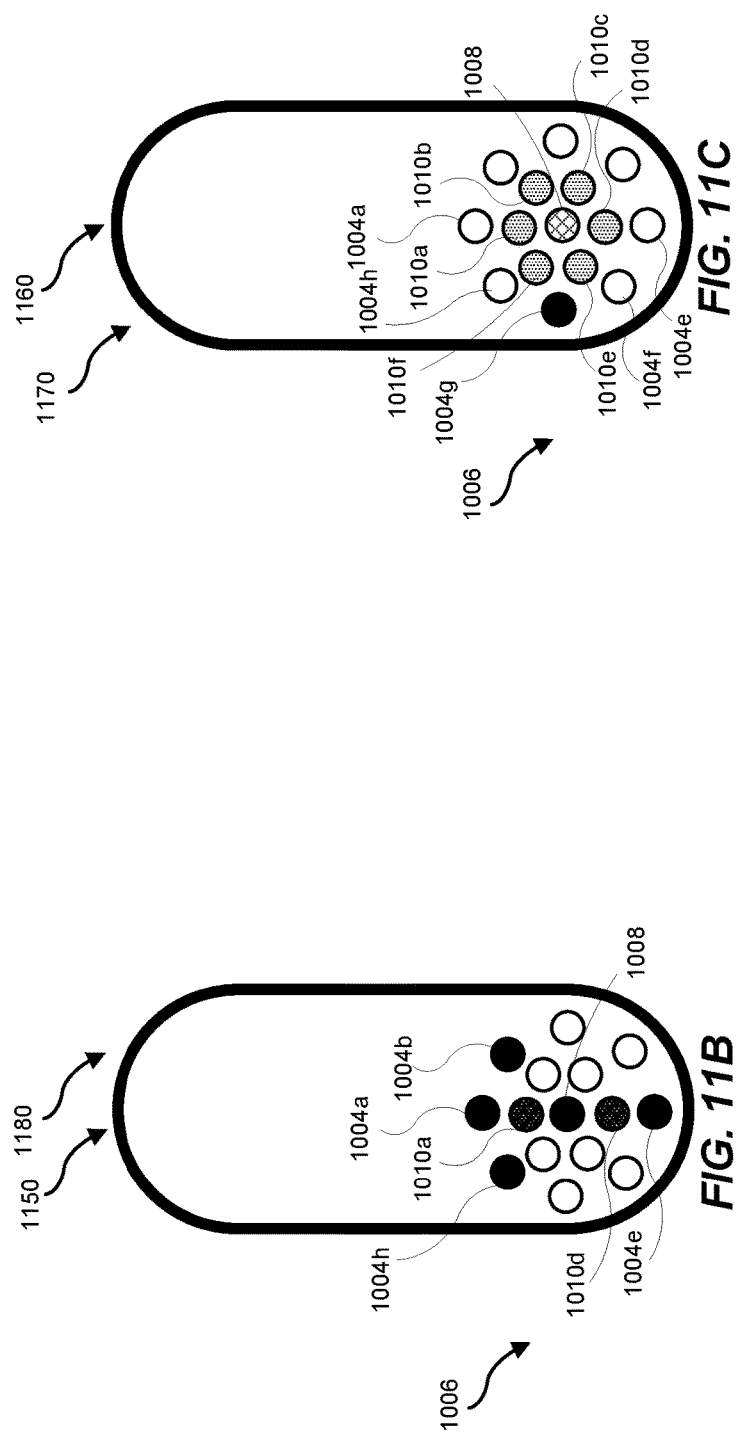

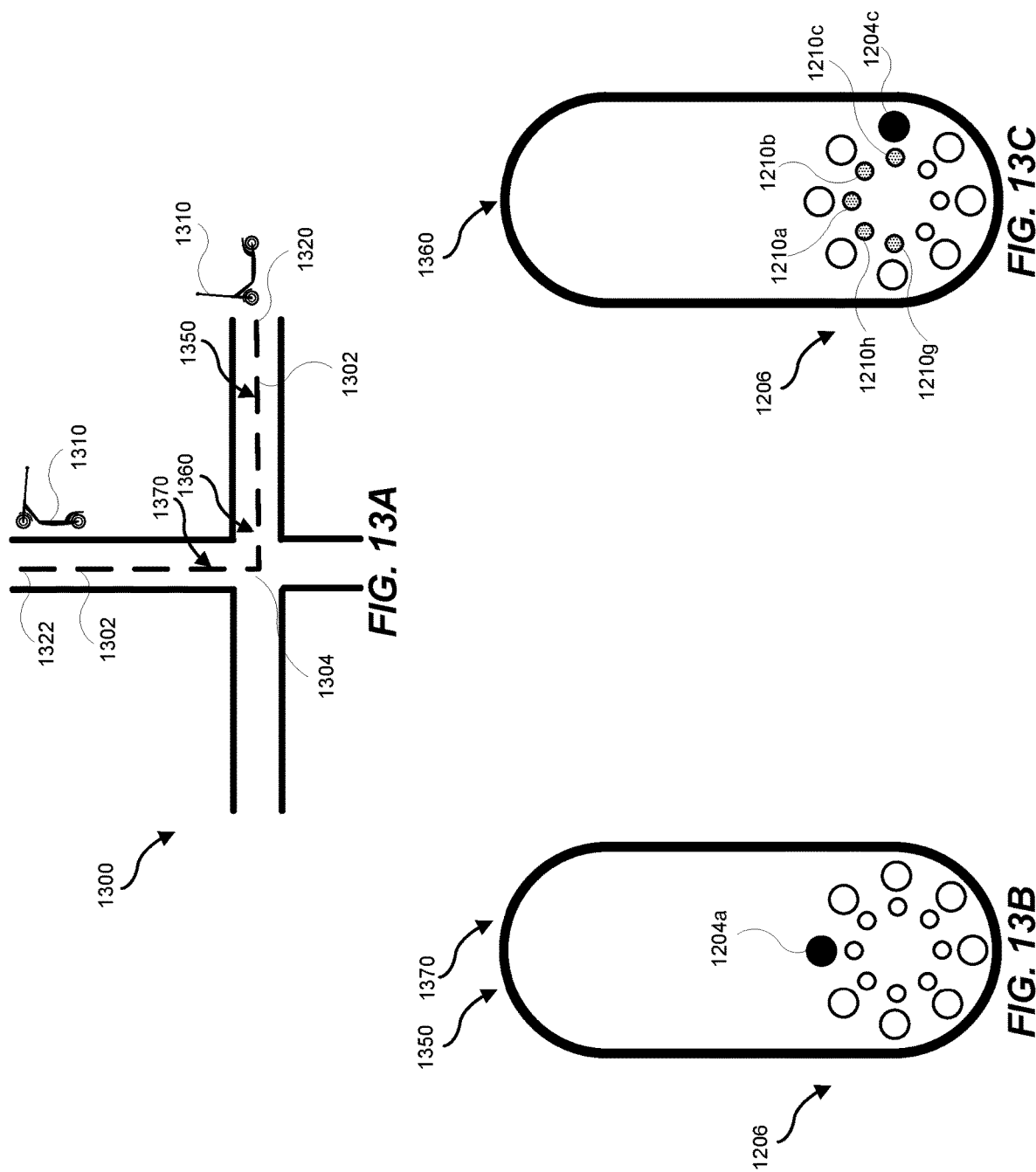

2400

```
┌─────────────────────────────────────────────┐
│ Receive, by a computing device, directional │
│ information for a waypoint along a route    │
│ of travel of a personal mobility vehicle.   │
│                                        2402 │
└─────────────────────────────────────────────┘
                      │
                      ▼
┌─────────────────────────────────────────────┐
│ Determine, by the computing device and      │
│ based on the directional information, a     │
│ bearing of the waypoint from a current      │
│ location of the personal mobility vehicle.  │
│                                        2404 │
└─────────────────────────────────────────────┘
                      │
                      ▼
┌─────────────────────────────────────────────┐
│ Display, by a display device included in    │
│ the personal mobility vehicle and           │
│ configured to display navigational          │
│ information within an illumination pattern, │
│ an indication of the bearing within the     │
│ illumination pattern for navigating the     │
│ personal mobility vehicle along the route   │
│ of travel to the waypoint.                  │
│                                        2406 │
└─────────────────────────────────────────────┘
```

*FIG. 24*

SYSTEMS AND METHODS FOR USING A DIRECTIONAL INDICATOR ON A PERSONAL MOBILITY VEHICLE

CROSS REFERENCED TO RELATED APPLICATIONS

This application is a continuation of U.S. patent application Ser. No. 16/448,660, filed on Jun. 21, 2019, and is a continuation-in-part of U.S. patent application Ser. No. 16/448,668, filed on Jun. 21, 2019, all of which are incorporated herein by reference in their entirety.

BACKGROUND

A dynamic transportation network that provides on-demand transportation to transportation requestors may include and use personal mobility vehicles for fulfilling transportation requests. A transportation requestor may meet up with a personal mobility vehicle (e.g., a scooter) and ride the personal mobility vehicle along a route from a starting location to an ending location (a destination). The transportation requestor may navigate the personal mobility vehicle along the route. In many cases, if the transportation requestor is unfamiliar with the route, navigating the personal mobility vehicle may be challenging. For example, the transportation requestor may need to stop travel on the personal mobility vehicle to determine if they are following the correct route to the destination. The transportation requestor may need to refer to a map or other type of navigation aide that may be included, for example, on a mobile device of the transportation requestor. A transportation requestor may need to stop and refer to the map multiple times during travel along the route. This may prove frustrating to the transportation requestor as well as increasing the travel time for the route.

SUMMARY

As will be described in greater detail below, the instant disclosure describes a directional indicator for a personal mobility vehicle that may include light emitting diodes (LEDs) that may be mounted on the personal mobility vehicle and configured in pattern (e.g., a ring or circle) that may be used to represent relative headings (e.g., relative directions or bearings) for use by a transportation requestor as the personal mobility vehicle travels along a route.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 9A is an illustration of an example fourth trip segment using a personal mobility vehicle for transport along a route in the fourth trip segment.

FIGS. 9B-D are illustrations of light-emitting devices in a fourth configuration providing directional information for travel along a route in the fourth trip segment.

FIG. 11A is an illustration of an example fifth trip segment using a personal mobility vehicle for transport along a route in the fifth trip segment.

FIGS. 11B-C are illustrations of light-emitting devices in a fifth configuration providing directional information for travel along a route in the fifth trip segment.

FIG. 13A is an illustration of an example sixth trip segment using a personal mobility vehicle for transport along a route in the sixth trip segment.

FIGS. 13B-C are illustrations of light-emitting devices in a sixth configuration providing directional information for travel along a route in the sixth trip segment.

FIG. 24 is a flow diagram of an exemplary computer-implemented method for using light-emitting devices included in a computing device mounted on a personal mobility vehicle as a directional indicator.

Figure 1:
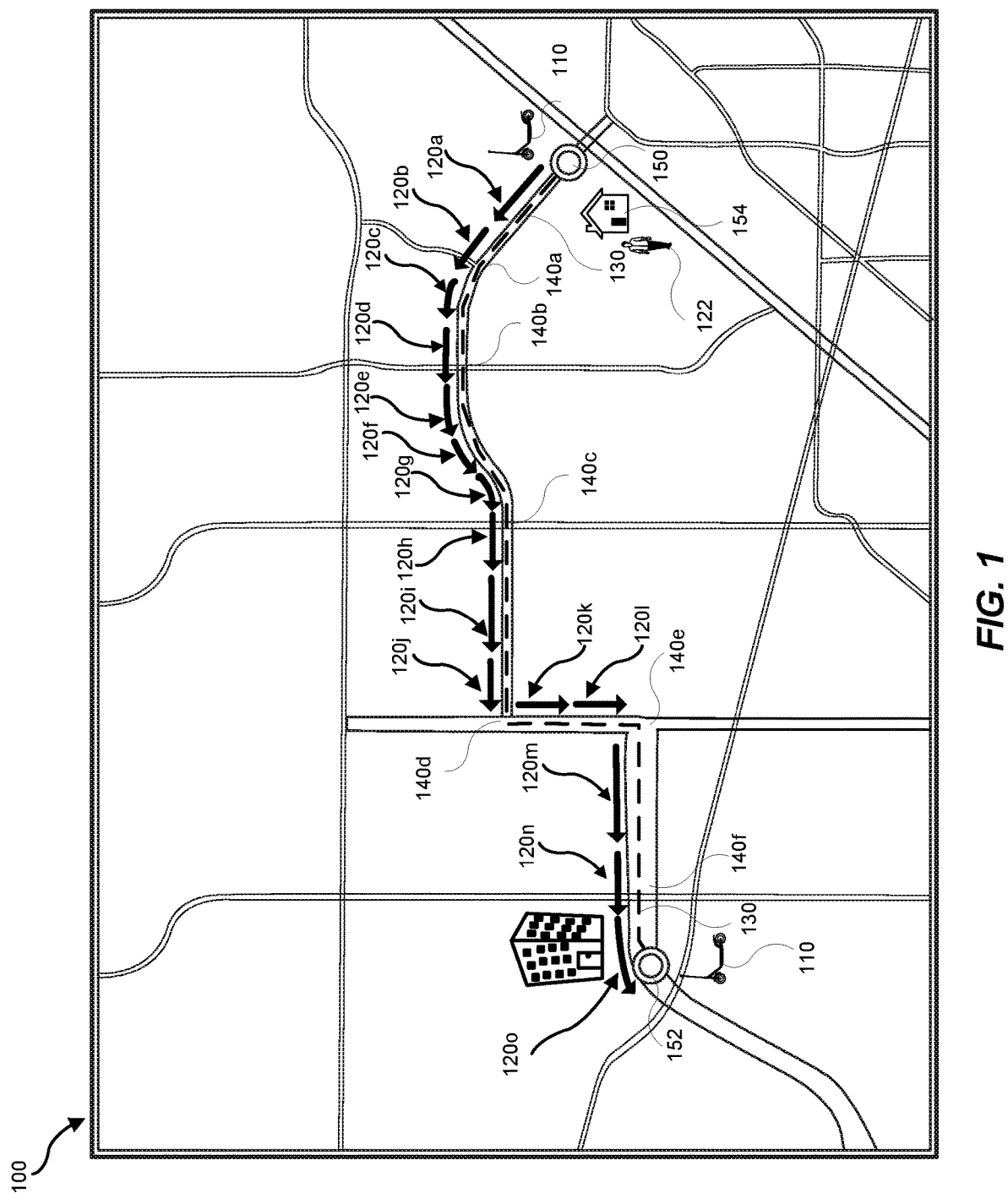
FIG. 1 is an illustration of an example trip using a personal mobility vehicle for transport from a starting location to an ending location.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to devices and methods for providing navigation information, for example for personal mobility vehicles such as scooters and bicycles, that can be quickly and reliably interpreted by a user. As will be explained in greater detail below, in some implementations, light-emitting devices may be mounted on a personal mobility vehicle (PMV). The light-emitting devices may be configured in a circular pattern (e.g., a ring of light-emitting diodes (LEDs), which may also be referred to herein as an LED ring). The light-emitting devices may be referred to as a display mounted on or coupled to the personal mobility vehicle. The light-emitting devices may be referred to as illumination devices included in a display device configured to display navigational information.

The ring of LEDs may be used to represent relative headings (e.g., relative directions or bearings). The LED ring may be used as a directional indicator for travel of the personal mobility vehicle along a route.

As a user of a personal mobility vehicle rides the personal mobility vehicle towards a destination, one or more portions of the LED ring may illuminate to provide navigation information to the user. In some implementations, a portion of the LED ring may illuminate to indicate the heading toward which the user should travel while riding the personal mobility vehicle. For example, an illuminated portion of the LED ring may indicate a bearing of an ultimate or an intermediate destination along a route of travel for the user riding the personal mobility vehicle. In some implementations, one or more portions of the LED ring may illuminate with various animations and/or colors. The various animations and/or colors may provide navigation directions or related indications to the user as the user rides the personal mobility vehicle towards the destination.

For example, the various animations and/or colors may provide a signal or indication for an upcoming turn. For example, the various animations and/or colors may provide a signal or indication for a possible U-turn. For example, the various animations and/or colors may provide a signal or indication for a do-not-ride zone (e.g., a zone where the user may not ride the personal mobility vehicle). For example, the various animations and/or colors may provide a signal or indication for a do-not-park zone (e.g., a zone where the user may not park the personal mobility vehicle).

In some implementations, the ring of LEDs may be implemented as a single circle (one circle) of LEDs (e.g., eight LEDs arranged in a single circle). The single circle of LEDs may provide a basic illumination pattern for relative headings. In some implementations, the ring of LEDs may be implemented as multiple circles of LEDs (two or more circles) that may include, for example, an outer circle of LEDs, an inner circle of LEDs, and a central or middle LED. The multiple circle of LEDs may provide more complex illumination patterns for the relative headings. The more complex illumination patterns may provide more detailed information to the user about the relative heading.

FIG. 1 is an illustration of an example trip 100 using a personal mobility vehicle for transport from a starting location 150 to an ending location 152 (which may also be referred to as a destination location or a destination). A requestor 122 (which also may be referred to herein as a transportation requestor) may request transportation using a personal mobility vehicle (e.g., personal mobility vehicle 110 (shown for example as a scooter)) from the starting location 150 to the ending location 152. In some implementations, the requestor 122 may travel to (e.g., walk to, be dropped off at, use other transportation to get to) the starting location 150 that includes at least one personal mobility vehicle that may be used by the requestor 122 for transport from the starting location 150 to the ending location 152. In some implementations, the starting location 150 that includes a personal mobility vehicle available for use by the requestor 122 may be located proximate to (e.g., within a short walking distance of) a current location of the requestor 122 (e.g., transportation requestor home 154). In some implementations, the starting location 150 that includes a personal mobility vehicle available for use by the requestor 122 may be located at a current location of the requestor 122.

A dynamic transportation matching system may match the requestor 122 to the personal mobility vehicle 110 for the trip 100 along a route 130. In some cases, the requestor 122 may use a computing device to locate, reserve, pay, and be matched with a personal mobility vehicle for travel from the starting location 150 to the ending location 152. The route 130 may include segments 120a-o.

A segment may have the personal mobility vehicle 110 continue along the same road or path the personal mobility vehicle 110 is currently traveling on (e.g., travel in a straight direction). A segment may have the personal mobility vehicle 110 make a turn from a road or path the personal mobility vehicle 110 may be currently traveling on to another road or path.

A segment may include a waypoint and an ingress or entry point. For example, the ingress point, and the waypoint may be reference points in physical space. A personal mobility vehicle may travel from the ingress point to the waypoint for the segment of the route. The segment may include multiple directions of possible travel, the waypoint identifying a destination location for the travel the personal mobility vehicle 110 along the segment from the ingress point to the waypoint.

A segment may have the personal mobility vehicle 110 continue traveling straight (and on the same road or path) through an intersection of one or more other roads or paths. As shown with reference to FIGS. 3A, 5A, and 7A, a segment may have a personal mobility vehicle (e.g., the personal mobility vehicle 110) proceed in a particular direction at a fork or multiple junction point in a route of travel. As shown with reference to FIG. 9A, a segment may have a personal mobility vehicle (e.g., the personal mobility vehicle 110) proceed in a particular direction through a traffic circle or ramp on a roadway (e.g., an entrance ramp, an exit ramp, an overpass, etc.). As shown with reference to FIG. 11A, a segment may have a personal mobility vehicle (e.g., the personal mobility vehicle 110) perform a U-turn. As shown with reference to FIG. 13A, a segment may have a personal mobility vehicle (e.g., the personal mobility vehicle 110) perform a right turn along a route of travel.

The requestor 122 may need directions to navigate the personal mobility vehicle 110 from the starting location 150 to the ending location 152 in order to travel along the route 130. Directions may be beneficial at each segment 120a-o as the personal mobility vehicle 110 travels along the route 130. In particular, directions may be beneficial as the personal mobility vehicle 110 travels towards and through intersections (e.g., intersections 140a-f) along the route 130. In some cases, the requestor 122 while riding the personal mobility vehicle 110 may need to stop and look at a map to determine a direction of travel through an intersection along the route 130. For example, the map may be displayed by a mapping application executing on a mobile device of the user. The mapping application may help the requestor 122 navigate along the route 130 from the starting location 150 to the ending location 152. Having to stop multiple times along the route 130 to safely and successfully navigate the personal mobility vehicle 110 from the starting location 150 to the ending location 152 may prove frustrating to the requestor 122. In addition, the stopping and starting of travel along the route 130 may increase a total travel time for the route 130.

As shown herein, a computing device mounted on (e.g., coupled to) a personal mobility vehicle may include light-emitting devices in a configuration that may provide directional information for a requestor as the requestor uses the personal mobility vehicle to travel along a route. For example, the requestor may glace at the light-emitting devices while using the personal mobility vehicle for travel along the route. The light-emitting devices may be configured such that illumination of certain devices may indicate a direction of travel (e.g., straight, slight right, right turn, slight left, left turn, U-turn, etc.). In some implementations, illumination of the light-emitting devices may include animation to more clearly indicate a direction (or in some cases an upcoming direction) of travel for the personal mobility vehicle along the route.

Figure 2:
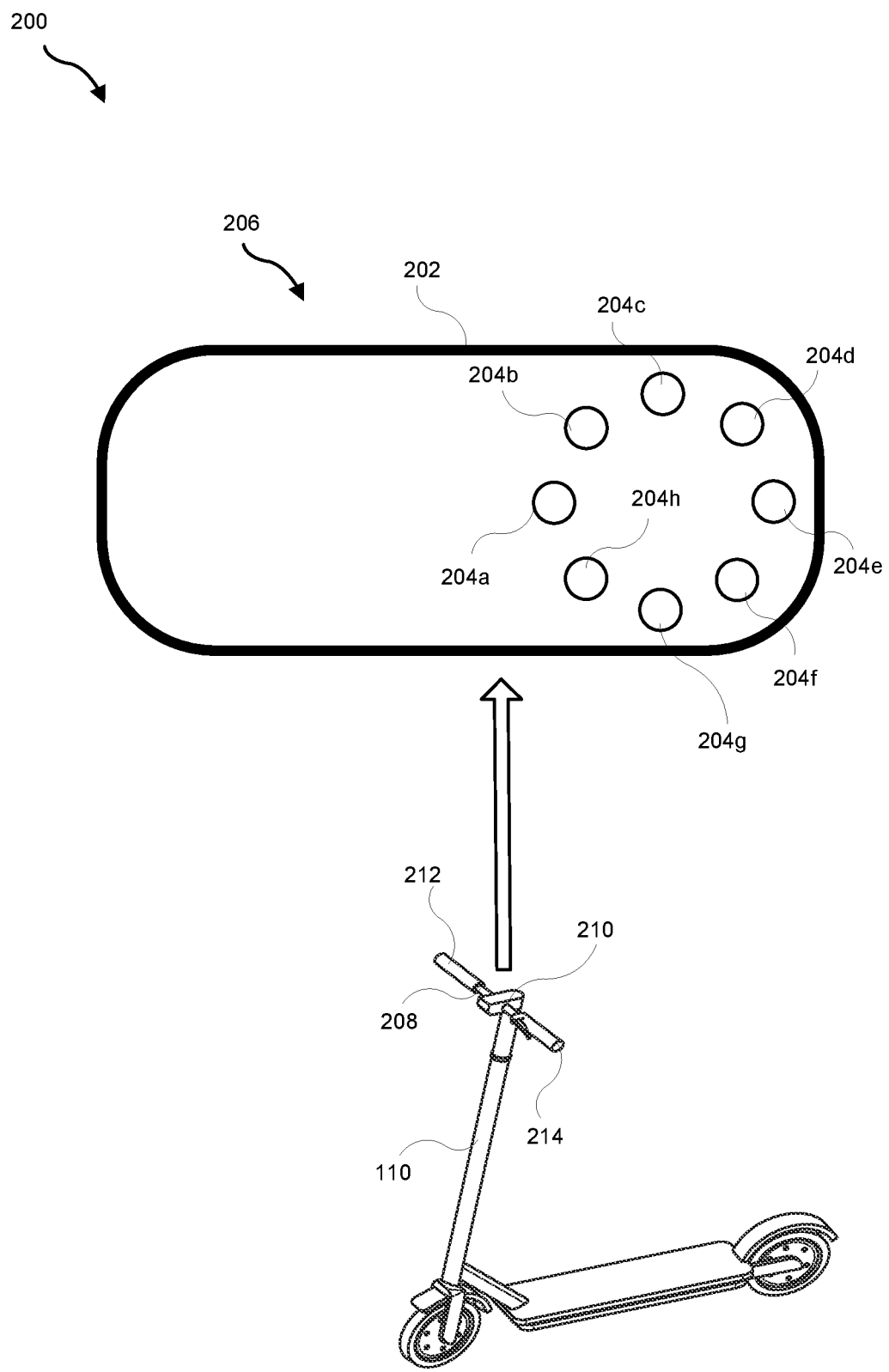
FIG. 2 is an illustration of an example computing device mounted on a scooter that includes light-emitting devices in a first configuration for use as a directional indicator.

FIG. 2 is an illustration of an example computing device 202 mounted on (e.g., coupled to) a personal mobility vehicle (e.g., the personal mobility vehicle 110) that includes light-emitting devices 204a-h in a first configuration (e.g., a ring or circle) for use as a directional indicator 206. The light-emitting devices 204a-h in the first configuration for use as a directional indicator 206 may also be referred to herein as a display that is mounted on or coupled to the personal mobility vehicle 110.

In a first implementation 200, shown in FIG. 2, eight light-emitting devices 204a-h form a ring or circle. In some implementations, more than eight light-emitting devices may form a ring or circle. In some implementations, less than eight light-emitting devices may form a ring or circle. In the first implementation 200, each of the light-emitting devices are the same size. In some implementations, each of the light-emitting devices may be of one or more different sizes. In some implementations, light-emitting devices may form another geometric shape that may include, but is not limited to, an oval, a square, or a rectangle.

In some implementations, a light-emitting device may be capable of emitting more than one color (e.g., two or more colors). For example, a light-emitting device may be a bicolor light-emitting diode (LED) capable of emitting two colors. For example, a light-emitting device may be a tricolor LED capable of emitting three colors (e.g., a Red-Green-Blue (RGB) LED). In some implementations, a light-emitting device may be capable of emitting a single color. For example, a light-emitting device may be a monochromatic LED (e.g., a red, green, blue, cyan, magenta, yellow, white or any color of the visible spectrum). In some implementations, the light-emitting devices may all be of the same type (e.g., the same size, and/or the same color). In some implementations, the light-emitting devices may include a combination of different types of light-emitting devices (e.g., different size light-emitting devices, different color light-emitting devices (e.g., one or more single color LEDs in combination with one or more multiple color LEDS (e.g., one or more bicolor LEDs, one or more tri-color LEDs)). In some implementations, each light-emitting device may bean LED of a different color (e.g., red, green, blue, or any color of the visible spectrum). For example, a light-emitting device may emit light waves, measured in nanometers (nm) from red (620 nm to 750 nm) to blue-violet (380 nm to 490 nm) and any other wavelengths in between (e.g., red, blue, yellow, green, etc.). A light-emitting device may emit white light that includes wavelengths from about 390 nm to 700 nm. For example, a light-emitting device may be a single-color white LED.

In the first implementation 200, shown in FIG. 2, the light-emitting devices 204a-h are shown as round or circular. In some implementations, one or more or each of the light-emitting devices may be of any shape including, but not limited to, circular, oval, square, rectangular, or triangular.

In the first implementation 200, the example computing device 202 may be mounted on (coupled to) the personal mobility vehicle 110 at a location where a rider may easily view and interpret the directional information provided by the light-emitting devices 204a-h (a bearing of the personal mobility vehicle 110 along a route of travel as described herein with reference to additional implementations included in, for example, FIG. 4, FIG. 6, FIG. 8, FIG. 10, and FIG. 12). Referring to FIG. 2, the computing device 202 may be mounted on a handlebar 208 between a first handle 212 and a second handle 214 (e.g., at a point 210 in the middle or center of the handlebar 208 and between the first handle 212 and the second handle 214).

Figure 3:
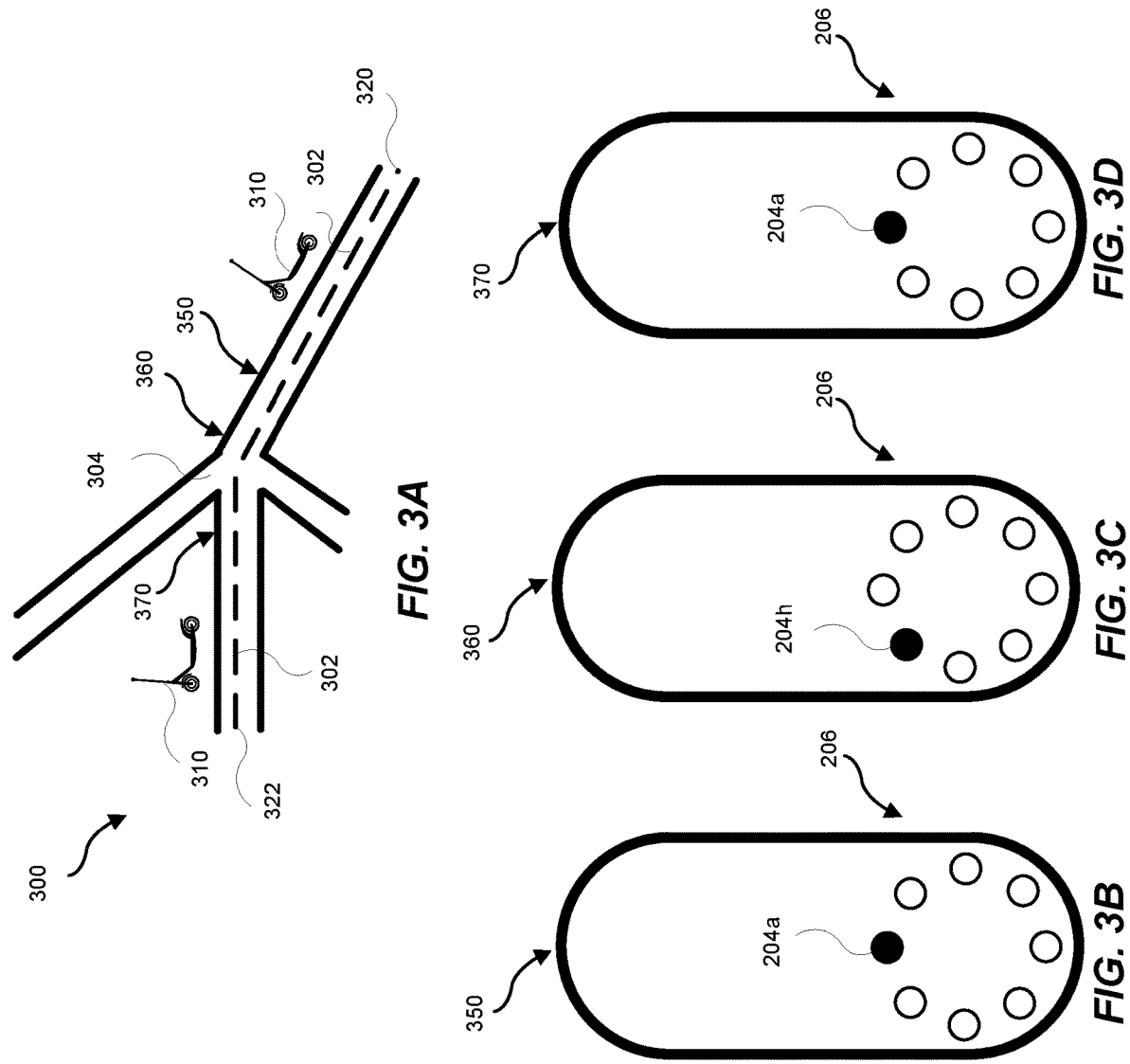
FIG. 3A is an illustration of an example first trip segment using a personal mobility vehicle for transport along a route in the first trip segment.
FIGS. 3B-D are illustrations of light-emitting devices in a first configuration for use as a directional indicator that provides directional information for travel along a route in the first trip segment.

FIG. 3A is an illustration of an example first trip segment 300 using a personal mobility vehicle 310 for transport along a route 302 in the first trip segment 300. The first trip segment 300 may include a three-way intersection 304 for navigation by the personal mobility vehicle 310 for travel along the route 302. The personal mobility vehicle 310 may travel from an ingress point 320 or entry point of the first trip segment 300 to a waypoint 322 of the first trip segment 300.

FIGS. 3B-D are illustrations of light-emitting devices 204a-h in the first configuration shown in FIG. 2 for use as the directional indicator 206, providing directional information for travel along the route 302 in the first trip segment 300 as shown in FIG. 3A.

FIG. 3B is an illustration of light-emitting devices 204a-h providing directional information for travel along the route 302 at a location 350 on the route 302. For example, also referring to FIG. 2, the light-emitting device 204a is illuminated (considered turned ON) while the light-emitting devices 204b-h are not illuminated (considered turned OFF). The directional indicator 206 may indicate forward or straight travel of the personal mobility vehicle 310 along the route 302 at the location 350.

FIG. 3C is an illustration of light-emitting devices 204a-h providing directional information for travel along the route 302 at a location 360 on the route 302. For example, also referring to FIG. 2, the light-emitting device 204h is illuminated (considered turned ON) while the light-emitting device 204a and light-emitting devices 204b-g are not illuminated (considered turned OFF). The directional indicator 206 may indicate travel of the personal mobility vehicle 310 along the route 302 at the location 360 may proceed slightly to the left, not indicating the making of a complete left turn. This directional information provided by the directional indicator 206 may direct a requestor to navigate the personal mobility vehicle 310 along the route 302.

FIG. 3D is an illustration of light-emitting devices 204a-h providing directional information for travel along the route 302 at a location 370 on the route 302. For example, also referring to FIG. 2, the light-emitting device 204a is illuminated (considered turned ON) while the light-emitting devices 204b-h are not illuminated (considered turned OFF). The directional indicator 206 may indicate forward or straight travel of the personal mobility vehicle 310 along the route 302 at the location 370.

In some implementations, a light-emitting device (e.g., the light-emitting device 204h) may be solidly illuminated when indicating a direction of travel for a personal mobility vehicle (e.g., the personal mobility vehicle 310). In some implementations, a light-emitting device may blink when indicating a direction of travel for a personal mobility vehicle where the blink rate may increase as the personal mobility vehicle approaches a change in a direction of travel. For example, referring to FIGS. 3A-D, as the personal mobility vehicle 310 approaches the three-way intersection 304, the directional indicator 206 may change from illuminating the light-emitting device 204a (as shown in FIG. 3B) to turning off the light-emitting device 204a (not illuminating the light-emitting device 204a) and turning on (Illuminating) and blinking the light-emitting device 204h (as shown in FIG. 3C). As the personal mobility vehicle 310 approaches the three-way intersection 304, the blinking rate for the light-emitting device 204h may increase and turn on solidly when the personal mobility vehicle 310 is at the point in the three-way intersection 304 where the personal mobility vehicle 310 needs to turn slightly left to continue travel along the route 302.

In some implementations, a light-emitting device (e.g., the light-emitting device 204h) may be a multi-color light-emitting device (e.g., a light-emitting device capable of providing red, yellow and green color illumination (e.g., a three-color LED)). The multi-color light-emitting device may be solidly illuminated at a certain color (e.g., green) when indicating a direction of travel for a personal mobility vehicle (e.g., the personal mobility vehicle 310). In some implementations, a multi-color light-emitting device may be illuminated at different colors when indicating a direction of travel for a personal mobility vehicle where the color may change as the personal mobility vehicle approaches a change in a direction of travel. For example, referring to FIGS. 3A-D, as the personal mobility vehicle 310 approaches the three-way intersection 304, the directional indicator 206 may change from illuminating the light-emitting device 204a (as shown in FIG. 3B) in a first color (e.g., green) to turning off the light-emitting device 204a (not illuminating the light-emitting device 204a) and turning on (Illuminating) the light-emitting device 204h in a second color (e.g., yellow) as the personal mobility vehicle 310 approaches the three-way intersection 304. The light-emitting device 204h may be illuminated at a third color (e.g., red) when the personal mobility vehicle 310 is at the point in the three-way intersection 304 where the personal mobility vehicle 310 needs to turn slightly left to continue travel along the route 302. Continuing along the route 302, the directional indicator 206 may change from illuminating the light-emitting device 204h in the third color (e.g., red) to turning off the light-emitting device 204h (not illuminating the light-emitting device 204h) and turning on (Illuminating) the light-emitting device 204a in the first color (e.g., green) (as shown in FIG. 3D).

Figure 4:
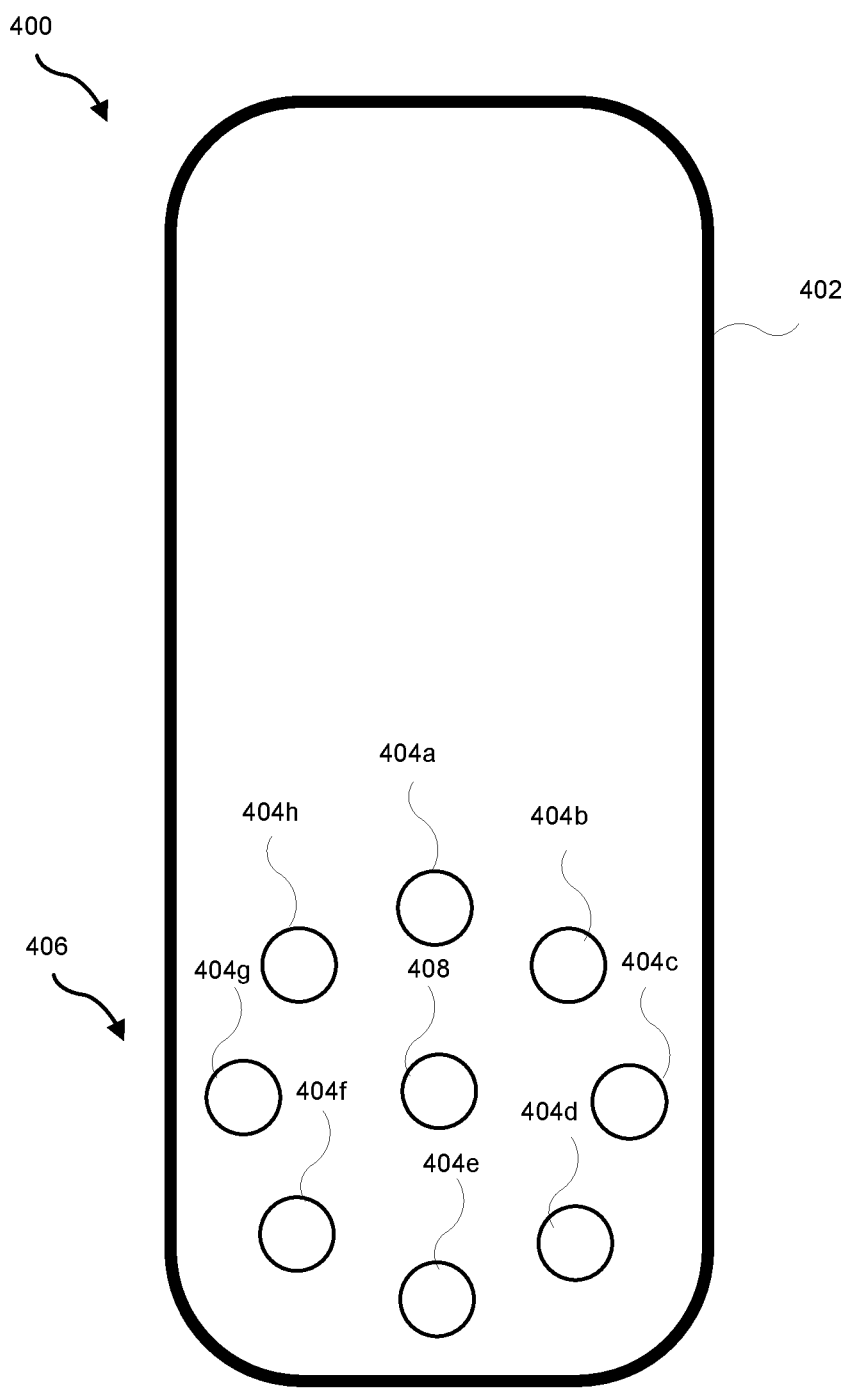
FIG. 4 is an illustration of an example computing device for mounting on a personal mobility vehicle that includes light-emitting devices in a second configuration for use as a directional indicator.

FIG. 4 is an illustration of an example computing device 402 for mounting on (coupling to) a personal mobility vehicle (e.g., the personal mobility vehicle 110) that includes light-emitting devices 404a-h and light-emitting device 408 in a second configuration for use as a directional indicator 406. The light-emitting devices 404a-h and the light-emitting device 408 in the second configuration for use as a directional indicator 406 may also be referred to herein as a display that is mounted on or coupled to the personal mobility vehicle 110.

In a second implementation 400, shown in FIG. 4, eight light-emitting devices 404a-h form a ring or circle with an additional light-emitting device 408 placed at the center of the ring or circle. In some implementations, more than eight light-emitting devices may form a ring or circle. In some implementations, less than eight light-emitting devices may form a ring or circle. In the second implementation 400, each of the light-emitting devices 404a-h and the light-emitting device 408 are the same size. In some implementations, each of the light-emitting devices 404a-h and light-emitting device 408 may be of one or more different sizes. For example, each of the light-emitting devices 404a-h may be of a first size and the light-emitting device 408 may be of a second size. In some implementations, the first size may be larger (greater) than the second size. In some implementations, the second size may be larger (greater) than the first size.

In some implementations, light-emitting devices may form another geometric shape that may include, but is not limited to, an oval, a square, or a rectangle. In some implementations, one or more or each of the light-emitting devices 404a-h and the light-emitting device 408 may be of any shape including, but not limited to, circular, oval, square, rectangular, or triangular. For example, each of the light-emitting devices 404a-h may be of a first shape and the light-emitting device 408 may be of a second shape different from the first shape.

The light-emitting devices 404a-h and the light-emitting device 408 may be of the sizes and types as described for the light-emitting devices 204a-h as shown in FIG. 2. For example, the light-emitting devices 404a-h and the light-emitting device 408 may be capable of emitting (configured to emit) monochromatic, bicolor, tricolor, multicolor, or white light. The light-emitting devices 404a-h and the light-emitting device 408 may be a combination of shapes, sizes, and colors. For example, each of the light-emitting devices 404a-h may be of a first color or type and the light-emitting device 408 may be of a second color or type different from the first color or type.

Figure 5:
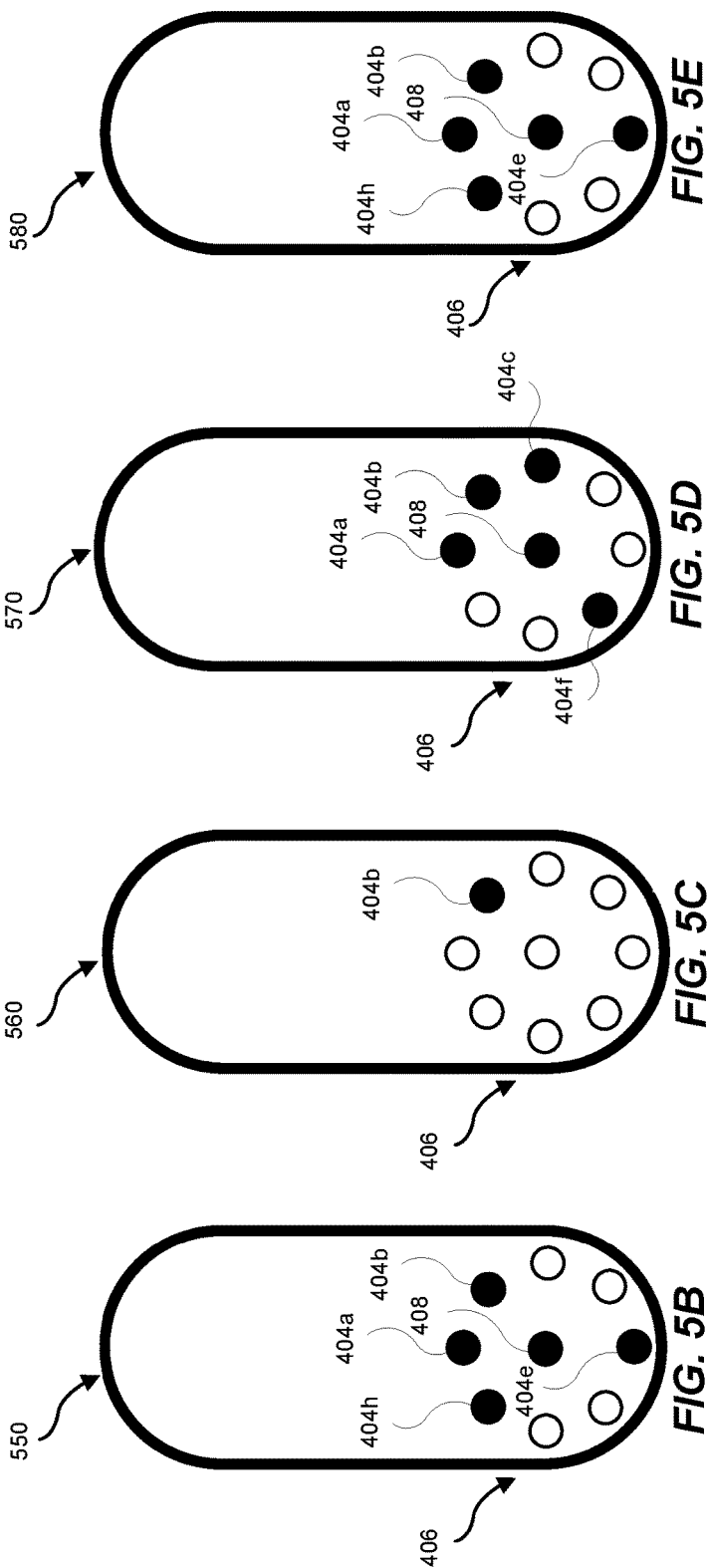
FIG. 5A is an illustration of an example second trip segment using a personal mobility vehicle for transport along a route in the second trip segment.
FIGS. 5B-E are illustrations of the light-emitting devices in a second configuration for use as a directional indicator that provides directional information for travel along the route 502 in the second trip segment.

FIG. 5A is an illustration of an example second trip segment 500 using a personal mobility vehicle 510 for transport along a route 502 in the second trip segment 500. The second trip segment 500 may include a three-way intersection 504 for navigation by the personal mobility vehicle 510 for travel along the route 502. The personal mobility vehicle 510 may travel from an ingress point 520 or entry point of the second trip segment 500 to a waypoint 522 of the second trip segment 500.

FIGS. 5B-E are illustrations of the light-emitting devices 404a-h and the light-emitting device 408 in the second configuration shown in FIG. 4 for use as the directional indicator 406, providing directional information for travel along the route 502 in the second trip segment 500 as shown in FIG. 5A.

FIG. 5B is an illustration of the light-emitting devices 404a-h and the light-emitting device 408 providing directional information for travel along the route 502 at a location 550 on the route 502. For example, also referring to FIG. 4, the light-emitting devices 404h, 404a, 404b, 404e, and 408 are illuminated (considered turned ON) while the light-emitting devices 404c, 404d, 404f, and 404g are not illuminated (considered turned OFF). The illuminated light-emitting devices 404h, 404a, 404b, 404e, and 408 may be perceived as forming an arrow showing a direction of travel. The directional indicator 406 as shown in FIG. 5B may indicate forward or straight travel of the personal mobility vehicle 510 along the route 502 at the location 550 as the arrow formed by the illumination of light-emitting devices 404h, 404a, 404b, 404e, and 408 points in a forward direction.

FIG. 5C is an illustration of the light-emitting devices 404a-h and the light-emitting device 408 providing directional information for travel along the route 502 at a location 560 on the route 502. For example, also referring to FIG. 4, the light-emitting device 404b is illuminated (considered turned ON) while the light-emitting device 404a and the light-emitting devices 404b-h and the light-emitting device 408 are not illuminated (considered turned OFF). The directional indicator 406 may indicate that travel of the personal mobility vehicle 310 along the route 502 at the location 560 may need to soon proceed slightly to the left. In some implementations, the light-emitting device 404b may blink at a rate that increases as the personal mobility vehicle 510 approaches the three-way intersection 504. In some implementations, the light-emitting device 404b may be a multi-color light-emitting device that may change color as the personal mobility vehicle approaches (gets closer to) the three-way intersection 504.

FIG. 5D is an illustration of the light-emitting devices 404a-h and the light-emitting device 408 providing directional information for travel along the route 502 at a location 570 on the route 502. For example, also referring to FIG. 4, the light-emitting devices 404a-c, 404f, and 408 are illuminated (considered turned ON) while the light-emitting devices 404d, 404e, 404g, and 404h are not illuminated (considered turned OFF). The illuminated light-emitting devices 404a-c, 404f, and 408 may be perceived as forming an arrow showing a direction of travel. The directional indicator 406 as shown in FIG. 5D may indicate travel of the personal mobility vehicle 510 along the route 502 at the location 570 that proceeds slightly to the right, not making a complete right turn. This directional information provided by the directional indicator 406 may direct a requestor to navigate the personal mobility vehicle 510 along the route 502.

FIG. 5E is an illustration of the light-emitting devices 404a-h and the light-emitting device 408 providing directional information for travel along the route 502 at a location 580 on the route 502. For example, also referring to FIG. 4, the light-emitting devices 404h, 404a, 404b, 404e, and 408 are illuminated (considered turned ON) while the light-emitting devices 404c, 404d, 404f, and 404g are not illuminated (considered turned OFF). The illuminated light-emitting devices 404h, 404a, 404b, 404e, and 408 may be perceived as forming an arrow showing a direction of travel. The directional indicator 406 as shown in FIG. 5E may indicate forward or straight travel of the personal mobility vehicle 510 along the route 502 at the location 580 as the arrow formed by the illumination of light-emitting devices 404h, 404a, 404b, 404e, and 408 points in a forward direction.

In some implementations, the light-emitting devices 404a-h may operate in a manner similar to the light-emitting devices 204a-h as shown in FIGS. 2 and 3B-D. In these implementations, the light-emitting device 408 may be used to supplement the directional information provided by the directional indicator 406. For example, the light-emitting device 408 may blink at different rates as a user approaches an intersection (e.g., turns on and blinks faster as a personal mobility vehicle approaches an intersection, turns off and stops blinking as a personal mobility vehicle passes through the intersection). In another example, the light-emitting device 408 may be capable of being illuminated at a color different than the color of the light-emitting devices 404a-h. The light-emitting device 408 may be illuminated in a one color when the personal mobility vehicle reaches an intersection. The light-emitting device 408 may be illuminated in another color when the personal mobility vehicle reaches a destination location.

Figure 6:
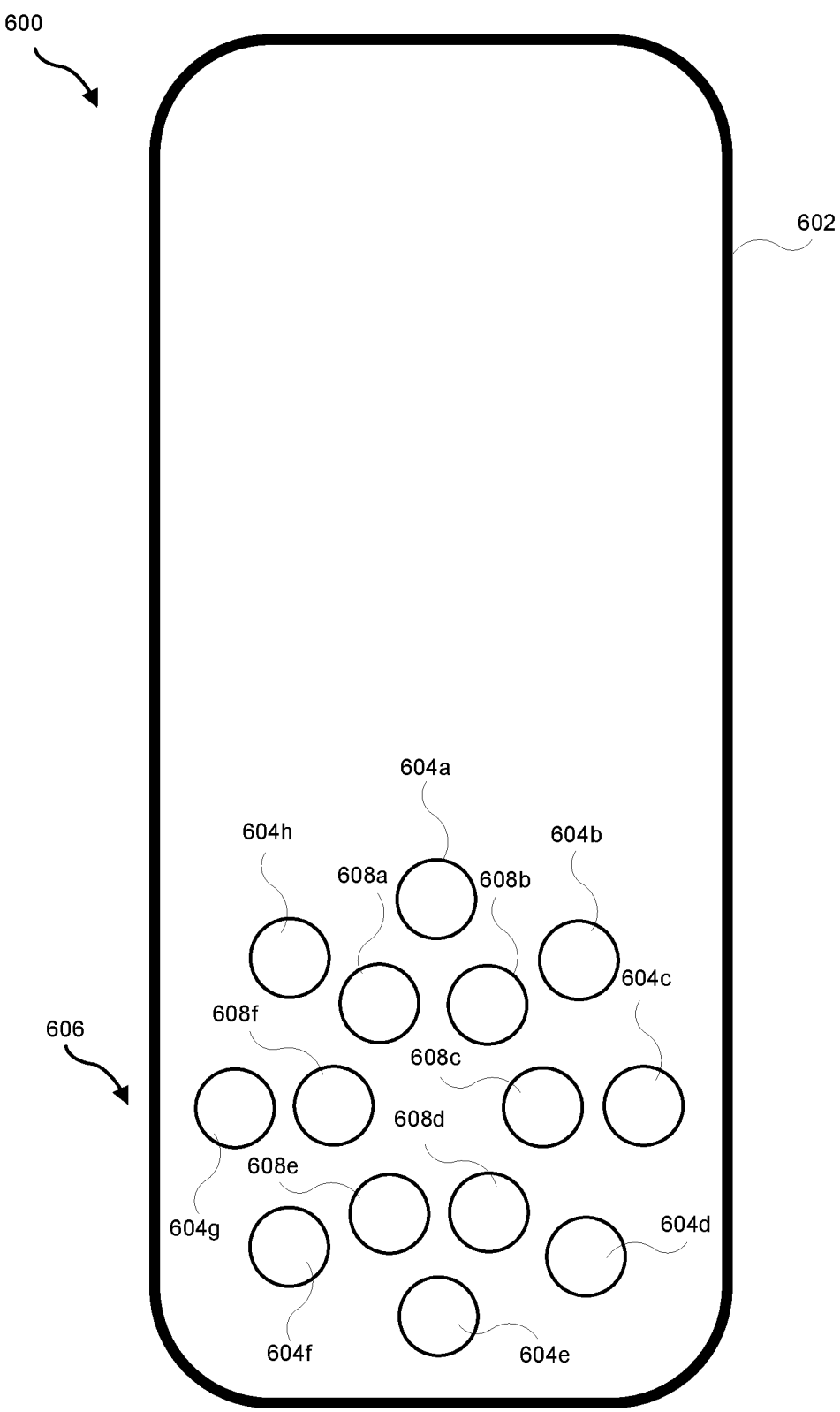
FIG. 6 is an illustration of an example computing device for mounting on a personal mobility vehicle that includes light-emitting devices in a third configuration for use as a directional indicator.

FIG. 6 is an illustration of an example computing device 602 for mounting on (coupling to) a personal mobility vehicle (e.g., the personal mobility vehicle 110) that includes first light-emitting devices 604*a-h* and second light-emitting devices 608*a-f* in a third configuration for use as a directional indicator 606. The first light-emitting devices 604*a-h* and the second light-emitting devices 608*a-f* in the third configuration for use as a directional indicator 606 may also be referred to herein as a display that is mounted on or coupled to the personal mobility vehicle 110.

In a third implementation 600, shown in FIG. 6, eight light-emitting devices 604*a-h* form an outer ring or circle with six light-emitting devices 608*a-f* forming an inner ring or circle inside the outer ring or circle formed by the light-emitting devices 604*a-h*. In some implementations, more than eight light-emitting devices may form an outer ring or circle. In some implementations, less than eight light-emitting devices may form an outer ring or circle. In some implementations, more than six light-emitting devices may form an inner ring or circle. In some implementations, less than six light-emitting devices may form an inner ring or circle.

In the third implementation 600, each of the light-emitting devices 604*a-h* and each of the light-emitting devices 608*a-f* are the same size. In some implementations, each of the light-emitting devices 604*a-h* and each of the light-emitting devices 608*a-f* may be of one or more different sizes. For example, each of the light-emitting devices 604*a-h* may be of a first size and each of the light-emitting devices 608*a-f* may be of a second size. In some implementations, the first size may be larger (greater) than the second size. In some implementations, the second size may be larger (greater) than the first size.

In some implementations, light-emitting devices may form another geometric shape that may include, but is not limited to, an oval, a square, or a rectangle. In some implementations, one or more or each of the light-emitting devices 604*a-h* and one or more or each of the light-emitting devices 608*a-f* may be of any shape including, but not limited to, circular, oval, square, rectangular, or triangular. For example, each of the light-emitting devices 604*a-h* may be of a first shape and each of the light-emitting devices 608*a-f* may be of a second shape different from the first shape.

The light-emitting devices 604*a-h* and the light-emitting devices 608*a-f* may be of the sizes and types as described for the light-emitting devices 204*a-h* as shown in FIG. 2, and for the light-emitting devices 404*a-h* and the light-emitting device 408 as shown in FIG. 4. For example, the light-emitting devices 604*a-h* and the light-emitting devices 608*a-f* may be capable of emitting (configured to emit) monochromatic, bicolor, tricolor, multicolor, or white light. The light-emitting devices 604*a-h* and the light-emitting devices 608*a-f* may be a combination of shapes, sizes, and colors. For example, each of the light-emitting devices 604*a-h* may be of a first color or type and each of the light-emitting devices 608*a-f* may be of a second color or type different from the first color or type.

Figure 7:
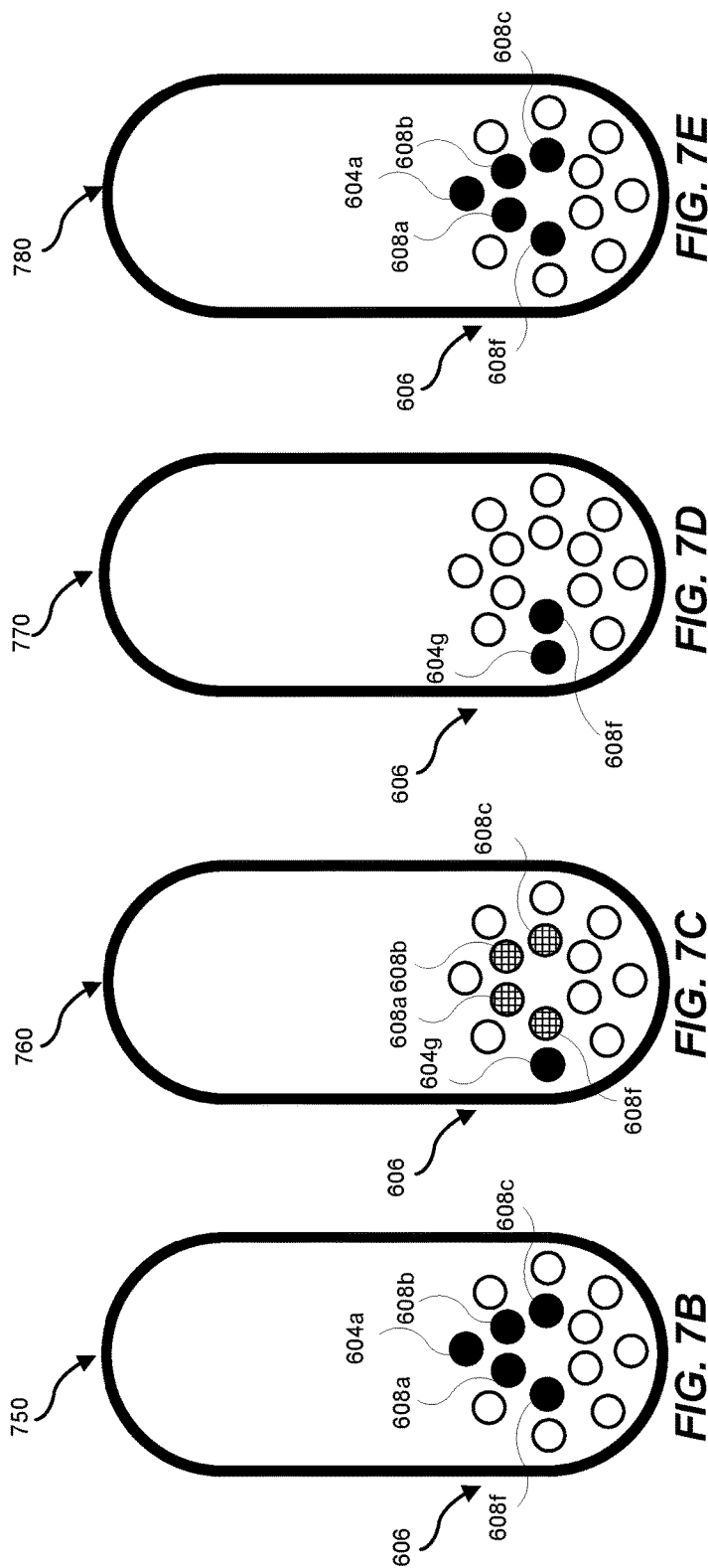
FIG. 7A is an illustration of an example third trip segment using a personal mobility vehicle for transport along a route in the third trip segment.
FIGS. 7B-E are illustrations of light-emitting devices in a third configuration providing directional information for travel along a route in the third trip segment.

FIG. 7A is an illustration of an example third trip segment 700 using a personal mobility vehicle 710 for transport along a route 702 in the third trip segment 700. The third trip segment 700 may include a three-way intersection 704 for navigation by the personal mobility vehicle 710 for travel along the route 702. The personal mobility vehicle 710 may travel from an ingress point 720 or entry point of the third trip segment 700 to a waypoint 722 of the third trip segment 700.

FIGS. 7B-E are illustrations of the first light-emitting devices 604*a-h* and the second light-emitting devices 608*a-f* in the third configuration for use as the directional indicator 606, providing directional information for travel along the route 702 in the third trip segment 700 as shown in FIG. 7A.

FIG. 7B is an illustration of the first light-emitting devices 604*a-h* and the of light-emitting devices 608*a-f* providing directional information for travel along the route 702 at a location 750 on the route 702. For example, also referring to FIG. 6, the light-emitting devices 604*a*, 608*a-c*, and 608*f* are illuminated (considered turned ON) while the light-emitting devices 604*b-h*, and the light-emitting devices 608*d-e* are not illuminated (considered turned OFF). The illuminated light-emitting devices 604*a*, 608*a-c*, and 608*f* may be perceived as forming an arrow showing a direction of travel. The directional indicator 606 as shown in FIG. 7B may indicate forward or straight travel of the personal mobility vehicle 710 along the route 702 at the location 750 as the arrow formed by the illumination of light-emitting devices 604*a*, 608*a-c*, and 608*f* points in a forward direction.

FIG. 7C is an illustration of the first light-emitting devices 604*a-h* and the second light-emitting devices 608*a-f* providing directional information for travel along the route 702 at a location 760 on the route 702. For example, also referring to FIG. 6, the light-emitting device 604*h* is illuminated (considered turned ON) while the light-emitting devices 604*a-f*, the light-emitting device 606*h*, and the light-emitting devices 608*d-e* are not illuminated (considered turned OFF). In this implementation, the turning on (illuminating of) the light-emitting devices 608*a-c* and light-emitting device 606*f* may be animated to indicate an upcoming right turn in conjunction with the constant illumination of the light-emitting device 604*g*. For example, the light-emitting device 608*c* may be illuminated, then the light-emitting device 608*b* may be illuminated, then the light-emitting device 608*a* may be illuminated, and then the light-emitting device 608*f* may be illuminated followed by the simultaneous turning off (not illuminating) of the light-emitting devices 608*a-c* and the light-emitting device 608*f* at the same time. This illumination sequence may be repeated until the personal mobility vehicle 710 reaches the location 770.

FIG. 7D is an illustration of the first light-emitting devices 604*a-h* and the second light-emitting devices 608*a-f* providing directional information for travel along the route 702 at a location 770 on the route 702. For example, also referring to FIG. 6, the light-emitting device 604*g* and the light-emitting device 608*f* are illuminated (considered turned ON) while the light-emitting devices 604*a-f*, the light-emitting device 604*h*, and the light-emitting devices 608*a-e* are not illuminated (considered turned OFF). The directional indicator 606 as shown in FIG. 7D may indicate that the personal mobility vehicle 710 should make a left hand turn along the route 702 at the location 770. This directional information provided by the directional indicator 606 may direct a requestor to navigate the personal mobility vehicle 710 along the route 702.

FIG. 7E is an illustration of the first light-emitting devices 604*a-h* and the second light-emitting devices 608*a-f* providing directional information for travel along the route 702 at a location 780 on the route 702. For example, also referring to FIG. 6, the light-emitting devices 604*a*, 608*a-c*, and 608*f* are illuminated (considered turned ON) while the light-emitting devices 604*b-h*, and the light-emitting devices 608*d-e* are not illuminated (considered turned OFF). The illuminated light-emitting devices 604*a*, 608*a-c*, and 608*f* may be perceived as forming an arrow showing a direction of travel. The directional indicator 606 as shown in FIG. 7E may indicate forward or straight travel of the personal mobility vehicle 710 along the route 702 at the location 780 as the arrow formed by the illumination of light-emitting devices 604a, 608a-c, and 608f points in a forward direction.

In some implementations, the light-emitting devices 604a-h and/or the light-emitting devices 608a-f may operate in a manner similar to the light-emitting devices 204a-h as shown in FIGS. 2 and 3B-D and in a manner similar to the light-emitting devices 404a-h and the light-emitting device 408 as shown in FIGS. 4 and 5B-E.

Figure 8:
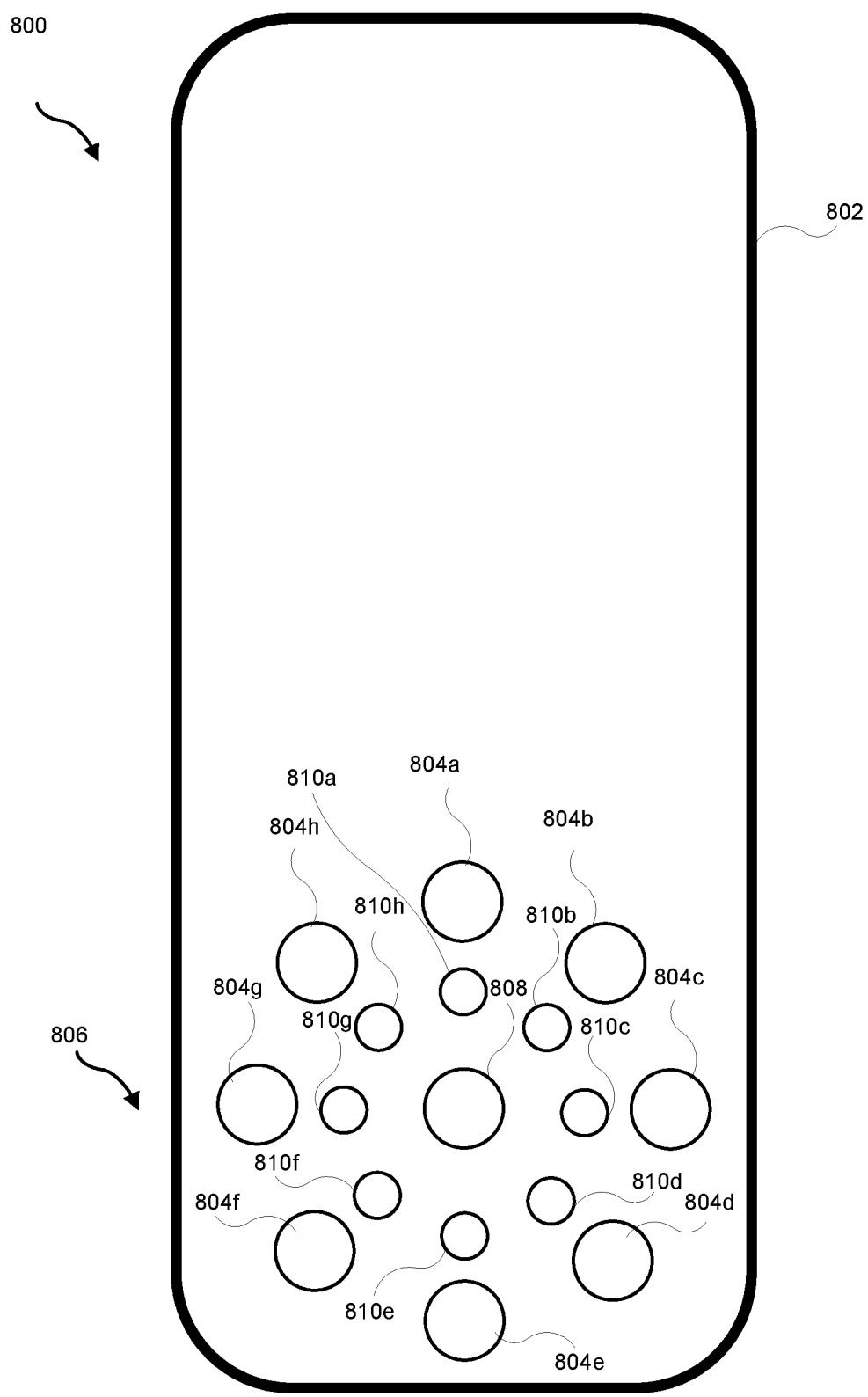
FIG. 8 is an illustration of an example computing device for mounting on a personal mobility vehicle that includes light-emitting devices in a fourth configuration for use as a directional indicator.

FIG. 8 is an illustration of an example computing device 802 for mounting on (coupling to) a personal mobility vehicle (e.g., the personal mobility vehicle 110) that includes first light-emitting devices 804a-h, second light-emitting devices 810a-h, and a light-emitting device 808 in a fourth configuration for use as a directional indicator 806. The first light-emitting devices 804a-h, the second light-emitting devices 810a-h, and the light-emitting device 808 in the fourth configuration for use as a directional indicator 806 may also be referred to herein as a display that is mounted on or coupled to the personal mobility vehicle 110.

In a fourth implementation 800, shown in FIG. 8, eight light-emitting devices 804a-h form an outer ring or circle with eight light-emitting devices 810a-h forming an inner ring or circle inside the outer ring or circle formed by the light-emitting devices 804a-h. The light-emitting device 808 is placed (located) in the center of the inner ring or circle and the center of the outer ring or circle. In some implementations, more than eight light-emitting devices may form an outer ring or circle. In some implementations, less than eight light-emitting devices may form an outer ring or circle. In some implementations, more than eight light-emitting devices may form an inner ring or circle. In some implementations, less than eight light-emitting devices may form an inner ring or circle.

In the fourth implementation 800, each of the light-emitting devices 804a-h are of a first size, each of the light-emitting devices 810a-h are of a second size, and the light-emitting device 808 is of the first size. In some implementations, each of the light-emitting devices 804a-h, each of the light-emitting devices 810a-h, and light-emitting device 808 may be of one or more different sizes. In the fourth implementation 800, the first size is larger (greater) than the second size. In some implementations, the second size may be larger (greater) than the first size. In some implementations, the light-emitting device 808 may be of the second size.

In some implementations, light-emitting devices may form another geometric shape that may include, but is not limited to, an oval, a square, or a rectangle. In some implementations, one or more or each of the light-emitting devices 804a-h, one or more or each of the light-emitting devices 810a-h, and the light-emitting device 808 may be of any shape including, but not limited to, circular, oval, square, rectangular, or triangular. For example, each of the light-emitting devices 804a-h may be of a first shape, each of the light-emitting devices 810a-h may be of a second shape, and the light-emitting device 808 may be of a third shape where the first shape, the second shape, and the third shape are different from one another.

The light-emitting devices 804a-h, the light-emitting devices 810a-h, and the light-emitting device 808 may be of the sizes and types as described for the light-emitting devices 204a-h as shown in FIG. 2, for the light-emitting devices 404a-h and the light-emitting device 408 as shown in FIG. 4, and for the light-emitting devices 604a-h and the light-emitting devices 608a-f as shown in FIG. 6. For example, the light-emitting devices 804a-h, the light-emitting devices 810a-h, and the light-emitting device 808 may be capable of emitting (configured to emit) monochromatic, bicolor, tricolor, multicolor, or white light. The light-emitting devices 804a-h, the light-emitting devices 810a-h, and the light-emitting device 808 may be a combination of shapes, sizes, and colors. For example, each of the light-emitting devices 804a-h may be of a first color or type, each of the light-emitting devices 810a-h may be of a second color or type, and the light-emitting device 808 may be of a third color or type, the first, second, and third colors or types all being different from one another.

FIG. 9A is an illustration of an example fourth trip segment 900 using a personal mobility vehicle 910 for transport along a route 902 in the fourth trip segment 900. The fourth trip segment 900 may include an interchange for navigation by the personal mobility vehicle 910 for travel along the route 902 in the direction of the arrows from an ingress point 940 or entry point into the interchange to a waypoint 942 or exit point out of the interchange.

FIGS. 9B-D are illustrations of the light-emitting devices 804a-h, the—emitting devices 810a-h, and the light-emitting device 808 in the fourth configuration for use as the directional indicator 806, providing directional information for travel along the route 902 in the fourth trip segment 900 as shown in FIG. 9A.

FIG. 9B is an illustration of the light-emitting devices 804a-h, the light-emitting devices 810a-h, and the light-emitting device 808 providing directional information for travel along the route 902 at a location 920 on the route 902. The personal mobility vehicle 910 may begin travel along the fourth trip segment 900 at the ingress point 940. For example, also referring to FIG. 8, the light-emitting devices 804a, 810a, 808, 810e, and 804e are illuminated (considered turned ON) while the light-emitting devices 804b-d, 804f-h, 810b-d, and 810f-h are not illuminated (considered turned OFF). The illuminated light-emitting devices 804a, 810a, 808, 810e, and 804e indicate a direction of travel. The directional indicator 806 as shown in FIG. 9B may indicate forward or straight travel of the personal mobility vehicle 910 along the route 902 at the location 920.

Referring to FIG. 9C, in some implementations, as the personal mobility vehicle 910 approaches location 922 the light-emitting device 804a may be solidly illuminated while the illuminating of the light-emitting devices 810a, 808, 810e, and 804e may be animated to indicate continued forward travel of the personal mobility vehicle 910 through intersection 944. For example, the light-emitting device 804e may be illuminated, then the light-emitting device 810e may be illuminated, then the light-emitting device 808 may be illuminated, and then the light-emitting device 810a may be illuminated followed by the simultaneous turning off (not illuminating) of the light-emitting device 804e, the light-emitting device 810e, the light-emitting device 808, and the light-emitting device 810a at the same time. This illumination sequence may be repeated while the personal mobility vehicle 910 is directed to travel in a forward direction through the intersection 944.

Once the personal mobility vehicle 910 has traveled through the intersection 944 and is traveling through location 924 towards location 926, referring to FIG. 9B, the light-emitting devices 804a, 810a, 808, 810e, and 804e are illuminated (considered turned ON) while the light-emitting devices 804b-d, 804f-h, 810b-d, and 810f-h are not illuminated (considered turned OFF). The illuminated light-emitting devices 804a, 810a, 808, 810e, and 804e of the directional indicator 806 as shown in FIG. 9A may indicate forward or straight travel of the personal mobility vehicle 910 along the route 902 at the location 924.

FIG. 9D is an illustration of the light-emitting devices 804a-h, the light-emitting devices 810a-h, and the light-emitting device 808 providing directional information for travel along the route 902 at a location 926 and towards a location 928 on the route 902. For example, also referring to FIG. 8, the light-emitting devices 804b, 810b, 808, 810f, and 804f are illuminated (considered turned ON) while the light-emitting devices 804a, 804c-e, 804g-h, 810a, 810c-e, and 810g-h are not illuminated (considered turned OFF). The illuminated light-emitting devices 804b, 810b, 808, 810f, and 804f indicate a direction of travel. The directional indicator 806 as shown in FIG. 9D may indicate that the personal mobility vehicle 910 turn slightly right in order to continue travel along the route 902 from the location 926 to a location 928.

Referring to FIG. 9B, the light-emitting devices 804a-h, the light-emitting devices 810a-h, and the light-emitting device 808 provide directional information for travel along the route 902 at the location 928 and towards a location 930. For example, also referring to FIG. 8, the light-emitting devices 804a, 810a, 808, 810e, and 804e are illuminated (considered turned ON) while the light-emitting devices 804b-d, 804f-h, 810b-d, and 810f-h are not illuminated (considered turned OFF). The illuminated light-emitting devices 804a, 810a, 808, 810e, and 804e indicate a direction of travel. The directional indicator 806 as shown in FIG. 9B may indicate forward or straight travel of the personal mobility vehicle 910 along the route 902 at the location 928.

Referring to FIG. 9D, the light-emitting devices 804a-h, the light-emitting devices 810a-h, and the light-emitting device 808 provide directional information for travel along the route 902 at the location 930 and towards a location 932 on the route 902. For example, also referring to FIG. 8, the light-emitting devices 804b, 810b, 808, 810f, and 804f are illuminated (considered turned ON) while the light-emitting devices 804a, 804c-e, 804g-h, 810a, 810c-e, and 810g-h are not illuminated (considered turned OFF). The illuminated light-emitting devices 804b, 810b, 808, 810f, and 804f indicate a direction of travel. The directional indicator 806 as shown in FIG. 9D may indicate that the personal mobility vehicle 910 turn slightly right in order to continue travel along the route 902 from the location 930 to a location 932.

Referring to FIG. 9B, the light-emitting devices 804a-h, the light-emitting devices 810a-h, and the light-emitting device 808 provide directional information for travel along the route 902 at the location 932 and towards a location 934. For example, also referring to FIG. 8, the light-emitting devices 804a, 810a, 808, 810e, and 804e are illuminated (considered turned ON) while the light-emitting devices 804b-d, 804f-h, 810b-d, and 810f-h are not illuminated (considered turned OFF). The illuminated light-emitting devices 804a, 810a, 808, 810e, and 804e indicate a direction of travel. The directional indicator 806 as shown in FIG. 9B may indicate forward or straight travel of the personal mobility vehicle 910 along the route 902 at the location 932.

Referring to FIG. 9C, in some implementations, as the personal mobility vehicle 910 approaches location 934 the light-emitting device 804a may be solidly illuminated while the illuminating of the light-emitting devices 810a, 808, 810e, and 804e may be animated to indicate continued forward travel of the personal mobility vehicle 910 through intersection 944. For example, the light-emitting device 804e may be illuminated, then the light-emitting device 810e may be illuminated, then the light-emitting device 808 may be illuminated, and then the light-emitting device 810a may be illuminated followed by the simultaneous turning off (not illuminating) of the light-emitting device 804e, the light-emitting device 810e, the light-emitting device 808, and the light-emitting device 810a at the same time. This illumination sequence may be repeated while the personal mobility vehicle 910 is directed to travel in a forward direction through the intersection 944.

Once the personal mobility vehicle 910 has traveled through the intersection 944 and is traveling through location 936 towards the waypoint 942, referring to FIG. 9B, the light-emitting devices 804a, 810a, 808, 810e, and 804e are illuminated (considered turned ON) while the light-emitting devices 804b-d, 804f-h, 810b-d, and 810f-h are not illuminated (considered turned OFF). The illuminated light-emitting devices 804a, 810a, 808, 810e, and 804e of the directional indicator 806 as shown in FIG. 9B may indicate forward or straight travel of the personal mobility vehicle 910 along the route 902 at the location 936.

Figure 10:
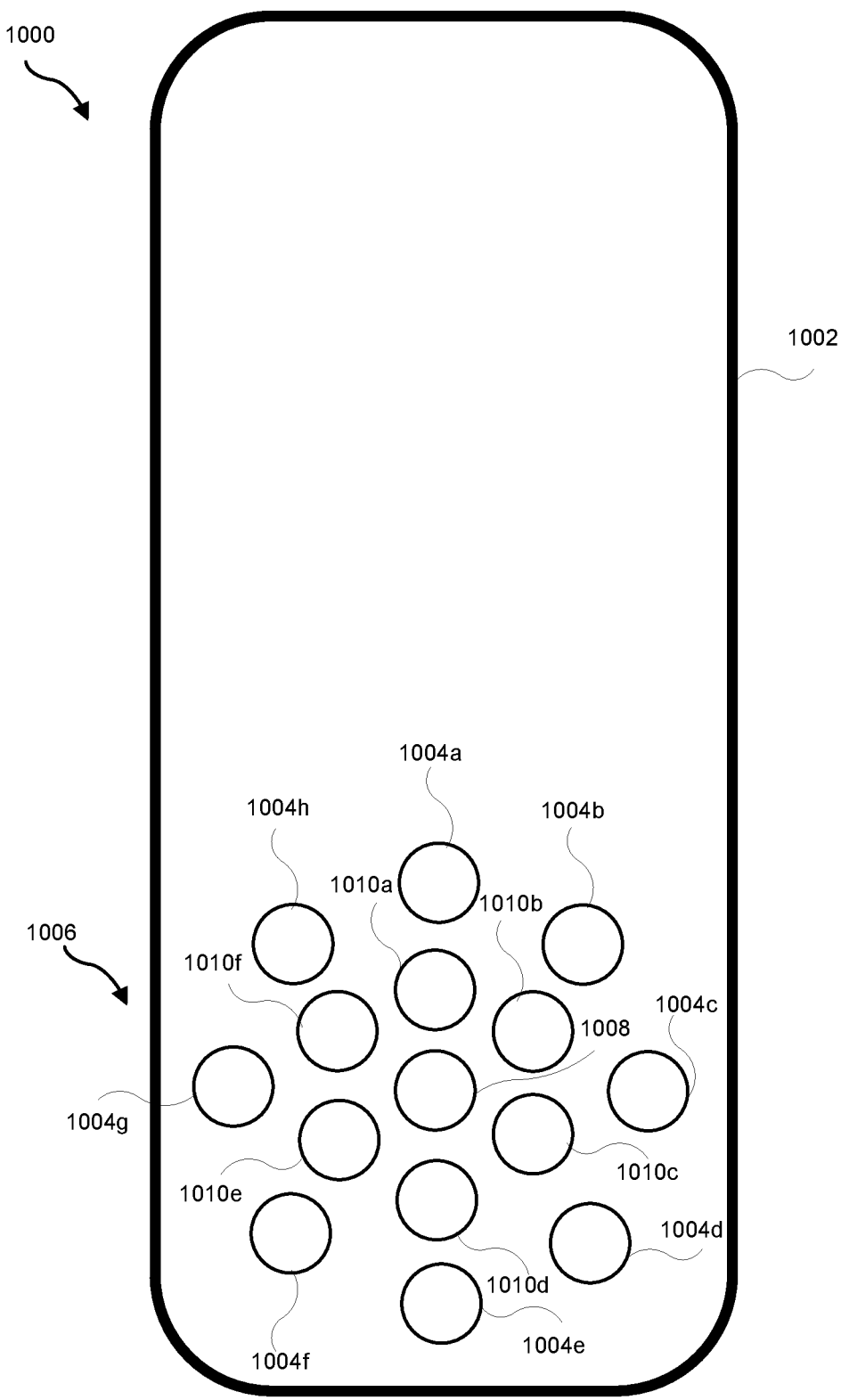
FIG. 10 is an illustration of an example computing device for mounting on a personal mobility vehicle that includes light-emitting devices in a fifth configuration for use as a directional indicator.

FIG. 10 is an illustration of an example computing device 1002 for mounting on (coupling to) a personal mobility vehicle (e.g., the personal mobility vehicle 110) that includes light-emitting devices 1004a-h, light-emitting devices 1010a-f, and a light-emitting device 1008 in a fifth configuration for use as a directional indicator 1006. The light-emitting devices 1004a-h, the light-emitting devices 1010a-f, and the light-emitting device 1008 in the fifth configuration for use as a directional indicator 1006 may also be referred to herein as a display that is mounted on or coupled to the personal mobility vehicle 110.

In a fifth implementation 1000, shown in FIG. 10, eight light-emitting devices 1004a-h form an outer ring or circle with six light-emitting devices 1010a-f forming an inner ring or circle inside the outer ring or circle formed by the light-emitting devices 1004a-h. The light-emitting device 1008 is placed (located) in the center of the inner ring or circle and the center of the outer ring or circle. In some implementations, more than eight light-emitting devices may form an outer ring or circle. In some implementations, less than eight light-emitting devices may form an outer ring or circle. In some implementations, more than six light-emitting devices may form an inner ring or circle. In some implementations, less than six light-emitting devices may form an inner ring or circle.

In the fifth implementation 1000, each of the light-emitting devices 1004a-h, each of the light-emitting devices 1010a-f, and the light-emitting device 1008 are the same size. In some implementations, each of the light-emitting devices 1004a-h, each of the light-emitting devices 1010a-f, and the light-emitting device 1008 may be of one or more different sizes. For example, each of the light-emitting devices 1004a-h may be of a first size, each of the light-emitting devices 1010a-f may be of a second size, and the light-emitting device 1008 may be of a third size. In some implementations, the first size and the third size may be larger (greater) than the second size. In some implementations, the second size may be larger (greater) than the first size and the third size. In some implementations, the third size may be larger (greater) than the first size and the second size. In some implementations, the third size may be smaller (less) than the first size and the second size.

In some implementations, light-emitting devices may form another geometric shape that may include, but is not limited to, an oval, a square, or a rectangle. In some implementations, one or more or each of the light-emitting devices 1004a-h, one or more or each of the light-emitting devices 1010a-f, and the light-emitting device 1008 may be of any shape including, but not limited to, circular, oval, square, rectangular, or triangular. For example, each of the light-emitting devices 1004a-h may be of a first shape and each of the light-emitting devices 1010a-f may be of a second shape different from the first shape. In some implementations, the light-emitting device 1008 may of the same shape as the each of the light-emitting devices 1004a-h. In some implementations, the light-emitting device 1008 may of the same shape as the each of the light-emitting devices 1010a-f. In some implementations, the light-emitting device 1008 may of a shape different from the shape of the light-emitting devices 1004a-h and different from the shape of the light-emitting devices 1010a-f.

The light-emitting devices 1004a-h, the light-emitting devices 1010a-f, and the light-emitting device 1008 may be of the sizes and types as described for the light-emitting devices 204a-h as shown in FIG. 2, and for the light-emitting devices 404a-h and the light-emitting device 408 as shown in FIG. 4, for the light-emitting devices 604a-h and the light-emitting devices 608a-f as shown in FIG. 6, and for the light-emitting devices 804a-h, the light-emitting devices 810a-h, and the light-emitting device 808 as shown in FIG. 8. For example, the light-emitting devices 1004a-h, the light-emitting devices 1010a-f, and the light-emitting device 1008 may be capable of emitting (configured to emit) monochromatic, bicolor, tricolor, multicolor, or white light. The light-emitting devices 1004a-h, the light-emitting devices 1010a-f, and the light-emitting device 1008 may be a combination of shapes, sizes, and colors. For example, each of the light-emitting devices 1004a-h may be of a first color or type, each of the light-emitting devices 1010a-f may be of a second color or type different from the first color or type, and the light-emitting device 1008 may be of a third color or type, the first, second, and third colors or types all being different from one another.

FIG. 11A is an illustration of an example fifth trip segment 1100 using a personal mobility vehicle 1110 for transport along a route 1102 in the fifth trip segment 1100. The fifth trip segment 1100 may direct the personal mobility vehicle 1110 to reverse direction by making a U-turn. The personal mobility vehicle 1110 may travel from an ingress point 1120 or entry point of the fifth trip segment 1100 to a waypoint 1122 of the fifth trip segment 1100.

FIGS. 11B-C are illustrations of the light-emitting devices 1004a-h, the light-emitting devices 1010a-f, and the light-emitting device 1008 in the fifth configuration for use as the directional indicator 1006, providing directional information for travel along the route 1102 in the fifth trip segment 1100 as shown in FIG. 11A.

FIG. 11B is an illustration of the light-emitting devices 1004a-h, the light-emitting devices 1010a-f, and the light-emitting device 1008 providing directional information for travel along the route 1102 at a location 1150 on the route 1102. For example, also referring to FIG. 10, the light-emitting devices 1004a, 1004b, 1004h, 1004e, 1010a, 1010d, and 1008 are illuminated (considered turned ON) while the light-emitting devices 1004c-d, 1004f-g, 1010b-c, 1010e-f are not illuminated (considered turned OFF). The illuminated light-emitting devices 1004a, 1004b, 1004h, 1004e, 1010a, 1010d, and 1008 may be perceived as forming an arrow showing a direction of travel. The directional indicator 1006 as shown in FIG. 11B may indicate forward or straight travel of the personal mobility vehicle 1110 along the route 1102 at the location 1150 as the arrow formed by the illumination of light-emitting devices 1004a, 1004b, 1004h, 1004e, 1010a, 1010d, and 1008 points in a forward direction.

FIG. 11C is an illustration of the light-emitting devices 1004a-h, the light-emitting devices 1010a-f, and the light-emitting device 1008 providing directional information for travel along the route 1102 from a location 1160, to and through a location 1170, and to a location 1180 on the route 1102. For example, also referring to FIG. 10, the light-emitting device 1004g is illuminated (considered turned ON) while the light-emitting devices 1004a-f and 1004h are not illuminated (considered turned OFF). The directional indicator 1006 as shown in FIG. 11C may indicate that the personal mobility vehicle 1110 should make a left turn along the route 1102 at the location 1160.

Animation provided by the light-emitting devices 1010a-f and the light-emitting device 1008 may navigate the personal mobility vehicle 1110 through the U-turn by navigating the personal mobility vehicle from the location 1160, to and through the location 1170, and to the location 1180. For example, referring to FIG. 11C, the light-emitting devices 1010a-f may be illuminated in a counterclockwise direction starting with the light-emitting device 1010b and ending with the light-emitting device 1010c, sequentially illuminating (turning ON) the light-emitting device 1010b, the light-emitting device 1010a, the light-emitting device 1010f, the light-emitting device 1010e, the light-emitting device 1010d, and the light-emitting device 1010c. The light-emitting devices 1010a-f may not be illuminated (turned OFF) and then again illuminated in the counterclockwise direction. This illumination pattern may repeat as the personal mobility vehicle 1110 navigates from the location 1160, to and through the location 1170, and to the location 1180. In some implementations, the light-emitting device 1008 may be illuminated in a different color than the light-emitting devices 1010a-f and the light-emitting device 1004g. In some implementations, the light-emitting device 1008 may blink as the personal mobility vehicle 1110 travels from the location 1160 to the location 1180.

Once the personal mobility vehicle 1110 has traveled to the location 1180, referring to FIG. 11B, the light-emitting devices 1004a, 1004b, 1004h, 1004e, 1010a, 1010d, and 1008 are illuminated (considered turned ON) while the light-emitting devices 1004c-d, 1004f-g, 1010b-c, 1010e-f are not illuminated (considered turned OFF). The illuminated light-emitting devices 1004a, 1004b, 1004h, 1004e, 1010a, 1010d, and 1008 may be perceived as forming an arrow showing a direction of travel. The directional indicator 1006 as shown in FIG. 11B may indicate forward or straight travel of the personal mobility vehicle 1110 along the route 1102 at the location 1180 as the arrow formed by the illumination of light-emitting devices 1004a, 1004b, 1004h, 1004e, 1010a, 1010d, and 1008 points in a forward direction.

Figure 12:
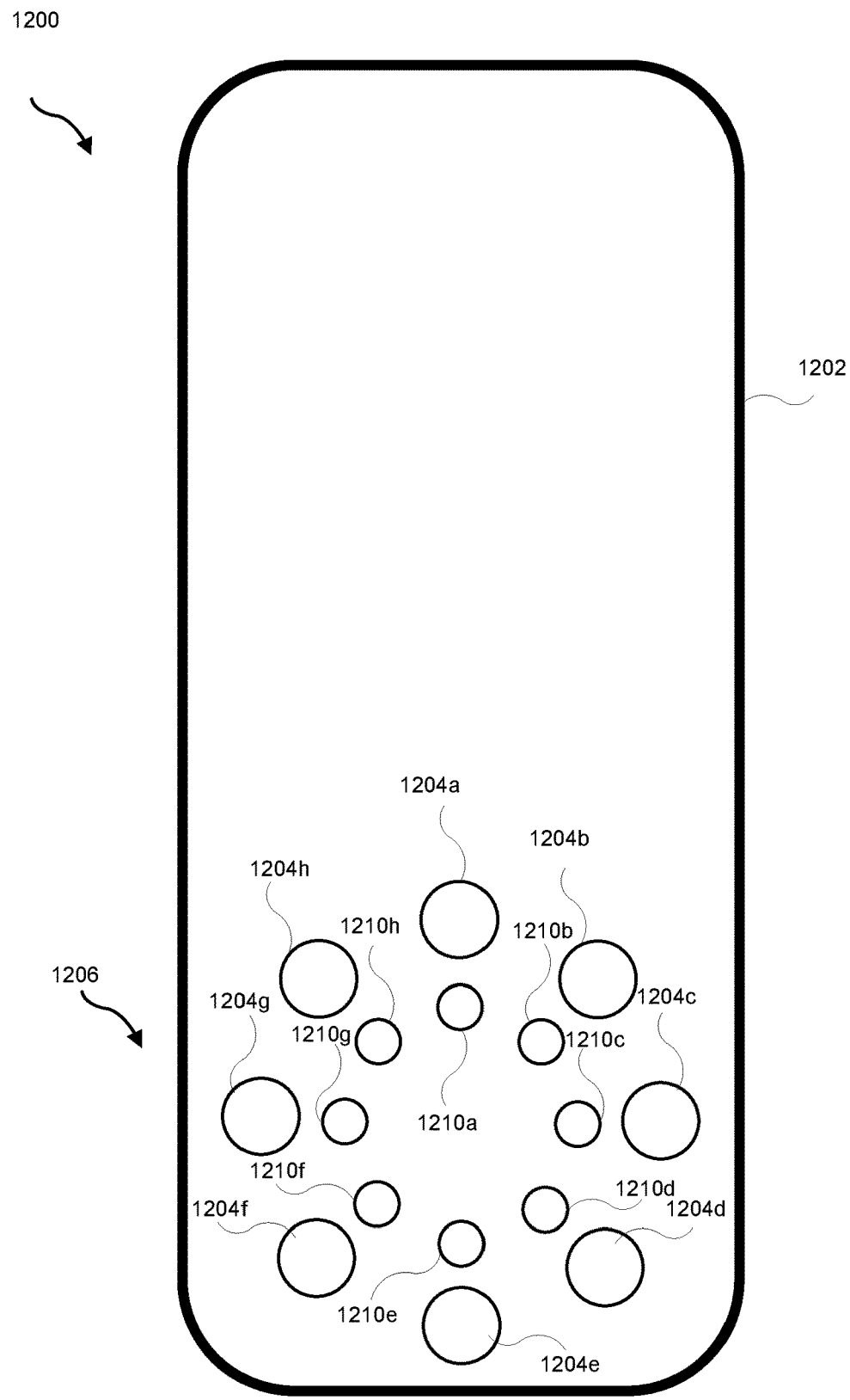
FIG. 12 is an illustration of an example computing device for mounting on a personal mobility vehicle that includes light-emitting devices in a sixth configuration for use as a directional indicator.

FIG. 12 is an illustration of an example computing device 1202 for mounting on (coupling to) a personal mobility vehicle (e.g., the personal mobility vehicle 110) that includes first light-emitting devices 1204a-h and second light-emitting devices 1210a-h in a sixth configuration for use as a directional indicator 1206. The first light-emitting devices 1204a-h and the second light-emitting devices 1210a-h in the sixth configuration for use as a directional indicator 1206 may also be referred to herein as a display that is mounted on or coupled to the personal mobility vehicle 110.

In a sixth implementation 1200, shown in FIG. 12, eight light-emitting devices 1204a-h form an outer ring or circle with eight light-emitting devices 1210a-h forming an inner ring or circle inside the outer ring or circle formed by the light-emitting devices 1204a-h. In some implementations, more than eight light-emitting devices may form an outer ring or circle. In some implementations, less than eight light-emitting devices may form an outer ring or circle. In some implementations, more than eight light-emitting devices may form an inner ring or circle. In some implementations, less than eight light-emitting devices may form an inner ring or circle.

In the sixth implementation 1200, each of the light-emitting devices 1204*a-h* are of a first size and each of the light-emitting devices 1210*a-h* are of a second size. In some implementations, each of the light-emitting devices 1204*a-h* and each of the light-emitting devices 1210*a-h* may be of one or more different sizes. In the sixth implementation 1200, the first size is larger (greater) than the second size. In some implementations, the second size may be larger (greater) than the first size.

In some implementations, light-emitting devices may form another geometric shape that may include, but is not limited to, an oval, a square, or a rectangle. In some implementations, one or more or each of the light-emitting devices 1204*a-h* and one or more or each of the light-emitting devices 810*a-h* may be of any shape including, but not limited to, circular, oval, square, rectangular, or triangular. For example, each of the light-emitting devices 1204*a-h* may be of a first shape and each of the light-emitting devices 1210*a-h* may be of a second shape where the first shape and the second shape are different shapes.

The light-emitting devices 1204*a-h* and the light-emitting devices 1210*a-h* may be of the sizes and types as described for the light-emitting devices 204*a-h* as shown in FIG. 2, for the light-emitting devices 404*a-h* and the light-emitting device 408 as shown in FIG. 4, for the light-emitting devices 604*a-h* and the light-emitting devices 608*a-f* as shown in FIG. 6, for the light-emitting devices 804*a-h*, the light-emitting devices 810*a-h*, and the light-emitting device 808 as shown in FIG. 8, and for the light-emitting devices 1004*a-h*, the light-emitting devices 1010*a-f*, and the light-emitting device 1008 as shown in FIG. 10. For example, the light-emitting devices 1204*a-h* and the light-emitting devices 1210*a-h* may be capable of emitting (configured to emit) monochromatic, bicolor, tricolor, multicolor, or white light. The light-emitting devices 1204*a-h* and the light-emitting devices 1210*a-h* may be a combination of shapes, sizes, and colors. For example, each of the light-emitting devices 1204*a-h* may be of a first color or type and each of the light-emitting devices 1210*a-h* may be of a second color or type different from the first color or type.

FIG. 13A is an illustration of an example sixth trip segment 1300 using a personal mobility vehicle 1310 for transport along a route 1302 in the sixth trip segment 1300. The sixth trip segment 1300 may include an intersection 1304 for navigation by the personal mobility vehicle 1310 for travel along the route 1302. The personal mobility vehicle 1310 may travel from an ingress point 1320 or entry point of the sixth trip segment 1300 to a waypoint 1322 of the sixth trip segment 1300.

FIGS. 13B-C are illustrations of the first light-emitting devices 1204*a-h* and the second light-emitting devices 1210*a-h* in the sixth configuration for use as the directional indicator 1206, providing directional information for travel along the route 1302 in the sixth trip segment 1300 as shown in FIG. 13A.

FIG. 13B is an illustration of the first light-emitting devices 1204*a-h* and the second light-emitting devices 1210*a-h* providing directional information for travel along the route 1302 at a location 1350 on the route 1302. For example, also referring to FIG. 12, the light-emitting device 1204*a* is illuminated (considered turned ON) while the light-emitting devices 1204*b-h* and the light-emitting devices 1210*a-h* are not illuminated (considered turned OFF). The directional indicator 1206 as shown in FIG. 13B may indicate forward or straight travel of the personal mobility vehicle 1310 along the route 1302 at the location 1350.

FIG. 13C is an illustration of the first light-emitting devices 1204*a-h* and the second light-emitting devices 1210*a-h* providing directional information for travel along the route 1302 at a location 1360 on the route 1302. For example, also referring to FIG. 12, the light-emitting device 1204*c* is illuminated (considered turned ON) while the light-emitting devices 1204*a-b* and the light-emitting devices 1204*d-h* are not illuminated (considered turned OFF). The directional indicator 1206 may indicate travel of the personal mobility vehicle 1310 along the route 1302 at the location 1360 may proceed to the right, indicating that the personal mobility vehicle 1310 should turn right at the intersection 1304. In this implementation, the turning on (illuminating of) the light-emitting devices 1210*a-c* and the light-emitting devices 1210*g-h* may be animated to indicate an upcoming right turn in conjunction with the constant illumination of the light-emitting device 1204*c*. For example, the light-emitting device 1210*g* may be illuminated, then the light-emitting device 1210*h* may be illuminated, then the light-emitting device 1210*a* may be illuminated, then the light-emitting device 1210*b* may be illuminated, and then the light-emitting device 1210*c* may be illuminated followed by the simultaneous turning off (not illuminating) of the light-emitting devices 1210*g-h* and 1210*a-c* at the same time. This illumination sequence may be repeated until the personal mobility vehicle 1310 reaches the location 1370, completing the right turn.

Once the personal mobility vehicle 1310 has traveled to the location 1370, referring to FIG. 13B, the light-emitting device 1204*a* is illuminated (considered turned ON) while the light-emitting devices 1204*b-h* and the light-emitting devices 1210*a-h* are not illuminated (considered turned OFF). The directional indicator 1206 as shown in FIG. 13B may indicate forward or straight travel of the personal mobility vehicle 1310 along the route 1302 at the location 1370.

FIGS. 14A-D are illustrations of the light-emitting devices 404*a-h* and the light-emitting device 408 in the second configuration shown in FIG. 4 for use as a directional indicator 1406 that may provide turn-by-turn directions.

Figure 14A:
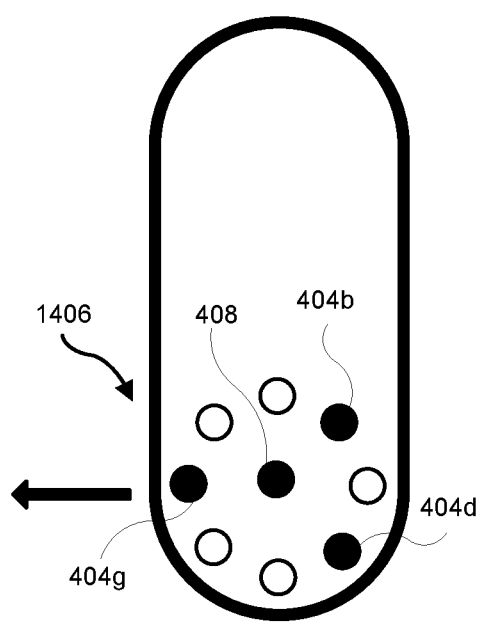
FIGS. 14A-D are illustrations of the light-emitting devices in the first configuration shown in FIG. 2 indicating a left turn, a right turn, forward travel, and a U-turn, respectively.

FIG. 14A is an illustration of the light-emitting devices 404*a-h* and the light-emitting device 408 providing directional information for a left turn. For example, also referring to FIG. 4, the light-emitting devices 404*g*, 404*b*, 404*d*, and 408 are illuminated (considered turned ON) while the light-emitting devices 404*c*, 404*d*, 404*f*, and 404*g* are not illuminated (considered turned OFF).

Figure 14C:
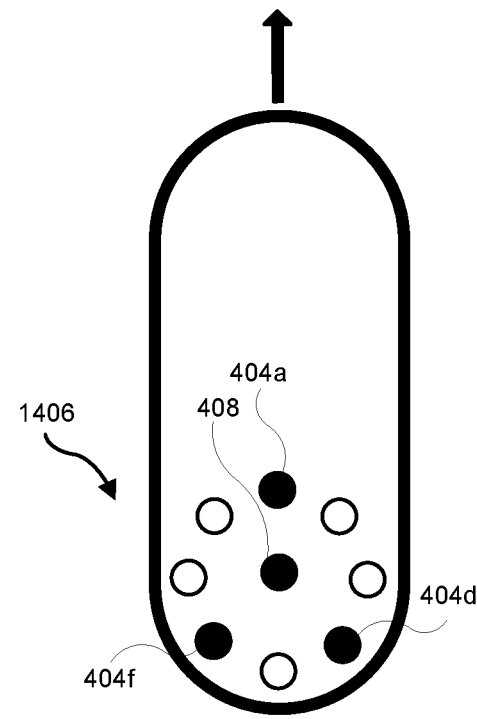
Figure 14B:
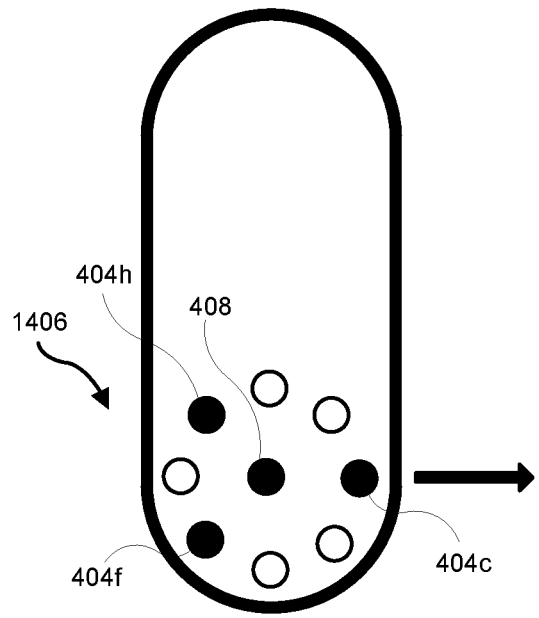

FIG. 14B is an illustration of the light-emitting devices 404*a-h* and the light-emitting device 408 providing directional information for a right turn. For example, also referring to FIG. 4, the light-emitting devices 404*c*, 404*f*, 404*h*, and 408 are illuminated (considered turned ON) while the light-emitting devices 404*a-b*, 404*d-e*, and 404*g* are not illuminated (considered turned OFF).

FIG. 14C is an illustration of the light-emitting devices 404*a-h* and the light-emitting device 408 providing directional information for travel in a forward direction. For example, also referring to FIG. 4, the light-emitting devices 404*a*, 404*d*, 404*f*, and 408 are illuminated (considered turned ON) while the light-emitting devices 404*b-c*, 404*e*, and 404*g-h* are not illuminated (considered turned OFF).

Figure 14D:
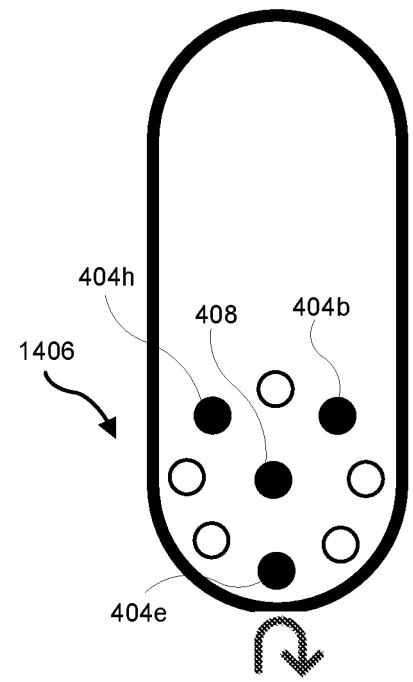

FIG. 14D is an illustration of the light-emitting devices 404*a-h* and the light-emitting device 408 providing directional information for travel in a reverse direction (for a U-turn). For example, also referring to FIG. 4, the light-emitting devices 404b, 404e, 404h, and 408 are illuminated (considered turned ON) while the light-emitting devices 404a, 404c-d, and 404f-g are not illuminated (considered turned OFF).

Though shown as a circle or ring of light-emitting devices, light-emitting devices as shown in the figures included herein may be configured in any number of patterns that may include, but are not limited to, an oval or other type of pattern that includes curved sides, a square, a triangle, a polygon, or other type of pattern that includes straight sides that may be regular or irregular.

Figure 15A:
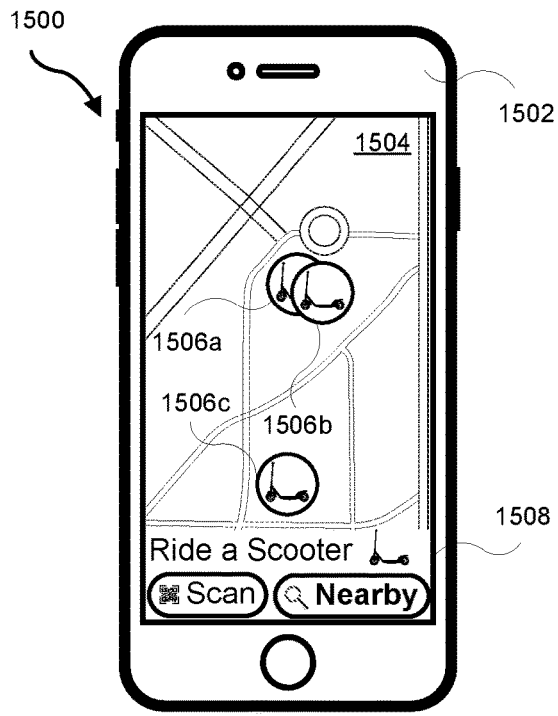
FIG. 15A is an illustration of an example computing device of a transportation requestor that includes a display device showing a map with indications of locations of available personal mobility vehicles.

FIG. 15A is a first illustration 1500 of an example computing device 1502 of a transportation requestor (e.g., the requestor 122 as shown in FIG. 1) that includes a display device 1508 showing (displaying) a map 1504 with indications of locations of available personal mobility vehicles (e.g., personal mobility vehicle indicators 1506a-c). In the example shown in FIG. 15A, each personal mobility vehicle indicator 1506a-c is associated with a respective personal mobility vehicle. For example, referring to FIG. 1, the personal mobility vehicle indicator 1506a is associated with the personal mobility vehicle 110.

For example, referring to FIG. 1, the requestor 122 may request use of a personal mobility vehicle for transport from the starting location 150 to the ending location 152. The computing device 1502 of the requestor 122 may display one or more personal mobility vehicle indicators (e.g., the personal mobility vehicle indicators 1506a-c) that show a respective location of an available personal mobility vehicle for use in satisfying the request. The requestor 122 may select one of the available personal mobility vehicles to be matched with in order to satisfy the request. For example, the requestor 122 may request to be matched with the personal mobility vehicle closest to the starting location 150. In the example shown in FIGS. 15A-B, the requestor 122 may request being matched with the personal mobility vehicle associated with the personal mobility vehicle indicator 1506a for use in satisfying the request. In this example, referring to FIG. 1, the personal mobility vehicle 110 may be associated with the personal mobility vehicle indicator 1506a.

Figure 15B:
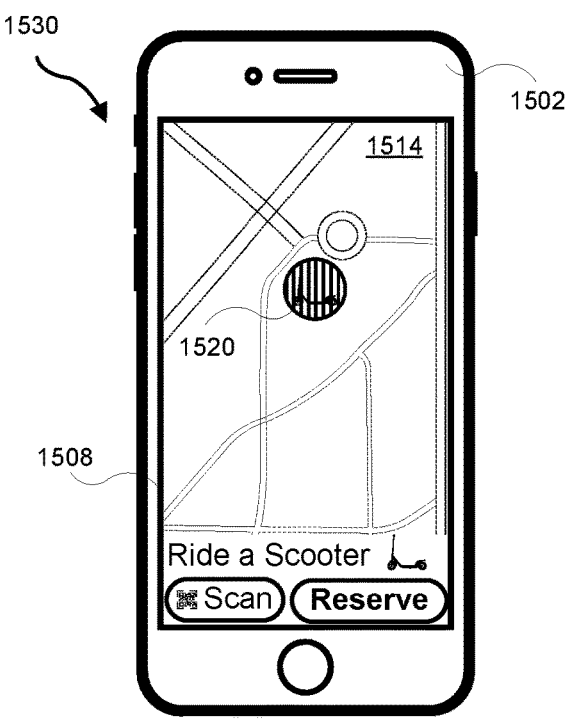
FIG. 15B is an illustration of an example computing device of a transportation requestor where a display device shows a map including an indication of a location of a personal mobility vehicle matched to the requestor.

FIG. 15B is an illustration 1530 of the example computing device 1502 of the transportation requestor (e.g., the requestor 122) where the display device 1508 shows a map 1514 including an indication of the location of the personal mobility vehicle matched to the requestor (e.g., personal mobility vehicle indicator 1520 that is associated with the personal mobility vehicle 110). For example, the personal mobility vehicle indicator 1520 may be displayed highlighted, in a particular color, or by any other means that indicates to the requestor that the requestor has been matched with the personal mobility vehicle 110. For example, the personal mobility vehicle indicator 1520 may be an updated version of the personal mobility vehicle indicator 1506a, the update providing a visual indication of the location and selection of the personal mobility vehicle 110.

Figure 15C:
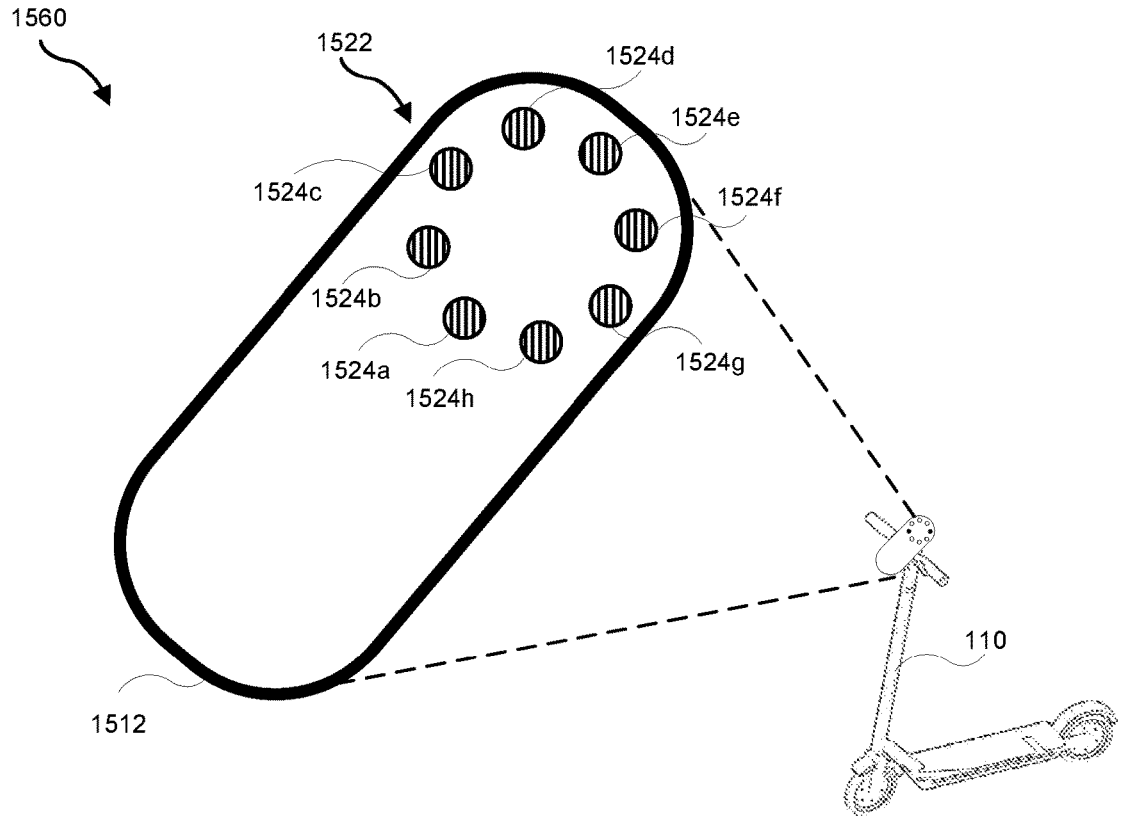
FIG. 15C is an illustration of a computing device mounted on a personal mobility vehicle matched to a requestor.

FIG. 15C is an illustration 1560 of an example computing device 1512 mounted on the personal mobility vehicle 110 matched to the requestor 122 as shown in FIG. 1. The computing device 1512 may include a directional indicator 1522 that includes light-emitting devices 1524a-h. In the example shown in FIG. 15C, the directional indicator 1522 may include eight light-emitting devices 1524a-h arranged in a circle or ring. Referring to FIG. 15B, the light-emitting devices 1524a-h may be illuminated (turned ON) when the computing device 1502 is in proximity to (near) the personal mobility vehicle 110 matched to the requestor 122. Doing so may provide a visual indication to the requestor 122 that the personal mobility vehicle 110 is the personal mobility vehicle matched to the requestor 122. For example, referring to FIG. 15A, the personal mobility vehicle indicator 1506a and the personal mobility vehicle indicator 1506b may indicate two personal mobility vehicles that may be located near to one another, making the determination of the personal mobility vehicle matched to the requestor 122 more difficult for the requestor 122 to determine. For example, the requestor 122 may need to look at each personal mobility vehicle to identify a marking or other distinguishing characteristic of each personal mobility vehicle to determine which personal mobility vehicle the requestor 122 has been matched with.

In some implementations, the illumination of one or more (up to all) of the light-emitting devices 1524a-h may be controlled to match (closely match or correlate with) the personal mobility vehicle indicator 1520. For example, a color of the personal mobility vehicle indicator 1520 may match a color of one or more (or all) illuminated light-emitting devices 1524a-h. For example, the personal mobility vehicle indicator 1520 may blink (may turn ON and OFF) at a rate and one or more (or all) light-emitting devices 1524a-h may blink (turn ON and OFF) at the same rate. For example, the illuminating of the light-emitting devices 1524a-h may be animated, sequentially illuminating each light-emitting device starting with the light-emitting device 1524a and ending with the light-emitting device 1524h, the illumination of each light-emitting device occurring as a location of the requestor 122 approaches a location of the personal mobility vehicle 110.

Correlating the illuminating of the light-emitting devices 1524a-h with the display of the personal mobility vehicle indicator 1520 that is associated with the personal mobility vehicle 110 may provide the requestor 122 with a visual indication of the personal mobility vehicle the requestor 122 is matched with. The visual indication may facilitate identifying a personal mobility vehicle for use by a requestor in particular when the requestor approaches multiple personal mobility vehicles parked in a particular location.

The directional indicator 1522 may be any one of the directional indicators as discussed herein and may operate as any of the directional indicators as described herein. As such, the directional indictor 1522 may include more light-emitting devices, fewer light-emitting devices, and/or different arrangements, types, sizes, and colors of light-emitting devices.

FIGS. 16-19 are illustrations showing travel of a personal mobility vehicle (e.g., the personal mobility vehicle 110) along a route (e.g., the route 130) where the personal mobility vehicle (e.g., the personal mobility vehicle 110) includes an example computing device (e.g., the example computing device 1502 as shown on FIG. 15C) with a directional indicator (e.g., the directional indicator 1506 as shown in FIG. 15C). As the personal mobility vehicle 110 travels through the segments 120a-m of the route 130, the directional indicator 1506 of the computing device 1502 may illuminate (turn ON) and not illuminate (turn OFF) one or more light-emitting devices 1524a-h to indicate a direction of travel along the route.

Referring also to FIG. 15C, the directional indicator 1506 may be placed in a respective state as the personal mobility vehicle 110 travels along each segment 120a-m of the route 130, navigating the personal mobility vehicle 110 from the starting location 150 to the ending location 152 along the route 130. The directional indicator 1506 may navigate the personal mobility vehicle 110 from an entry or ingress point to the segment to a waypoint at the end of the segment.

Figure 16:
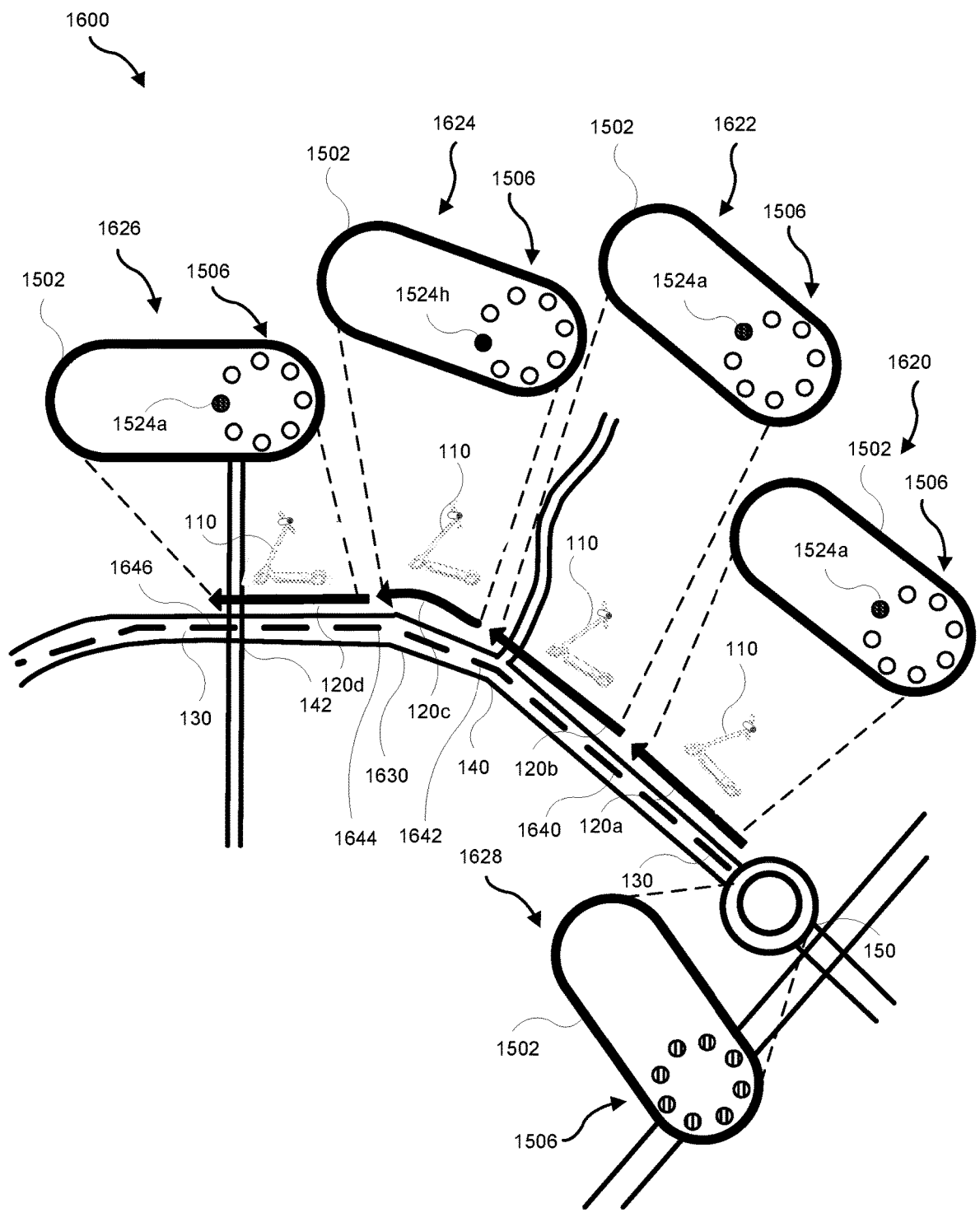
FIG. 16 is an illustration showing travel of a personal mobility vehicle from a starting location and along first segments of a route.

FIG. 16 is an illustration 1600 showing travel of the personal mobility vehicle 110 from the starting location 150 and along segments 120*a-d* of the route 130. Referring to FIG. 15C, the directional indicator 1506 in an initial or starting state 1628 includes illuminating (turning ON) the light-emitting devices 1524*a-h* as a way of indicating to the requestor 122 that the personal mobility vehicle 110 has been matched with the requestor 122 to satisfy the transportation request.

As the personal mobility vehicle 110 travels from the starting location and along the segment 120*a*, the directional indicator 1506 of the computing device 1502 may be placed in a first state 1620. In the first state 1620, the light-emitting device 1524*a* of the directional indicator 1506 included in the computing device 1502 is illuminated (turned ON) while the light-emitting devices 1524*b-h* of the directional indicator 1506 are not illuminated (turned OFF). In the first state 1620, the directional indicator 1506 indicates forward (straight) travel of the personal mobility vehicle 110 along the segment 120*a* of the route 130 to a waypoint 1640 of the segment 120*a*.

The segment 120*b* may include travel through the intersection 140. As the personal mobility vehicle 110 travels along the segment 120*b*, the directional indicator 1506 of the computing device 1502 may be placed in a second state 1622. In the second state 1622, the light-emitting device 1524*a* of the directional indicator 1506 included in the computing device 1502 is illuminated (turned ON) while the light-emitting devices 1524*b-h* of the directional indicator 1506 are not illuminated (turned OFF). In the second state 1622, the directional indicator 1506 indicates forward (straight) travel of the personal mobility vehicle 110 along the segment 120*b* of the route 130, continuing forward travel through the intersection 140 and to a waypoint 1642 of the segment 120*b*.

The segment 120*c* may include travel along a curve 1630 in the route 130. As the personal mobility vehicle 110 travels along the segment 120*c*, the directional indicator 1506 of the computing device 1502 may be placed in a third state 1624. In the third state 1624, the light-emitting device 1524*h* of the directional indicator 1506 included in the computing device 1502 is illuminated (turned ON) while the light-emitting devices 1524*a-g* of the directional indicator 1506 are not illuminated (turned OFF). In the third state 1622, the directional indicator 1506 indicates that travel of the personal mobility vehicle 110 along the segment 120*c* of the route 130 should continue by following the route 130 by traveling slightly to the left and to a waypoint 1644 of the segment 120*c*.

The segment 120*d* may include travel through the intersection 142. As the personal mobility vehicle 110 travels along the segment 120*d*, the directional indicator 1506 of the computing device 1502 may be placed in a fourth state 1626. In the fourth state 1626, the light-emitting device 1524*a* of the directional indicator 1506 included in the computing device 1502 is illuminated (turned ON) while the light-emitting devices 1524*b-h* of the directional indicator 1506 are not illuminated (turned OFF). In the fourth state 1626, the directional indicator 1506 indicates forward (straight) travel of the personal mobility vehicle 110 along the segment 120*d* of the route 130, continuing forward travel through the intersection 142 and to a waypoint 1646 of the segment 120*d*.

Figure 17:
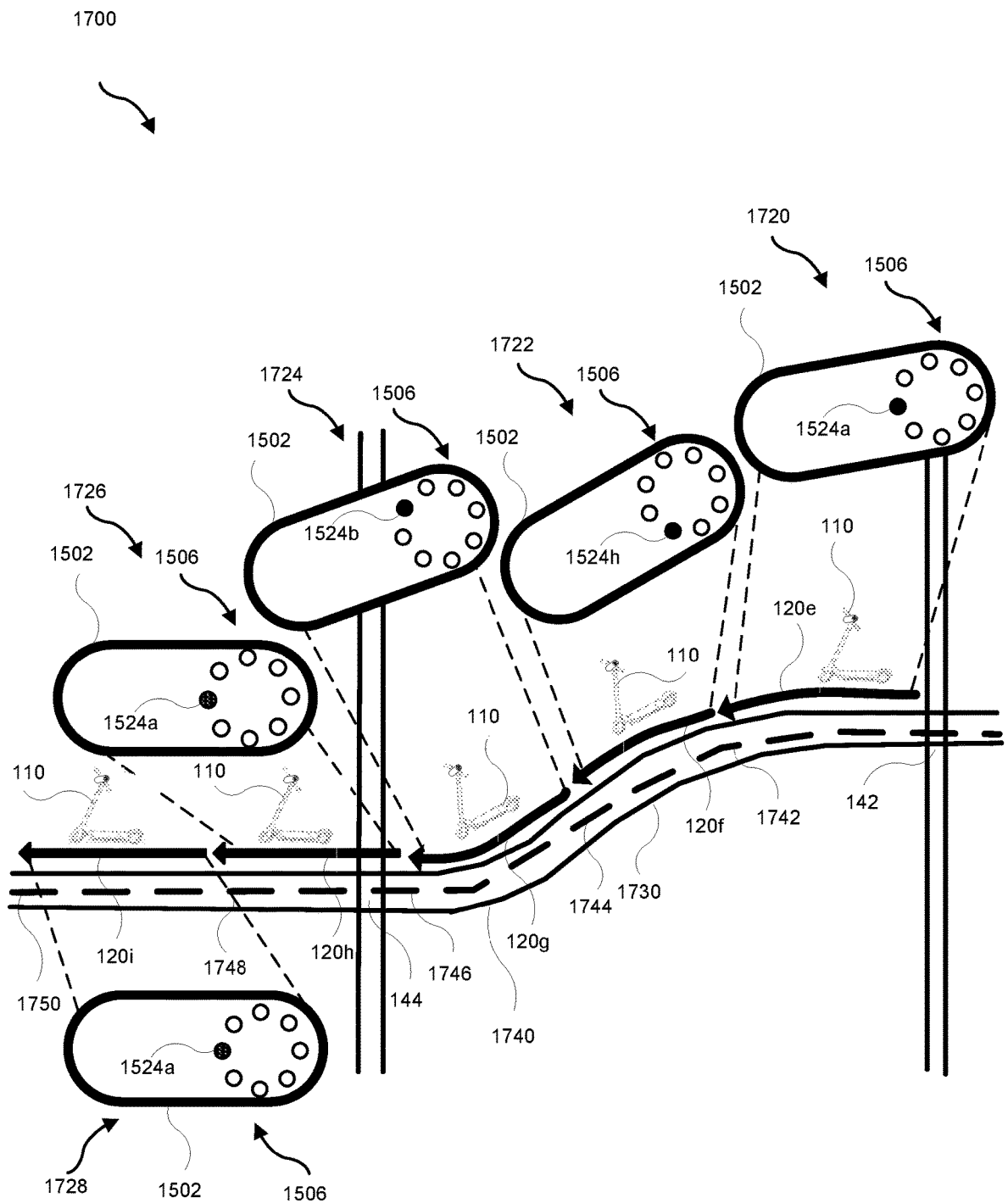
FIG. 17 is an illustration showing continuing travel of a personal mobility vehicle along second segments of a route.

FIG. 17 is an illustration 1700 showing continuing travel of the personal mobility vehicle 110 along segments 120*e-i* of the route 130.

As the personal mobility vehicle 110 travels along the segment 120*e*, the directional indicator 1506 of the computing device 1502 may be placed in a fifth state 1720. In the fifth state 1720, the light-emitting device 1524*a* of the directional indicator 1506 included in the computing device 1502 is illuminated (turned ON) while the light-emitting devices 1524*b-h* of the directional indicator 1506 are not illuminated (turned OFF). In the fifth state 1720, the directional indicator 1506 indicates forward (straight) travel of the personal mobility vehicle 110 along the segment 120*e* of the route 130 and to a waypoint 1742 of the segment 120*e*.

The segment 120*f* may include travel along a slight curve 1730 in the route 130. As the personal mobility vehicle 110 travels along the segment 120*f*, the directional indicator 1506 of the computing device 1502 may be placed in a sixth state 1722. In the sixth state 1722, the light-emitting device 1524*h* of the directional indicator 1506 included in the computing device 1502 is illuminated (turned ON) while the light-emitting devices 1524*a-g* of the directional indicator 1506 are not illuminated (turned OFF). In the sixth state 1722, the directional indicator 1506 indicates that travel of the personal mobility vehicle 110 along the segment 120*f* of the route 130 should continue by following the route 130 by traveling slightly to the left and to a waypoint 1744 of the segment 120*f*.

The segment 120*g* may include travel along a slight curve 1740 in the route 130. As the personal mobility vehicle 110 travels along the segment 120*g*, the directional indicator 1506 of the computing device 1502 may be placed in a seventh state 1724. In the seventh state 1724, the light-emitting device 1524*b* of the directional indicator 1506 included in the computing device 1502 is illuminated (turned ON) while the light-emitting devices 1524*a*, and 1524*c-h* of the directional indicator 1506 are not illuminated (turned OFF). In the seventh state 1724, the directional indicator 1506 indicates that travel of the personal mobility vehicle 110 along the segment 120*g* of the route 130 should continue by following the route 130 by traveling slightly to the right and to a waypoint 1746 of the segment 120*g*.

The segment 120*h* may include travel through the intersection 144. As the personal mobility vehicle 110 travels along the segment 120*h*, the directional indicator 1506 of the computing device 1502 may be placed in an eighth state 1726. In the eighth state 1726, the light-emitting device 1524*a* of the directional indicator 1506 included in the computing device 1502 is illuminated (turned ON) while the light-emitting devices 1524*b-h* of the directional indicator 1506 are not illuminated (turned OFF). In the eighth state 1726, the directional indicator 1506 indicates forward (straight) travel of the personal mobility vehicle 110 along the segment 120*h* of the route 130, continuing forward travel through the intersection 144 and to a waypoint 1748 of the segment 120*h*.

As the personal mobility vehicle 110 travels along the segment 120*i*, the directional indicator 1506 of the computing device 1502 may be placed in a ninth state 1728. In the ninth state 1728, the light-emitting device 1524*a* of the directional indicator 1506 included in the computing device 1502 is illuminated (turned ON) while the light-emitting devices 1524*b-h* of the directional indicator 1506 are not illuminated (turned OFF). In the ninth state 1728, the directional indicator 1506 indicates forward (straight) travel of the personal mobility vehicle 110 along the segment 120*i* of the route 130 and to a waypoint 1750 of the segment 120*i*.

Figure 18:
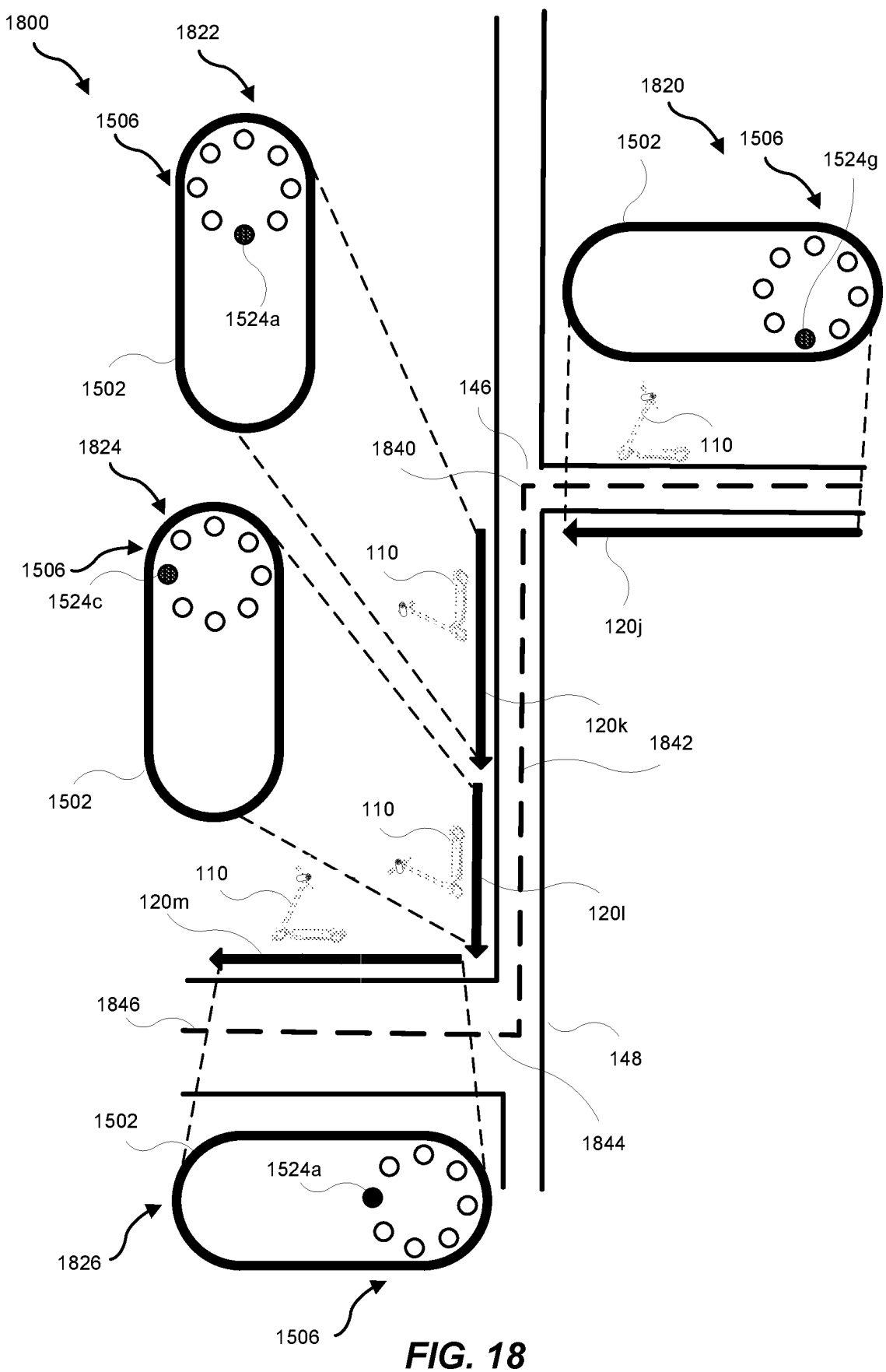
FIG. 18 is an illustration showing continuing travel of a personal mobility vehicle along third segments of a route.

FIG. 18 is an illustration 1800 showing continuing travel of the personal mobility vehicle 110 along segments 120*j-m* of the route 130. As the personal mobility vehicle 110 travels along the segments 120*j-m*, the directional indicator 1506 of the computing device 1502 may be placed in a tenth state 1820, an eleventh state 1822, a twelfth state 1824, and a thirteenth state 1826 respectively, helping the requestor 122 navigate the personal mobility vehicle 110 through a left hand turn at the intersection 146 and a right hand turn at the intersection 148.

As the personal mobility vehicle 110 travels along the segment 120*j*, the directional indicator 1506 of the computing device 1502 may be placed in the tenth state 1820. In the tenth state 1820, the light-emitting device 1524*g* of the directional indicator 1506 included in the computing device 1502 is illuminated (turned ON) while the light-emitting devices 1524*a-f* and 1524*h* of the directional indicator 1506 are not illuminated (turned OFF). In the tenth state 1820, the directional indicator 1506 indicates travel to the left, indicating the personal mobility vehicle turn left at the intersection 146 and to a waypoint 1840 of the segment 120*j*.

As the personal mobility vehicle 110 travels along the segment 120*k*, the directional indicator 1506 of the computing device 1502 may be placed in the eleventh state 1822. In the eleventh state 1822, the light-emitting device 1524*a* of the directional indicator 1506 included in the computing device 1502 is illuminated (turned ON) while the light-emitting devices 1524*b-h* of the directional indicator 1506 are not illuminated (turned OFF). In the eleventh state 1822, the directional indicator 1506 indicates forward (straight) travel of the personal mobility vehicle 110 along the segment 120*k* of the route 130 and to a waypoint 1842 of the segment 120*k*.

As the personal mobility vehicle 110 travels along the segment 120*l*, the directional indicator 1506 of the computing device 1502 may be placed in the twelfth state 1824. In the twelfth state 1824, the light-emitting device 1524*c* of the directional indicator 1506 included in the computing device 1502 is illuminated (turned ON) while the light-emitting devices 1524*a-b* and 1524*d-h* of the directional indicator 1506 are not illuminated (turned OFF). In the twelfth state 1824, the directional indicator 1506 indicates travel to the right, indicating the personal mobility vehicle turn right at the intersection 148 and to a waypoint 1844 of the segment 120*l*.

As the personal mobility vehicle 110 travels along the segment 120*m*, the directional indicator 1506 of the computing device 1502 is placed in the thirteenth state 1826. In the thirteenth state 1826, the light-emitting device 1524*a* of the directional indicator 1506 included in the computing device 1502 is illuminated (turned ON) while the light-emitting devices 1524*b-h* of the directional indicator 1506 are not illuminated (turned OFF). In the thirteenth state 1826, the directional indicator 1506 indicates forward (straight) travel of the personal mobility vehicle 110 along the segment 120*m* of the route 130 and to a waypoint 1846 of the segment 120*m*.

Figure 19:
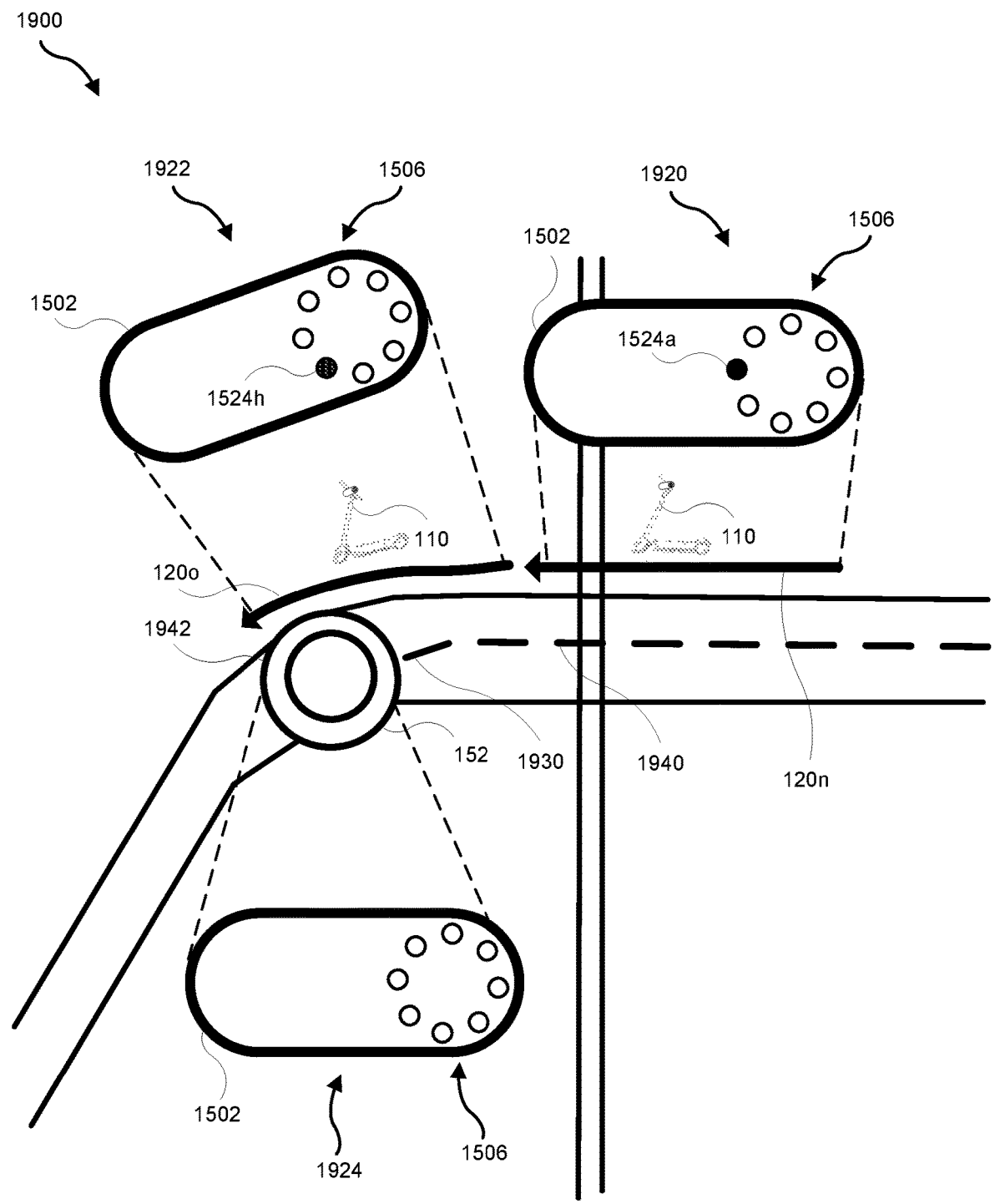
FIG. 19 is an illustration showing continuing travel of a personal mobility vehicle along fourth segments of a route to an ending location.

FIG. 19 is an illustration 1900 showing continuing travel of the personal mobility vehicle 110 along segments 120*n-o* of the route 130.

As the personal mobility vehicle 110 travels along the segment 120*n*, the directional indicator 1506 of the computing device 1502 may be placed in a fourteenth state 1920. In the fourteenth state 1920, the light-emitting device 1524*a* of the directional indicator 1506 included in the computing device 1502 is illuminated (turned ON) while the light-emitting devices 1524*b-h* of the directional indicator 1506 are not illuminated (turned OFF). In the fourteenth state 1920, the directional indicator 1506 indicates forward (straight) travel of the personal mobility vehicle 110 along the segment 120*n* of the route 130 and to a waypoint 1940 of the segment 120*n*.

The segment 120*o* may include travel along a slight curve 1930 in the route 130. As the personal mobility vehicle 110 travels along the segment 120*o* to the ending location 152, the directional indicator 1506 of the computing device 1502 may be placed in a fifteenth state 1922. In the fifteenth state 1922, the light-emitting device 1524*h* of the directional indicator 1506 included in the computing device 1502 is illuminated (turned ON) while the light-emitting devices 1524*a-g* of the directional indicator 1506 are not illuminated (turned OFF). In the fifteenth state 1922, the directional indicator 1506 indicates that travel of the personal mobility vehicle 110 along the segment 1200 of the route 130 should continue by following the route 130 by traveling slightly to the left to the ending location 152, which may be considered a waypoint 1942 of the segment 1200.

At the ending location 152, the light-emitting devices 1524*a-h* of the directional indicator 1506 are not illuminated (turned OFF) indicating the personal mobility vehicle 110 is no longer in use. The directional indicator 1506 of the computing device 1502 may be placed in a sixteenth state 1924.

Referring to FIGS. 16-19, the computing device 1502, and the directional indicator 1506, any of the computing devices and/or directional indicators discussed herein may be used instead of and/or in place of the computing device 1502 and the directional indicator 1506. In addition, or in the alternative, the control of the illumination of the light-emitting devices 1524*a-h* of the directional indicator 1506 may be performed in any of the ways discussed herein (e.g., blinking, multicolor, animation, etc.).

Figure 20:
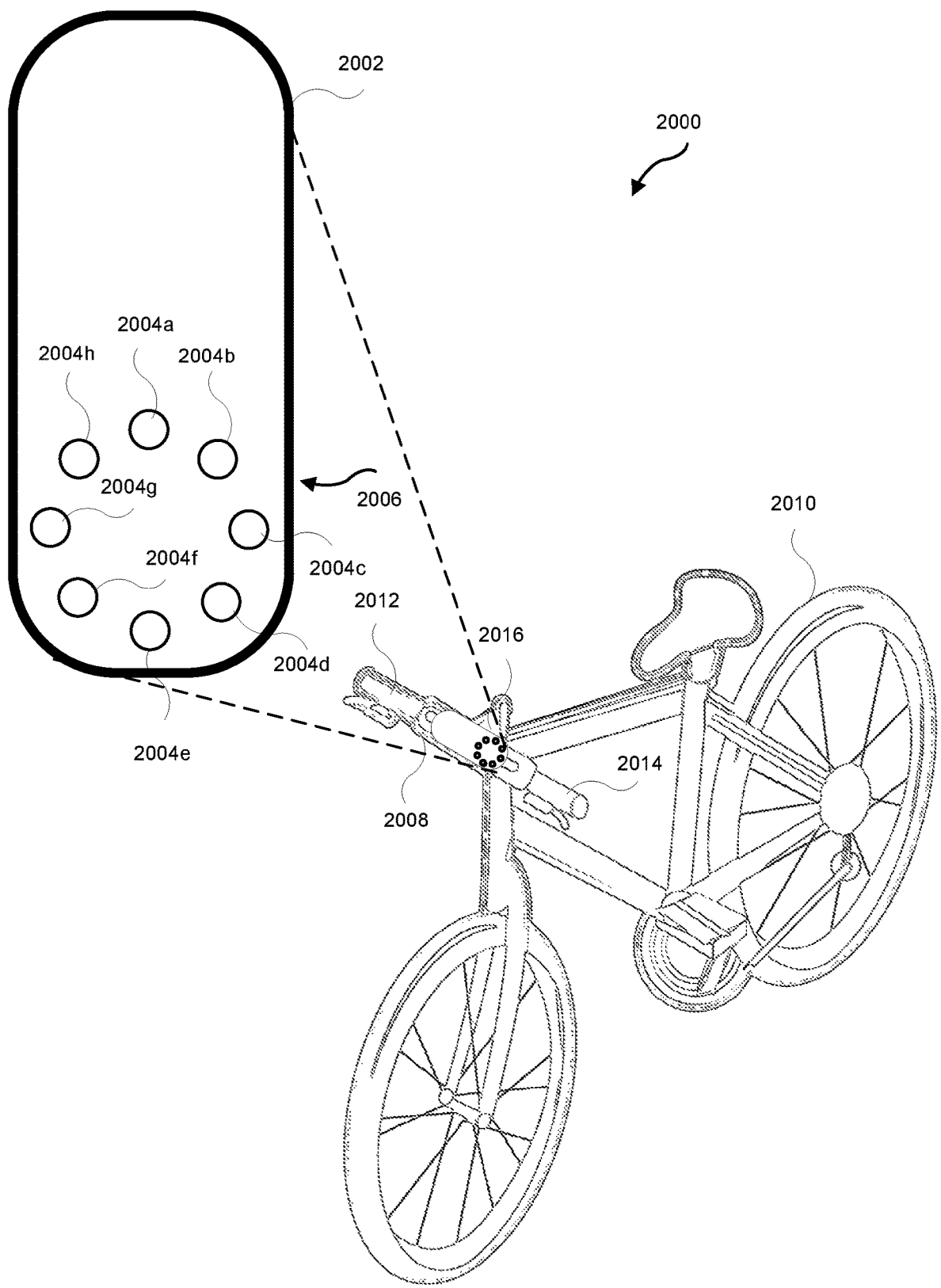
FIG. 20 is an illustration of an example computing device mounted on a bicycle that includes light-emitting devices in a first configuration for use as a directional indicator.

FIG. 20 is an illustration of an alternative implementation 2000 of an example computing device 2002 for mounting on a bicycle 2010 that includes light-emitting devices 2004*a-h* for use as a directional indicator 2006. The bicycle 2010 may be used as a personal mobility vehicle by a requestor to fulfill a transportation request as described herein. In addition, or in the alternative, any of the computing devices and/or directional indicators discussed herein may be used instead of and/or in place of the computing device 2002 and the directional indicator 2006. In addition, or in the alternative, the control of the illumination of the light-emitting devices 2004*a-h* of the directional indicator 2006 may be performed in any of the ways discussed herein (e.g., blinking, multicolor, animation, etc.).

In the alternative implementation 2000, the example computing device 2002 may be mounted on (coupled to) the bicycle 2010 at a location where a rider may easily view and interpret the directional information provided by the light-emitting devices 2004*a-h* (a bearing of the bicycle 2010 along a route of travel as described herein with reference to additional implementations included in, for example, FIG. 4, FIG. 6, FIG. 8, FIG. 10, and FIG. 12). Referring to FIG. 20, the computing device 2002 may be mounted on a handlebar 2008 between a first handle 2012 and a second handle 2014 (e.g., at a point 2016 in the middle or center of the handlebar 2008 and between the first handle 2012 and the second handle 2014).

Figure 21B:
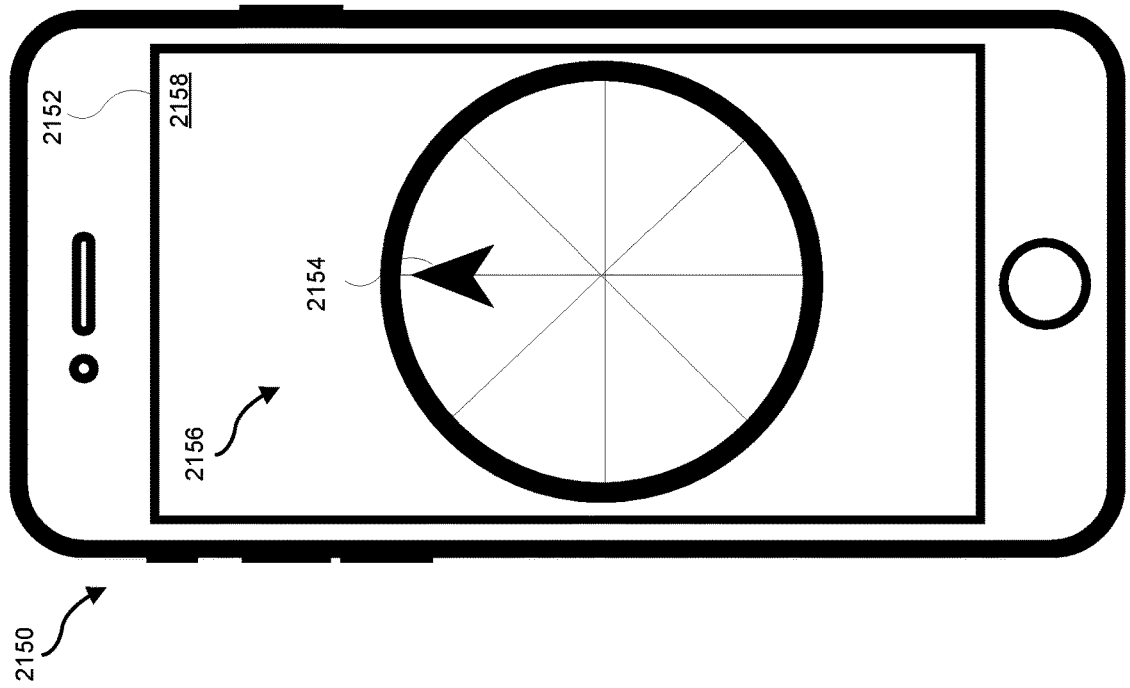
FIG. 21B is an illustration of an example computing device of a transportation requestor that includes a display device showing a second example of a directional indicator in a graphical user interface displayed on the display device.
Figure 21A:
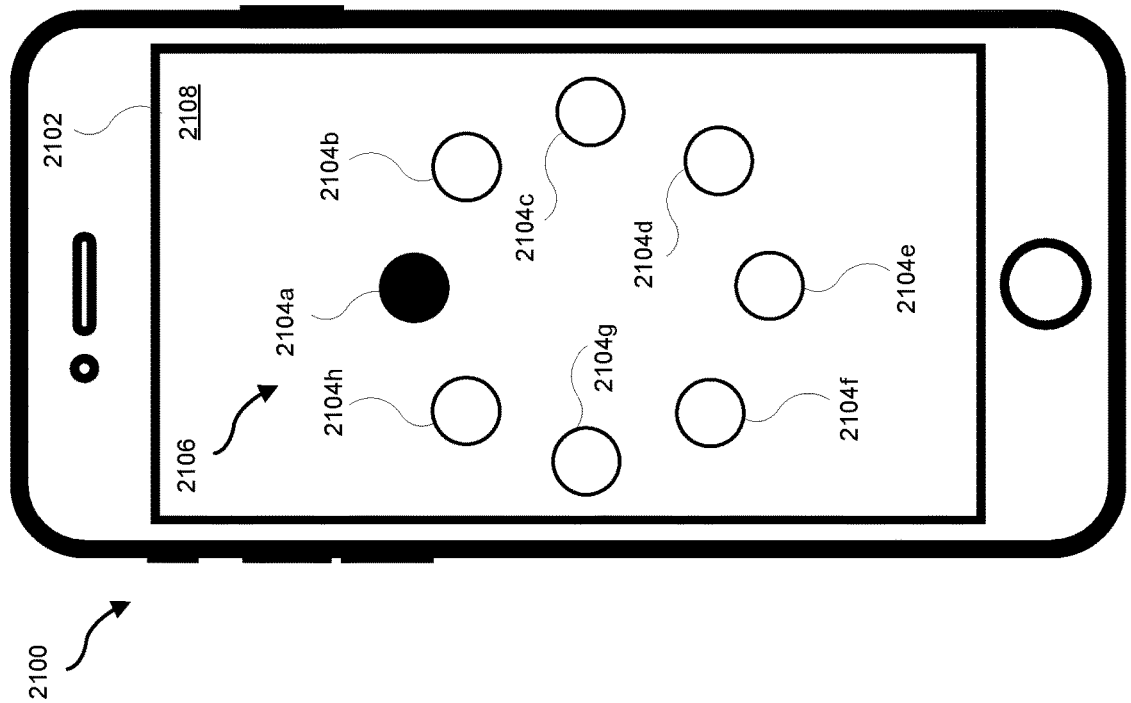
FIG. 21A is an illustration of an example computing device of a transportation requestor that includes a display device showing a first example of a directional indicator in a graphical user interface displayed on the display device.

FIG. 21A is an illustration of an example computing device 2100 of a transportation requestor (e.g., the requestor 122 as shown in FIG. 1) that includes a display device 2102 showing (displaying) a directional indicator 2106 in a graphical user interface 2108 displayed on the display device 2102. For example, the directional indicator 2106 may provide a visual indication of a direction of travel of a personal mobility vehicle for use by the transportation requestor. The directional indicator 2106 may include areas 2104*a-h* that may be illuminated or not illuminated to indicate a direction of travel of the transportation requestor when riding a personal mobility vehicle. For example, the control of the illuminating (and not illuminating) of the areas 2104*a-h* may be controlled by the computing device 2100 in a manner similar to the control of the turning on and off of light-emitting devices included in the example computing devices mounted on (coupled to) the personal mobility vehicles as described herein when navigating the personal mobility vehicle along a route of travel. Though shown as circles, the areas 2104*a-h* may be any geometric shape that may include, but is not limited to, an oval, a square, a diamond, a star, or a rectangle. Though shown as areas 2104*a-h*, the directional indicator 2106 may include a number of areas corresponding to the number of light-emitting devices as shown, for example, in FIGS. 4, 6, 8, 10, and 12. As shown with reference to FIGS. 4, 6, 8, 10, and 12, the location, size, and or shape of the areas for implementing the directional indicator in the graphical user interface on the display device 2102 may vary in size and/or shape.

FIG. 21B is an illustration of an example computing device 2150 of a transportation requestor (e.g., the requestor 122 as shown in FIG. 1) that includes a display device 2152 showing (displaying) a directional indicator 2156 in a graphical user interface 2158 displayed on the display device 2152. For example, the directional indicator 2156 may provide a visual indication of a direction of travel of a personal mobility vehicle for use by the transportation requestor. The directional indicator 2156 may be a type of digital compass where an arrow 2154 indicates a direction of travel of the personal mobility vehicle. For example, the location of the arrow 2154 along the directional indicator 2156 may be controlled by the computing device 2150 in a manner similar to the control of the turning on and off of light-emitting devices included in the example computing devices mounted on (coupled to) the personal mobility vehicles as described herein when navigating the personal mobility vehicle along a route of travel.

In some implementations, a display device (e.g., a liquid crystal display device, an organic light-emitting diode (OLED) display device) may be included in (be part of) a computing device that may be mounted on (coupled to) a personal mobility vehicle as described herein. The display device may be configured to display an illumination pattern similar to the directional indicator 2156 displayed on the display device 2152. The illumination pattern may be selected in order to display navigational information as described herein. For example, the display device may display navigational information as a type of digital compass as shown with reference to FIG. 21B.

The directional indicator 2106 and the directional indicator 2156 indicate that the requestor should continue travel in a forward direction, continuing along a route of travel.

In some implementations, a personal mobility vehicle may include a bracket or other type of mounting device that may allow the transportation requestor to mount (couple) the computing device 2100 or the computing device 2150 to a personal mobility vehicle for use in navigating the personal mobility vehicle along a route of travel.

In some implementations, each of the areas 2104*a-h* may be part of (may form) an illumination pattern of areas or spots on a display device (e.g., a liquid crystal display device, an organic light-emitting diode (OLED) display device). The illumination pattern may be selected in order to display navigational information as described herein. For example, the display device may display navigational information as a type of digital compass where one or more of the areas 2104*a-h* may be illuminated to indicate a direction of travel of the personal mobility vehicle.

Figure 22:
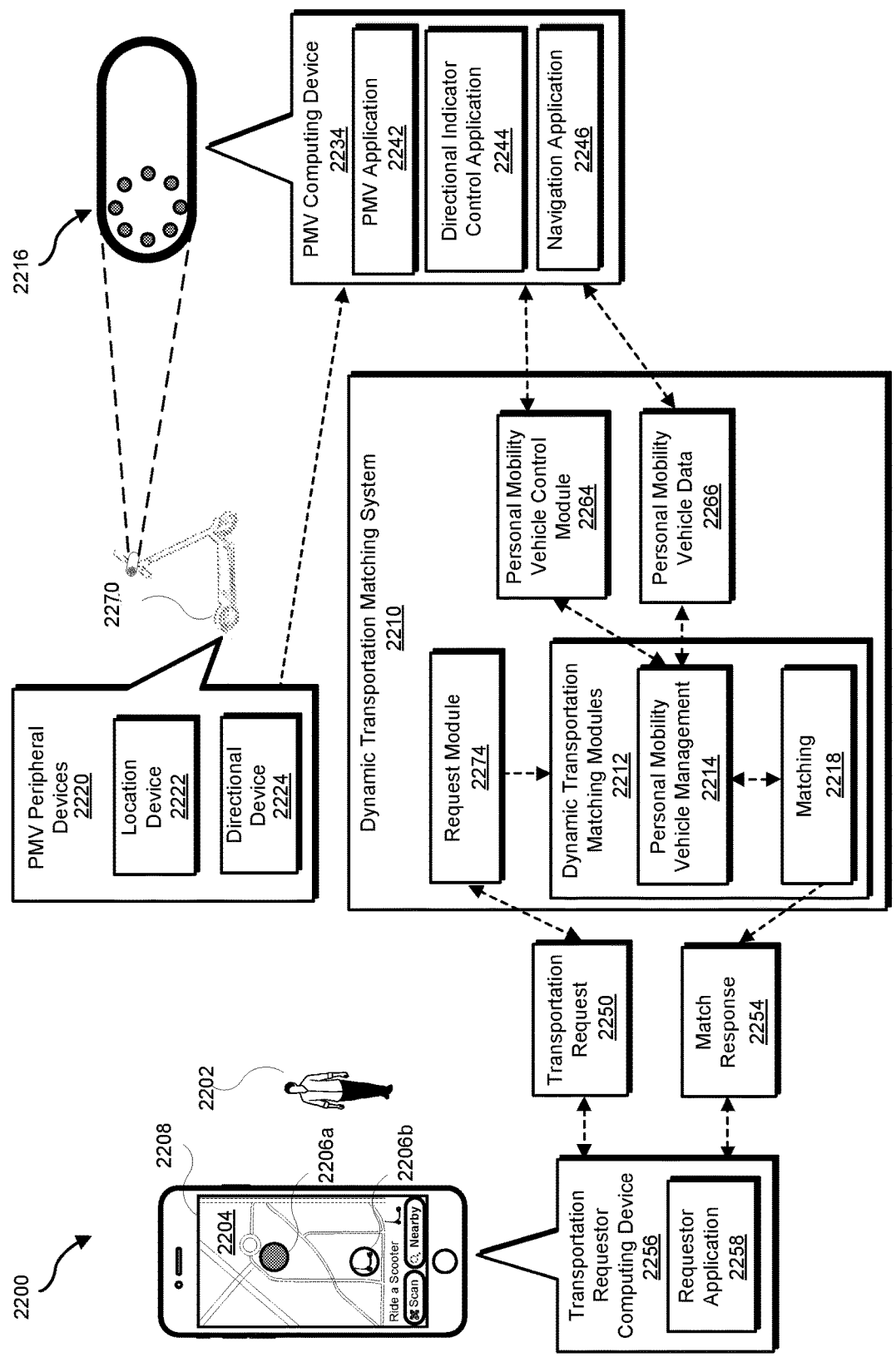
FIG. 22 is a block diagram of an example system for matching transportation requests with a dynamic transportation network that includes personal mobility vehicles with mounted computing devices that include light-emitting devices for use as directional indicators.

FIG. 22 is a block diagram of an example system 2200 for matching transportation requests with a dynamic transportation network that includes personal mobility vehicles with mounted computing devices that include light-emitting devices for use as directional indicators. FIG. 22 shows a computing device of a transportation requestor 2202 (transportation requestor computing device 2256) interacting/interfacing with a dynamic transportation matching system 2210 that further interacts/interfaces with a personal mobility vehicle computing device 2234 mounted on (coupled to) a personal mobility vehicle 2270. For example, referring to FIG. 1 and FIGS. 15A-C, the computing device 1502 may be the transportation requestor computing device 2256 and the requestor 102 may be the requestor 2202. For example, referring to FIG. 1 and FIGS. 15A-C, the personal mobility vehicle computing device 2234 that may be mounted on (coupled to) the personal mobility vehicle 2270 may be the computing device 1512 that may be mounted on (coupled to) the personal mobility vehicle 110.

As shown in FIG. 22, a dynamic transportation matching system 2210 may be configured with one or more dynamic transportation matching modules 2212 that may perform one or more of the steps described herein. The dynamic transportation matching system 2210 may represent any computing system and/or set of computing systems capable of matching transportation requests. The dynamic transportation matching system 2210 may be in communication with the personal mobility vehicle computing device 2234. In some implementations, the dynamic transportation matching system 2210 may be in communication with more than one (e.g., two or more) personal mobility vehicle computing devices coupled to respective personal mobility vehicles.

The personal mobility vehicle 2270 may represent any personal mobility vehicle that may fulfill transportation requests. In some examples, the personal mobility vehicle 2270 may represent disparate personal mobility vehicle types and/or models. In some examples, the personal mobility vehicle 2270 may represent standard commercially available personal mobility vehicles. In some examples, the personal mobility vehicle 2270 may be human-operated. In some examples, the personal mobility vehicle 2270 may also be partly autonomous (or fully autonomous). Accordingly, throughout the instant disclosure, references to a "transportation provider" (or "provider") may, where appropriate, refer to a vehicle piloted by a requestor, and/or an autonomous system for piloting a vehicle. While FIG. 22 does not specify a number of personal mobility vehicles, it may be readily appreciated that the systems described herein are applicable to hundreds of personal mobility vehicles, thousands of personal mobility vehicles, or more. In some examples, the personal mobility vehicle 2270 may be included in a dynamic transportation network that may provide (supply) transportation on an on-demand basis to transportation requestors.

As described herein, the dynamic transportation matching system 2210 may communicate with the transportation requestor computing device 2256 and the personal mobility vehicle computing device 2234. The transportation requestor computing device 2256 and the personal mobility vehicle computing device 2234 may be any suitable type of computing device. As described herein, the personal mobility vehicle computing device 2234 may be mounted on or otherwise coupled to the personal mobility vehicle 2270. In some examples, the transportation requestor computing device 2256 and/or the personal mobility vehicle computing device 2234 may be mobile devices. For example, the transportation requestor computing device 2256 and/or the personal mobility vehicle computing device 2234 may be a smartphone.

Additionally, or alternatively, the transportation requestor computing device 2256 and/or the personal mobility vehicle computing device 2234 may be tablet computers, personal digital assistants, or any other type or form of mobile computing device. According to some examples, the transportation requestor computing device 2256 and/or the personal mobility vehicle computing device 2234 may include wearable computing devices (e.g., a driver-wearable computing device), such as smart glasses, smart watches, etc. In some examples, the transportation requestor computing device 2256 and/or the personal mobility vehicle computing device 2234 may be a device suitable for temporarily mounting on a personal mobility vehicle (e.g., for use by a requestor and/or provider for a transportation matching application, a navigation application, and/or any other application suited for the use of requestors and/or providers). Additionally, or alternatively, the personal mobility vehicle computing device 2234 may be a device suitable for permanently mounting on or coupling to a personal mobility vehicle that has a personal mobility vehicle application installed on the computer (e.g., personal mobility vehicle application 2242) to provide transportation services to transportation requestors and/or to communicate with the dynamic transportation matching system 2210.

As shown in FIG. 22, the personal mobility vehicle computing device 2234 may include the personal mobility vehicle (PMV) application 2242. The PMV application 2242 may represent any application, program, and/or module that may provide one or more services related to operating a personal mobility vehicle and/or providing transportation matching services. In addition, and as is described in greater detail herein, the PMV application 2242 may provide the dynamic transportation matching system 2210 with information about the PMV (including, e.g., a current location of the personal mobility vehicle) to enable the dynamic transportation matching system 2210 to provide dynamic transportation matching and/or management services for the provider and one or more requestors.

The personal mobility vehicle 2270 may have one or more personal mobility vehicle peripheral devices 2220 mounted on (coupled to) the personal mobility vehicle 2270. For example, the personal mobility vehicle peripheral devices 2220 may include a location device 2222 and/or a directional device 2224. For example, the directional device 2224 may determine a current direction of travel (e.g., north, south, east, west, or any combination) based on a current orientation of the personal mobility vehicle 2270 (a current orientation of the directional indicator 2216). The location device 2222 may identify a current location of the personal mobility vehicle 2270 in geolocation coordinates (e.g., latitude, longitude, global positioning system (GPS) coordinates).

For example, the location device 2222 alone or in combination with the directional device 2224 may provide information and data to the personal mobility vehicle computing device 2234 for use by a navigation application 2246 included in the PMV computing device 2234. The navigation application 2246 may provide location information identifying a current location of the personal mobility vehicle 2270 to a personal mobility vehicle data module 2266 included in the dynamic transportation matching system 2210. The personal mobility vehicle computing device 2234 may also provide availability information for the personal mobility vehicle 2270 (e.g., if the personal mobility vehicle 2270 is currently in use, if the personal mobility vehicle 2270 is available for use (e.g., the personal mobility vehicle is not currently in use, a battery of the personal mobility vehicle is fully charged, etc.)).

Other personal mobility vehicle computing devices associated with respective personal mobility vehicles may also provide location and availability information of the respective personal mobility vehicle to the personal mobility vehicle data module 2266. A personal mobility vehicle management module 2214 may access the personal mobility vehicle data module 2266 when determining the availability of and locations of personal mobility vehicles. The personal mobility vehicle management module 2214 may interface with a matching module 2218 when matching a personal mobility vehicle with a requestor using the location and availability information.

In some examples, the PMV application 2242 may coordinate communications and/or a payment with the dynamic transportation matching system 2210. For example, the payment may be between the requestor and the dynamic transportation matching system 2210. According to some embodiments, the PMV application 2242 may provide a map service, a navigation service, a traffic notification service, and/or a geolocation service. In some implementations, the navigation service and/or the geolocation service may be implemented by a navigation application 2246.

Embodiments of the instant disclosure may include or be implemented in conjunction with the dynamic transportation matching system. A transportation matching system may arrange transportation on an on-demand and/or ad-hoc basis by, e.g., matching one or more transportation requestors with one or more transportation providers. For example, a transportation matching system may provide one or more transportation matching services for a ridesharing service, a ride sourcing service, an autonomous vehicle service, a personal mobility vehicle service, or some combination and/or derivative thereof. The transportation matching system may include and/or interface with any of a variety of subsystems that may implement, support, and/or improve a transportation matching service. For example, the transportation matching system may include a matching system (e.g., that matches requestors to ride opportunities), a mapping system, a navigation system (e.g., to help a requestor reach and/or locate a personal mobility vehicle, and/or to help a requestor reach a destination using a personal mobility vehicle), a reputation system (e.g., to rate and/or gauge the trustworthiness of a requestor), a payment system, and/or an autonomous or semi-autonomous driving system. The transportation matching system may be implemented on various platforms, including a requestor-owned mobile device, a server computer system, or any other hardware platform capable of providing transportation matching services to one or more requestors.

As shown in FIG. 22, the dynamic transportation matching system 2210 may include dynamic transportation matching modules 2212, a request module 2274, a personal mobility vehicle control module 2264, and a personal mobility vehicle data module 2266 that may perform one or more of the processes, methods, or steps described herein. In some embodiments, the request module 2274, the personal mobility vehicle control module 2264, and/or the personal mobility vehicle data module 2266 may be configured using a single module or multiple modules.

The dynamic transportation matching system 2210 may receive a transportation request 2250 at the request module 2274 from a transportation requestor computing device 2256 of the transportation requestor 2202. The transportation requestor computing device 2256 may include a requestor application 2258. The requestor application 2258 may be an application, a program, and/or a module that may provide one or more services related to the providing of on-demand transportation and services that may include contacting a transportation service to request transportation and completing the transportation request and/or a trip using a personal mobility vehicle.

For example, a personal mobility vehicle (e.g. the PMV computing device 2234 of the personal mobility vehicle 2270) may provide personal mobility vehicle data to the personal mobility vehicle data module 2266. The personal mobility vehicle data module 2266 may provide the data to the personal mobility vehicle management module 2214 for use by the dynamic transportation matching system 2210. The personal mobility vehicle data can include information about the personal mobility vehicle 2270. The information can include, but is not limited to, a geographic location of the personal mobility vehicle 2270, the availability of the personal mobility vehicle 2270 (e.g., has it been reserved, is it functional (e.g., battery is charged)), etc.

The matching module 2218 included in the dynamic transportation matching modules 2212 may match the transportation requestor 2202 with the personal mobility vehicle 2270, as described herein, using information provided by the personal mobility vehicle management module 2214. The matching module 2218 may provide a match 2254 to the transportation requestor computing device 2256 that includes information about the personal mobility vehicle 2270 for use in completing a transportation request and/or a trip.

As shown in FIG. 22, the transportation requestor computing device 2256 may include a display device 2208 showing (displaying) a map 2204 with indications of locations of available personal mobility vehicles (e.g., personal mobility vehicle indicators 2206*a-b*). In the example shown in FIG. 22, the personal mobility vehicle indicator 2206*a* is associated with the personal mobility vehicle 2270. The map 2204 may show the personal mobility vehicle indicator 2206*a* highlighted in some manner to indicate to the requestor that the requestor has been matched with the personal mobility vehicle 2270.

A directional indication control application 2244 may control a directional indicator 2216 included in the PMV computing device 2234. The directional indicator 2216 may be controlled and operate as any of the directional indicators discussed herein. The directional indication control application 2244 may control the illumination of light-emitting devices that comprise the directional indicator 2216.

As discussed herein, the control of the illumination of the light-emitting devices included in the directional indicator 2216 may be based on a planned route of travel and current location and directional information of the personal mobility vehicle 2270. For example, once the requestor 2202 is matched with the personal mobility vehicle 2270, the dynamic transportation matching system 2210 may determine a route of travel for a trip. In some implementations, the personal mobility vehicle control module 2264 may communicate with the PMV computing device 2234 during the travel of the personal mobility vehicle 2270 along the route, providing navigation information to the navigation application 2246, which also receives current location information for the personal mobility vehicle 2270 from the PMV peripheral devices 2220. In some implementations, the personal mobility vehicle control module 2264 may provide (download) the route of travel to the PMV computing device 2234 for storage in memory.

Based on the received navigation information and the current location information for the personal mobility vehicle 2270, the directional indication control application 2244 may determine the illumination of the light-emitting devices included in the directional indicator 2216 to direct (navigate) the personal mobility vehicle 2270 along the route, as described herein. For example, based on current location information for the personal mobility vehicle 2270 as determined by the location device 2222 and based on a current direction of travel of the personal mobility vehicle 2270 as determined by the directional device 2224, the navigation application 2246 may determine how travel of the personal mobility vehicle 2270 along the route should proceed. The travel information may be provided to the directional indication control application 2244 which may then determine how to control the illumination of the light-emitting devices of the directional indicator 2216 to communicate directional information to the requestor 2202 as the requestor 2202 rides (uses) the personal mobility vehicle 2270 for travel along the route.

Figure 23:
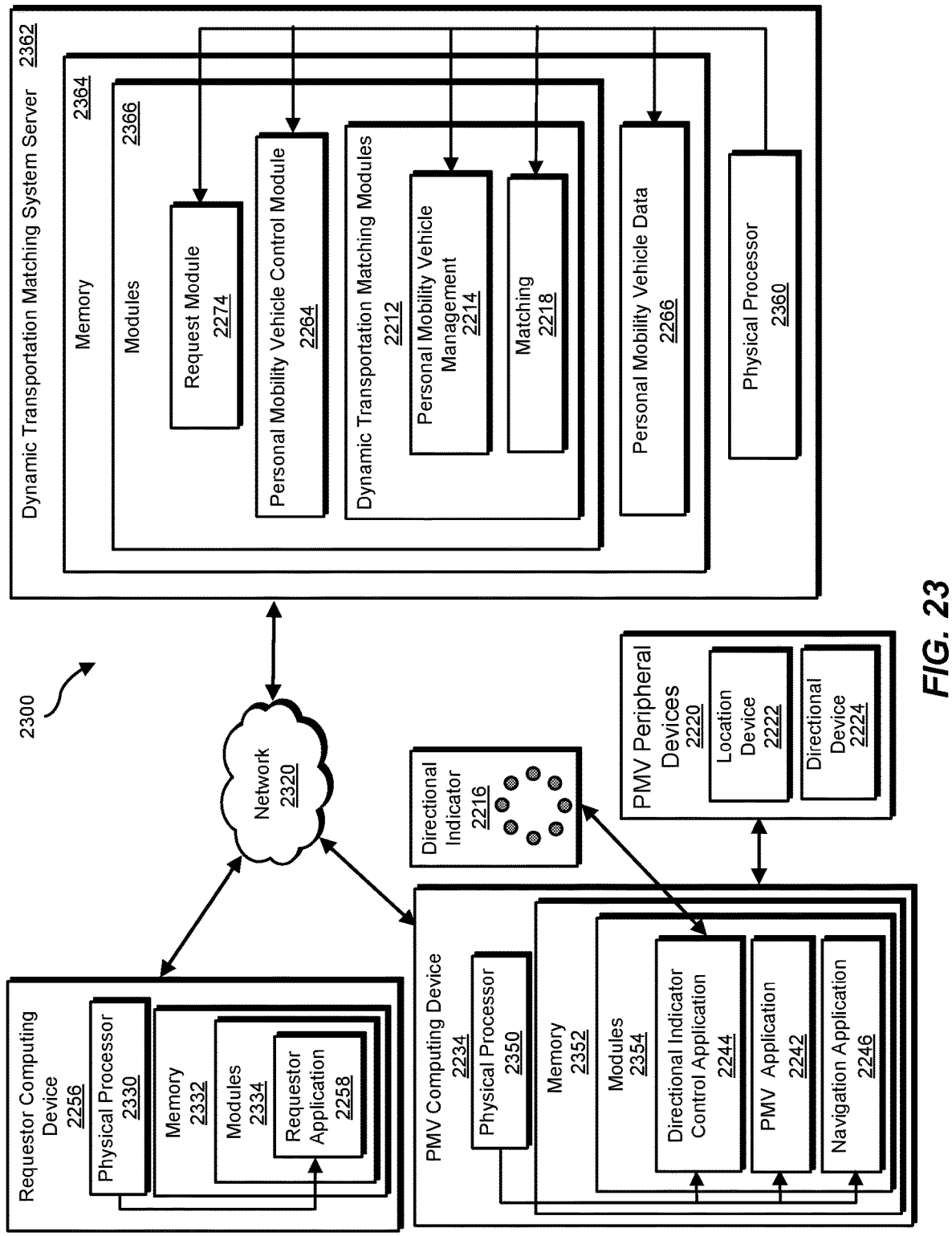
FIG. 23 is a block diagram of an example transportation matching system that utilizes and controls personal mobility vehicles with mounted computing devices that include light-emitting devices for use as directional indicators.

FIG. 23 is a block diagram of an example transportation management system 2300 that utilizes and controls personal mobility vehicles with mounted computing devices that include light-emitting devices for use as directional indicators.

Referring at times to FIG. 22, the transportation management system 2300 may include a dynamic transportation matching system server 2362. The dynamic transportation matching system server 2362 may include a memory 2364 which may include one or more modules 2366 and the personal mobility vehicle data module 2266. The module(s) 2366 may include the dynamic transportation matching modules 2212, the request module 2274, and the personal mobility vehicle control module 2264. The dynamic transportation matching system server 2362 may include at least one physical processor 2360. In some implementations, the dynamic transportation matching system 2210 may be included as part of the dynamic transportation matching system server 2362.

The transportation management system 2300 may include the transportation requestor computing device 2256 that is communicatively coupled to the dynamic transportation matching system server 2362 by way of a network 2320. The transportation management system 2300 may include the personal mobility vehicle computing device 2234 that is communicatively coupled to the dynamic transportation matching system server 2362 by way of the network 2320.

The transportation requestor computing device 2256 includes a memory 2332 which may include one or more modules 2334. The module(s) 2334 may include the requestor application 2258. The transportation requestor computing device 2356 may include at least one physical processor 2330.

The personal mobility vehicle computing device 2234 includes a memory 2352 which may include one or more modules 2354. The module(s) 2354 may include the PMV application 2242, the directional indicator control application 2244, and the navigation application 2246. The personal mobility vehicle computing device 2234 may include at least one physical processor 2350.

As detailed above, the computing devices and systems described and/or illustrated herein broadly represent any type or form of computing device or system capable of executing computer-readable instructions, such as those contained within the modules and applications described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the applications and/or modules described herein. Examples of memory devices may include, but are not limited to, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory devices. In another example, a physical processor may execute computer-readable instructions included in one or more of the applications and/or modules stored in the above-described memory devices. Examples of physical processors may include, but are not limited to, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain implementations one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data regarding cancelled transportation requests to be transformed. One or more of the modules recited herein may transform the cancelled transportation request related data that may include information regarding external factors as well as progress information for a transportation provider. One or more of the modules recited herein may output a result of the transformation to create, update, and/or modify one or more data-driven models using machine learning. One or more of the modules recited herein may use the result of the transformation to identify a transportation requestor matched with a first transportation provider whose match is eligible for cancellation. One or more of the modules recited herein may use the result of the transformation to identify a second transportation provider for matching with the transportation requestor responsive to the cancellation of the matching of the transportation requestor with the first transportation provider. One or more of the modules recited herein may store the result of the transformation. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

FIG. 24 is a flow diagram of an exemplary computer-implemented method 2400 for using light-emitting devices included in a computing device mounted on a personal mobility vehicle for use as a directional indicator. The steps shown in FIG. 24 may be performed by any suitable computer-executable code and/or computing system, including the system(s) illustrated in FIG. 22 and FIG. 23. In one example, each of the steps shown in FIG. 23 may represent an algorithm whose structure includes and/or is represented by multiple sub-steps, examples of which will be provided in greater detail below.

As illustrated in FIG. 24, at step 2402 one or more of the systems described herein may receive, by a computing device, directional information for a waypoint along a route of travel of a personal mobility vehicle. For example, the PMV computing device 2244 may receive directional information from the dynamic transportation matching system 2210 for a route of travel of the personal mobility vehicle 2270 that includes a waypoint along the route of travel.

The systems described herein may perform step 2402 in a variety of ways.

In one example, the PMV computing device 2244 may receive the directional information for a route of travel of the personal mobility vehicle 2270 from the dynamic transportation matching system 2210 by way of the network 2220. In some implementations, the directional information may be received as the personal mobility vehicle 2270 travels along the route. In some implementations, the directional information may be received for the entire route and download and saved in the memory 2352 included on the personal mobility vehicle computing device 2234. In some implementations, the received directional information may include one or more waypoints along the route of travel for use in navigating the personal mobility vehicle 2270 along the route.

At step 2404 one or more of the systems described herein may determine, by the computing device and based on the directional information, a bearing of the waypoint from a current location of the personal mobility vehicle. For example, as described with reference to FIGS. 3A-B, FIGS. 5A-E, FIGS. 7A-E, FIGS. 9A-D, FIGS. 11A-C, and FIGS. 13A-C, a personal mobility vehicle may travel from an ingress point or entry point (e.g., a current location of the personal mobility vehicle) of a trip segment included in a route of travel of the personal mobility vehicle to a waypoint of the trip segment.

The systems described herein may perform step 2404 in a variety of ways. In one example, the navigation application 2246 may use the received directional information for the waypoint along the route of travel of the personal mobility vehicle 2270 along with real-time location and directional information provided by the location device 2222 and the directional device 2224 to determine a bearing of the waypoint from a current location of the personal mobility vehicle.

At step 2406 one or more of the systems described herein may display, by a display device included in the personal mobility vehicle and configured to display navigational information within an illumination pattern, an indication of the bearing within the illumination pattern for navigating the personal mobility vehicle along the route of travel to the waypoint. For example, as described with reference to FIGS. 3A-D, FIGS. 5A-E, FIGS. 7A-E, FIGS. 9A-D, FIGS. 11A-C, and FIGS. 13A-C, an example computing device mounted on (coupled to) a personal mobility vehicle may include a display device for use as a directional indicator configured to display navigational information within an illumination pattern as shown, for example, in FIGS. 3B-D, FIGS. 5B-E, FIGS. 7B-E, FIGS. 9B-D, FIGS. 11B-C, and FIGS. 13B-C. The illumination pattern may provide an indication of the bearing for navigating the personal mobility vehicle along the route of travel to the waypoint.

The systems described herein may perform step 2406 in a variety of ways. In one example, the directional indicator control application 2244 included in the PMV computing device 2234 may control the illumination of the light-emitting devices included in the directional indicator 2216 on the personal mobility vehicle 2270. As described herein, the navigation application 2246 may use the received directional information for the route of travel of the personal mobility vehicle 2270 along with real-time location and directional information provided by the location device 2222 and the directional device 2224 to provide an indication of a direction of travel of the personal mobility vehicle 2270 along the route (e.g., a bearing of the waypoint from a current location of the personal mobility vehicle) on the directional indicator 2216 for use by a requestor when navigating the personal mobility vehicle 2270 along the route of travel.

In some examples, a computer-implemented method may include receiving, by a computing device, directional information for a waypoint along a route of travel of a personal mobility vehicle, determining, by the computing device and based on the directional information, a bearing of the waypoint from a current location of the personal mobility vehicle, and displaying, by a display device included in the personal mobility vehicle and configured to display navigational information within an illumination pattern, an indication of the bearing within the illumination pattern for navigating the personal mobility vehicle along the route of travel to the waypoint.

In some examples, the personal mobility vehicle may include a handlebar.

In some examples, the display device may be mounted between a first handle of the handlebar and a second handle of the handlebar.

In some examples, displaying the indication of the bearing within the illumination pattern may include illuminating one or more portions of the illumination pattern.

In some examples, the illumination pattern may be a circular pattern of illumination devices.

In some examples, displaying the indication of the bearing within the illumination pattern may include displaying the bearing within the circular pattern for navigating the personal mobility vehicle along the route of travel to the waypoint.

In some examples, displaying the bearing within the circular pattern of illumination devices may include illuminating a portion of the circular pattern of illumination devices that indicate a direction along the route of travel to the waypoint.

In some examples, displaying the bearing within the circular pattern of illumination devices may further include illuminating another portion of the circular pattern of illumination devices to indicate a change in a direction of travel along the route of travel to the waypoint In some examples, the illumination devices may include light-emitting diodes.

In some examples, the computer-implemented method may include displaying, by the display device, an indication of a matching of the personal mobility vehicle with a requestor comprising illuminating at least a portion of the illumination pattern.

In some examples, the illumination pattern may be representative of a digital compass.

In some examples, displaying an indication of the bearing within the illumination pattern may include displaying the indication of the bearing within the digital compass for navigating the personal mobility vehicle along the route of travel to the waypoint.

A corresponding system may include a personal mobility vehicle comprising a display device configured to display navigational information within an illumination pattern, and a computing device configured to receive directional information for a waypoint a route of travel for the personal mobility vehicle, determine, based on the directional information, a bearing of the waypoint from a current location of the personal mobility vehicle, and cause the display device to indicate the bearing within the illumination pattern for navigating the personal mobility vehicle along the route of travel to the waypoint.

A corresponding non-transitory computer-readable storage medium may include computer-readable instructions that, when executed by at least one processor of a computing device, cause the computing device to receive directional information for a waypoint along a route of travel of a personal mobility vehicle, determine, based on the directional information, a bearing of the waypoint from a current location of the personal mobility vehicle, and display, by a display device included in the personal mobility vehicle and configured to display navigational information within an illumination pattern, an indication of the bearing within the illumination pattern for navigating the personal mobility vehicle along the route of travel to the waypoint.

Features from any of the above-mentioned examples may be used in combination with one another in accordance with the general principles described herein. These and other examples, embodiments, features, and advantages will be more fully understood upon reading the detailed description in conjunction with the accompanying drawings and claims.

Discussed herein are devices, systems, and methods for providing navigation information for personal mobility vehicles (e.g., for scooters and bikes) that can be quickly and reliably interpreted by a requestor while riding the personal mobility vehicle along a route of travel. In some implementations, a configuration of light-emitting devices may be a ring of LEDs that may be mounted on (or otherwise coupled to) a personal mobility vehicle. The ring of LEDs may be used to represent relative headings along a route of travel. As a personal mobility vehicle is navigated from a staring location to an ending location or destination, portions of the LED ring (e.g., one or more LEDs) may be illuminated to provide navigation information to the rider.

In one example, a portion of the LED ring may illuminate to indicate a heading toward which the user should travel (e.g., indicating the bearing of the ultimate or an intermediate destination). In other examples, portions of the LED ring may illuminate with various animations and/or colors to provide navigation directions or related indications (e.g., signaling an upcoming turn, a U-turn, indicating a do-not-ride or do-not-park zone, etc.). The ring of LEDs may be simple (e.g., eight LEDs arranged in a single circle as shown for example in FIG. 2) or more complex (e.g., an outer circle of LEDs, an inner circle of LEDs, and a central LED as shown for example in FIG. 8 and FIG. 10) to allow for more complex illumination patterns.

Advantages of using LEDs for the light-emitting devices of the directional indicators as described herein may be one or more of low power consumption, small size, fast switching, physical robustness, long lasting life, and a variety of control options (e.g., solid ON, OFF, variable blinking rate, variable brightness levels, variable colors, etc.) for use in providing an indication of multiple conditions.

Figure 25:
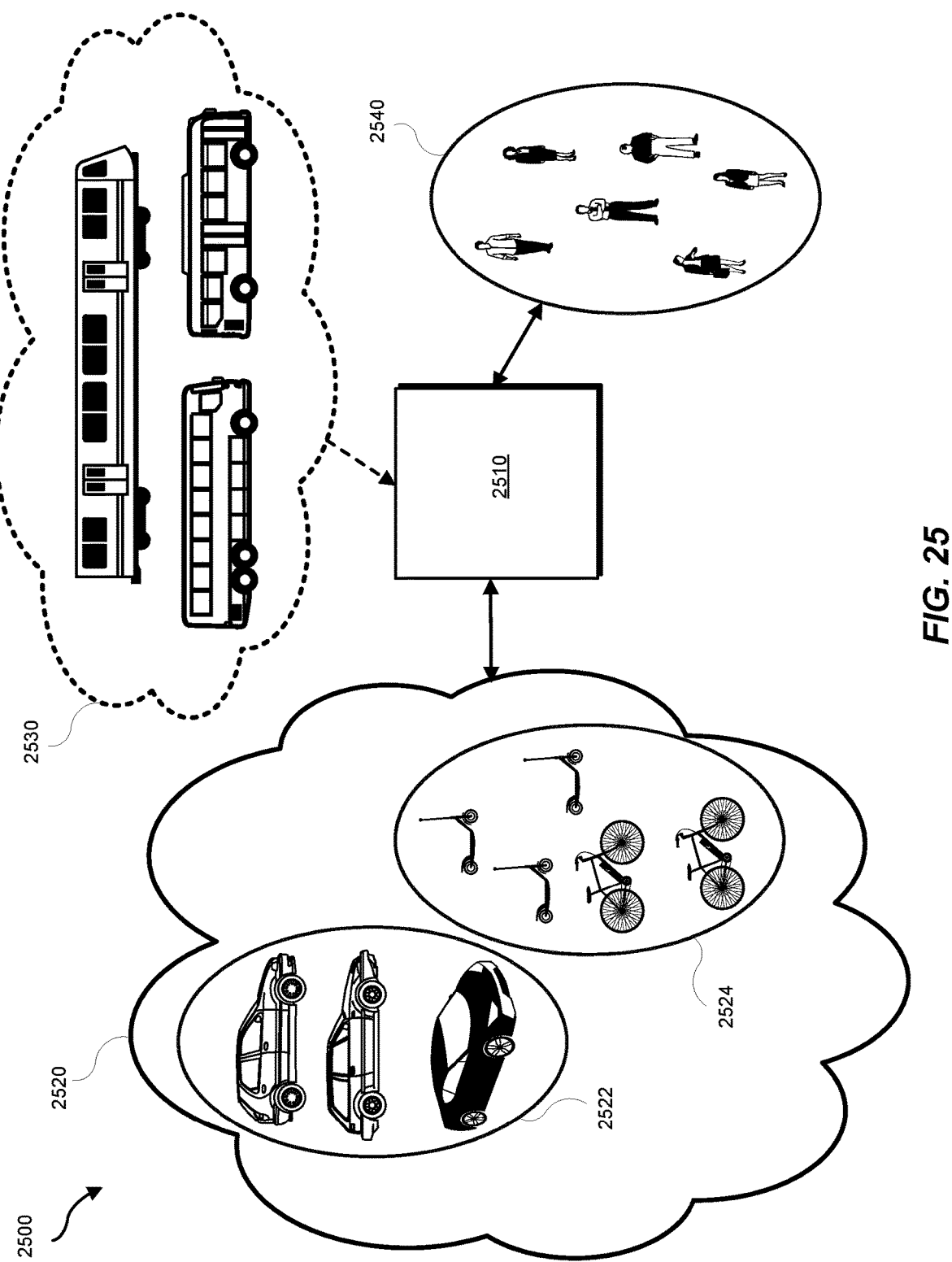
FIG. 25 is an illustration of an example system for providing dynamic transportation with a dynamic transportation network that includes personal mobility vehicles.

FIG. 25 is an illustration of an example system 2500 for providing dynamic transportation with a dynamic transportation network that includes personal mobility vehicles. As shown in FIG. 25, vehicles 2520 may include lane-constrained vehicles 2522 (e.g., automobiles and/or cars) as well as personal mobility vehicles 2524 (e.g., electronic scooters (referred to also as scooters) and electronic bicycles (referred to also as bicycles)). For example, the personal mobility vehicles 2524 may also include any motorized device (e.g., electric, gas, propane, diesel, human-powered, etc.) that includes a computing device that may be mounted on the personal mobility vehicle. The computing device may be used for management and interaction with the dynamic transportation network. A lane-constrained vehicle may be operated by a driver and a transportation requestor may be a passenger in the lane-constrained vehicle. In some implementations, the driver may be a person. In some implementations, a lane-constrained vehicle may be an autonomous vehicle. The transportation requestor may operate a personal mobility vehicle.

The vehicles 2520 may operate as part of a dynamic transportation network managed by a dynamic transportation matching system 2510. Thus, the dynamic transportation matching system 2510 may be in communication with the vehicles 2520 (and/or provider devices associated with the vehicles 2520) to receive information relevant to making transportation matches (e.g., location information, availability information, etc.) as well as to provide matching instructions once transportation matches have been made.

In addition to the vehicles 2520, in some examples, the dynamic transportation matching system 2510 may also be in communication with vehicles 2530. In some examples, vehicles 2530 may not operate as a part of the dynamic transportation network. For example, the dynamic transportation matching system 2510 may not manage or direct the vehicles 2530. Instead, the vehicles 2530 may provide predictable and/or reliable transportation upon which the dynamic transportation matching system 2510 may rely when making matches. For example, the vehicles 2530 may include buses, subways, trains, and the like that may (i) run on fixed schedules known to the dynamic transportation matching system 2510 and/or (ii) make available information to the dynamic transportation matching system 2510 allowing the dynamic transportation matching system 2510 to predict departure and arrival times. While the dynamic transportation matching system 2510 may not manage or control the vehicles 2530, in some examples, the dynamic transportation matching system 2510 may interact with systems that may manage transportation provided by the vehicles 2530. For example, the dynamic transportation matching system 2510 may procure tickets to ride one or more of the vehicles 2530 on behalf of one or more of requestors 2540 and/or may notify one or more of the vehicles 2530 of the status of one or more of the requestors 2540. When the dynamic transportation matching system 2510 receives transportation requests from one or more of the requestors 2540, the dynamic transportation matching system 2510 may match the transportation request with one or more providers among the vehicles 2520 and/or the vehicles 2530 based on any of a variety of factors.

For example, the dynamic transportation matching system 2510 may match the transportation request based on the current and/or projected location of and/or the current and/or projected availability of each candidate provider. In some examples, the dynamic transportation matching system 2510 may match the transportation requestor to a first provider instead of a second provider in order to maintain availability of the second provider for another current or prospective requestor. In some examples, the dynamic transportation matching system 2510 may match the transportation requestor based on a suitability of a candidate provider for completing the transportation request. For example, the dynamic transportation matching system 2510 may determine that a long-distance trip is suited for a lane-constrained vehicle but may determine that a relatively short trip is suited for a personal mobility vehicle. In some examples, the dynamic transportation matching system 2510 may match a transportation requestor to multiple providers. For example, the dynamic transportation matching system 2510 may match a lane-constrained vehicle to one leg of a trip, a mass transit vehicle to another leg of the trip, and a personal mobility vehicle to a third leg of the trip.

Figure 26:
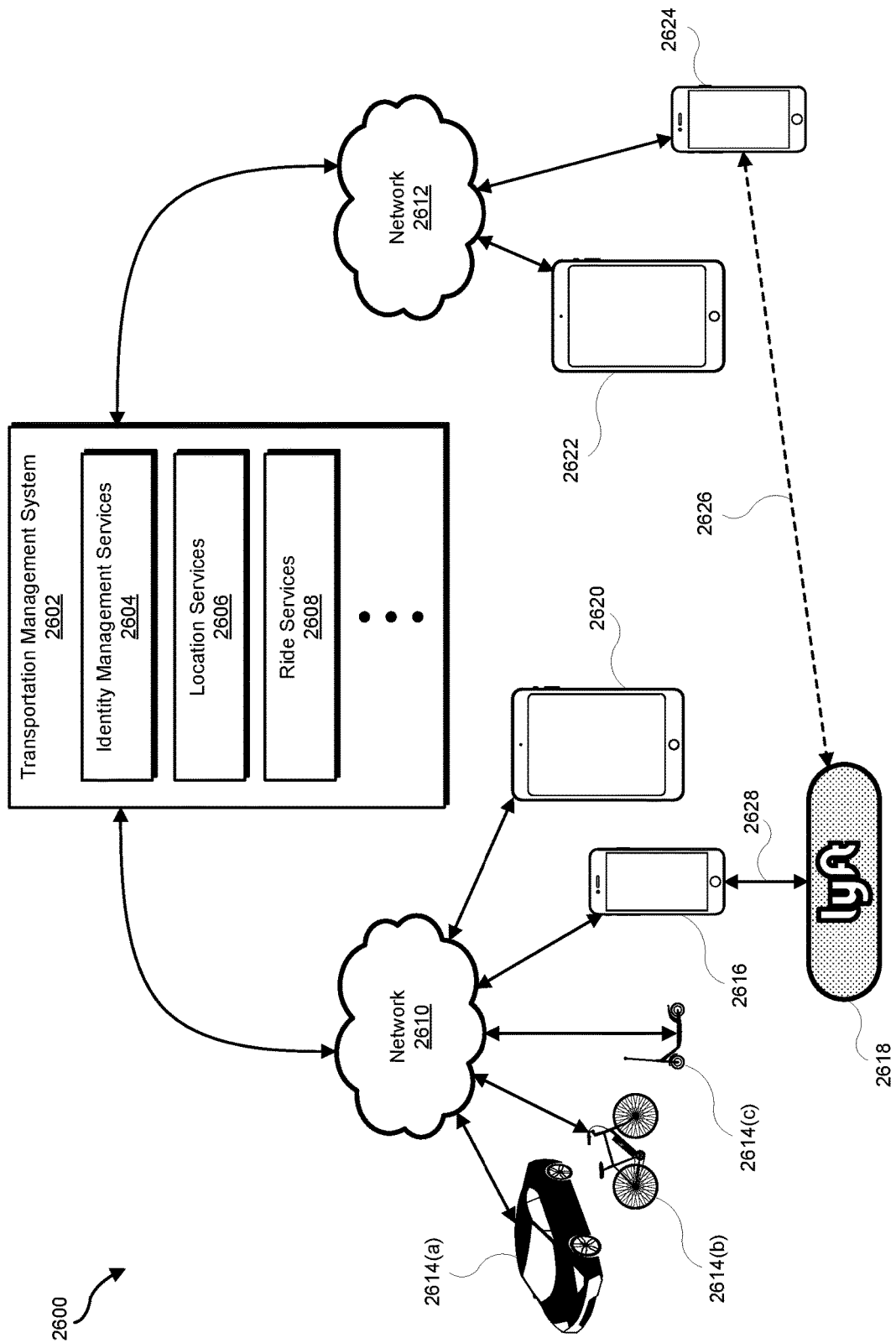
FIG. 26 shows a transportation management environment in accordance with various embodiments.

FIG. 26 shows a transportation management environment 2600 in accordance with various embodiments. As shown in FIG. 26, a transportation management system 2602 may run one or more services and/or software applications, including identity management services 2604, location services 2606, ride services 2608, and/or other services. Although FIG. 26 shows a certain number of services provided by transportation management system 2602, more or fewer services may be provided in various implementations. In addition, although FIG. 26 shows these services as being provided by transportation management system 2602, all or a portion of any of the services may be processed in a distributed fashion. For example, computations associated with a service task may be performed by a combination of transportation management system 2602 (including any number of servers, databases, etc.), one or more devices associated with a provider (e.g., devices integrated with managed vehicles 2614(a), 2614(b), and/or 2614(c), provider computing devices 2616 and tablets 2620, and transportation management vehicle devices 2618), and/or more or more devices associated with a ride requestor (e.g., the computing devices of the requestor 2624 and tablets 2622). In some embodiments, transportation management system 2602 may include one or more general purpose computers, server computers, clustered computing systems, cloud-based computing systems, and/or any other computing systems or arrangements of computing systems. Transportation management system 2602 may be configured to run any or all of the services and/or software components described herein. In some embodiments, the transportation management system 2602 may include an appropriate operating system and/or various server applications, such as web servers capable of handling hypertext transport protocol (HTTP) requests, file transfer protocol (FTP) servers, database servers, etc.

In some embodiments, identity management services 2604 may be configured to perform authorization services for requestors and providers and/or manage their interactions and/or data with transportation management system 2602. This may include, e.g., authenticating the identity of providers and determining that they are authorized to provide services through transportation management system 2602. Similarly, requestors' identities may be authenticated to determine whether they are authorized to receive the requested services through transportation management system 2602. Identity management services 2604 may also manage and/or control access to provider and/or requestor data maintained by transportation management system 2602, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information. Transportation management system 2602 may also manage and/or control access to provider and/or requestor data stored with and/or obtained from third-party systems. For example, a requester or provider may grant transportation management system 2602 access to a third-party email, calendar, or task management system (e.g., via the credentials of the user). As another example, a requestor or provider may grant, through a mobile device (e.g., 2616, 2620, 2622, or 2624), a transportation application associated with transportation management system 2602 access to data provided by other applications installed on the mobile device. In some examples, such data may be processed on the client and/or uploaded to transportation management system 2602 for processing.

In some embodiments, transportation management system 2602 may provide ride services 2608, which may include ride matching and/or management services to connect a requestor to a provider. For example, after identity management services module 2604 has authenticated the identity a ride requestor, ride services module 2608 may attempt to match the requestor with one or more ride providers. In some embodiments, ride services module 2608 may identify an appropriate provider using location data obtained from location services module 2606. Ride services module 2608 may use the location data to identify providers who are geographically close to the requestor (e.g., within a certain threshold distance or travel time) and/or who are otherwise a good match with the requestor. Ride services module 2608 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services module 2608 may use rule-based algorithms and/or machine-learning models for matching requestors and providers.

Transportation management system 2602 may communicatively connect to various devices through networks 2610 and/or 2612. Networks 2610 and 2612 may include any combination of interconnected networks configured to send and/or receive data communications using various communication protocols and transmission technologies. In some embodiments, networks 2610 and/or 2612 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 2610 and/or 2612 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 802.11 family of standards, Bluetooth, Bluetooth Low Energy, Near Field Communication (NFC), Z-Wave, and ZigBee). In various embodiments, networks 2610 and/or 2612 may include any combination of networks described herein or any other type of network capable of facilitating communication across networks 2610 and/or 2612.

In some embodiments, transportation management vehicle device 2618 may include a provider communication device configured to communicate with users, such as drivers, passengers, pedestrians, and/or other users. In some embodiments, transportation management vehicle device 2618 may communicate directly with transportation management system 2602 or through another provider computing device, such as provider computing device 2616. In some embodiments, a requestor computing device (e.g., device 2624) may communicate via a connection 2626 directly with transportation management vehicle device 2618 via a communication channel and/or connection, such as a peer-to-peer connection, Bluetooth connection, NFC connection, ad hoc wireless network, and/or any other communication channel or connection. Although FIG. 26 shows particular devices communicating with transportation management system 2602 over networks 2610 and 2612, in various embodiments, transportation management system 2602 may expose an interface, such as an application programming interface (API) or service provider interface (SPI) to enable various third parties which may serve as an intermediary between end users and transportation management system 2602.

In some embodiments, devices within a vehicle may be interconnected. For example, any combination of the following may be communicatively connected: vehicle 2614(*a*), vehicle 2614(*b*), vehicle 2614(*c*), provider computing device 2616, provider tablet 2620, transportation management vehicle device 2618, requestor computing device 2624, requestor tablet 2622, and any other device (e.g., smart watch, smart tags, etc.). For example, transportation management vehicle device 2618 may be communicatively connected to provider computing device 2616 and/or requestor computing device 2624. Transportation management vehicle device 2618 may establish communicative connections, such as connections 2626 and 2628, to those devices via any suitable communication technology, including, e.g., WLAN technologies implementing the IEEE 802.11 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 2602 using applications executing on their respective computing devices (e.g., 2616, 2618, 2620, and/or a computing device integrated within vehicle 2614(*a*), vehicle 2614(*b*), and/or vehicle 2614(*c*)), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 2614(*a*), vehicle 2614(*b*), and/or vehicle 2614(c) may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with transportation management system 2602. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 27:
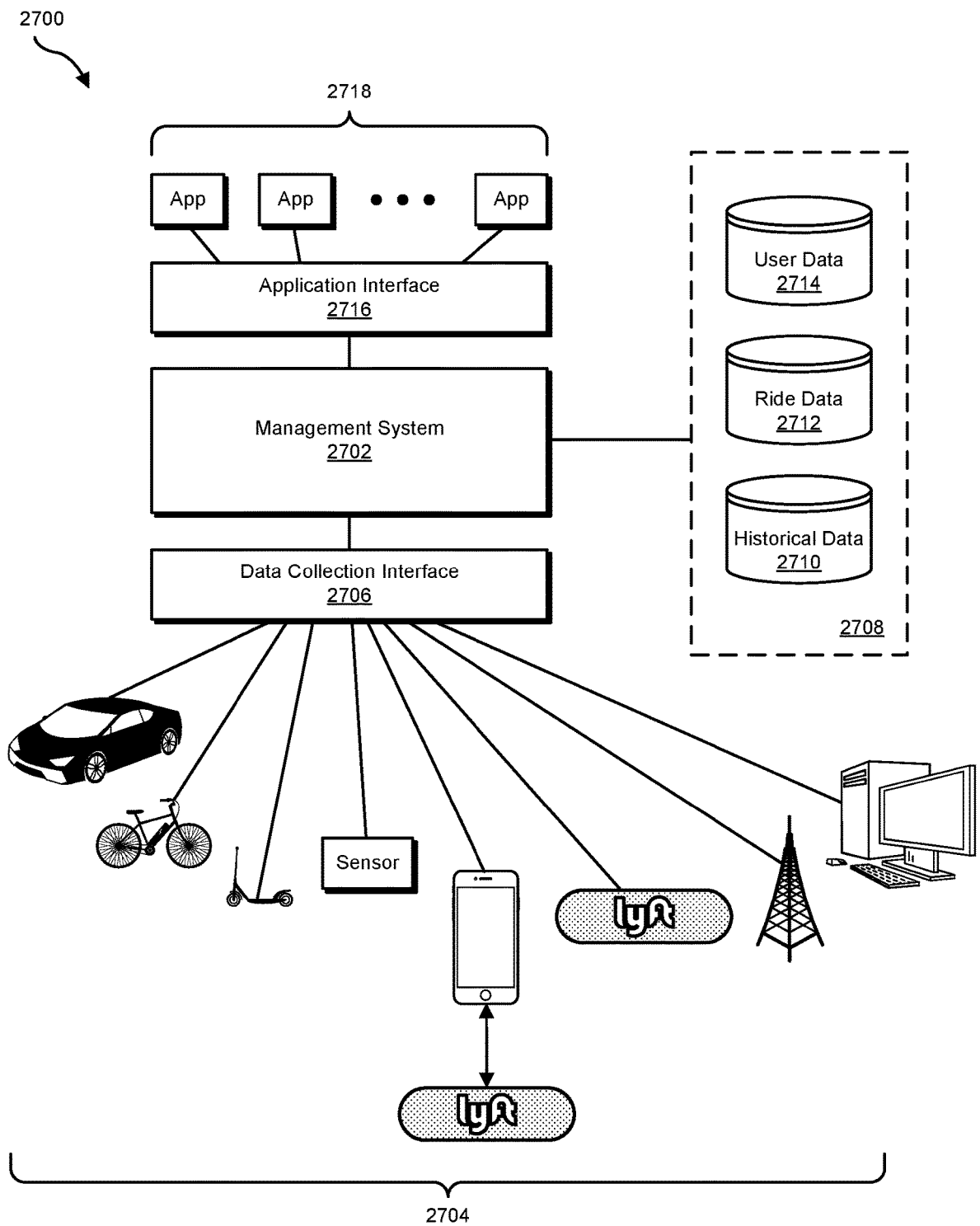
FIG. 27 shows a data collection and application management environment in accordance with various embodiments.

FIG. 27 shows a data collection and application management environment 2700 in accordance with various embodiments. As shown in FIG. 27, management system 2702 may be configured to collect data from various data collection devices 2704 through a data collection interface 2706. As discussed above, management system 2702 may include one or more computers and/or servers or any combination thereof. Data collection devices 2704 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 2706 can include, e.g., an extensible device framework configured to support interfaces for each data collection device. In various embodiments, data collection interface 2706 may be extended to support new data collection devices as they are released and/or to update existing interfaces to support changes to existing data collection devices. In various embodiments, data collection devices may communicate with data collection interface 2706 over one or more networks. The networks may include any network or communication protocol as would be recognized by one of ordinary skill in the art, including those networks discussed above.

As shown in FIG. 27, data received from data collection devices 2704 can be stored in data store 2708. Data store 2708 may include one or more data stores, such as databases, object storage systems and services, cloud-based storage services, and other data stores. For example, various data stores may be implemented on a non-transitory storage medium accessible to management system 2702, such as historical data store 2710, ride data store 2712, and user data store 2714. Data stores 2708 can be local to management system 2702, or remote and accessible over a network, such as those networks discussed above or a storage-area network or other networked storage system. In various embodiments, historical data 2710 may include historical traffic data, weather data, request data, road condition data, or any other data for a given region or regions received from various data collection devices. Ride data 2712 may include route data, request data, timing data, and other ride related data, in aggregate and/or by requestor or provider. User data 2714 may include user account data, preferences, location history, and other user-specific data. Although certain data stores are shown by way of example, any data collected and/or stored according to the various embodiments described herein may be stored in data stores 2708.

As shown in FIG. 27, an application interface 2716 can be provided by management system 2702 to enable various apps 2718 to access data and/or services available through management system 2702. Apps 2718 may run on various user devices (including provider and requestor computing devices, such as those discussed above) and/or may include cloud-based or other distributed apps configured to run across various devices (e.g., computers, servers, or combinations thereof). Apps 2718 may include, e.g., aggregation and/or reporting apps which may utilize data 2708 to provide various services (e.g., third-party ride request and management apps). In various embodiments, application interface 2716 can include an API and/or SPI enabling third party development of apps 2718. In some embodiments, application interface 2716 may include a web interface, enabling web-based access to data 2708 and/or services provided by management system 2702. In various embodiments, apps 2718 may run on devices configured to communicate with application interface 2716 over one or more networks. The networks may include any network or communication protocol as would be recognized by one of ordinary skill in the art, including those networks discussed above, in accordance with an embodiment of the present disclosure.

While various embodiments of the present disclosure are described in terms of a ridesharing service in which the ride providers are human drivers operating their own vehicles, in other embodiments, the techniques described herein may also be used in environments in which ride requests are fulfilled using autonomous vehicles. For example, a transportation management system of a ridesharing service may facilitate the fulfillment of ride requests using both human drivers and autonomous vehicles.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system, comprising:
   a directional device associated with a personal mobility vehicle, wherein the directional device comprises a plurality of separate light-emitting devices that form a non-continuous geometric shape, each of the plurality of separate light-emitting devices being independently controllable, wherein a first subset of the plurality of separate light-emitting devices form an outer non-continuous perimeter, wherein a second subset of the plurality of separate light-emitting devices are located inside the outer non-continuous perimeter formed by the first subset of the plurality of separate light-emitting devices, and wherein the directional device is further configured to:
   access directional information for a waypoint along a route of travel for a rider associated with the personal mobility vehicle, wherein the directional information is received from a dynamic transportation matching system configured to manage a plurality of personal mobility vehicles, and wherein the dynamic transportation matching system is further configured to match the rider with the personal mobility vehicle;
   based on the directional information, determine a direction to the waypoint from a current location of the personal mobility vehicle; and
   control, based on the direction, the plurality of separate light-emitting devices, respectively, wherein the controlling causes one or more light-emitting devices in the first subset to constantly illuminate and one or more light-emitting devices in the second subset to animate as an illuminated pattern that indicates, the direction corresponding to the directional information for the rider to take.

2. The system of claim 1, wherein the illuminated pattern is based on illuminations of less than all of the plurality of separate light-emitting devices.

3. The system of claim 1, wherein the directional device is further configured to indicate, by using one or more of the plurality of separate light-emitting devices, a match between the personal mobility vehicle and a transportation requester.

4. The system of claim 1, further comprising the personal mobility vehicle, wherein: the personal mobility vehicle includes a handlebar assembly; and the directional device is coupled to the handlebar assembly.

5. The system of claim 1, wherein each of the first subset of the plurality of separate light-emitting devices is greater in size than each of the second subset of the plurality of separate light-emitting devices.

6. The system of claim 1, wherein the directional device is further configured to:
   based on the directional information, determine an instruction for navigating around an intersection associated with the route of travel, wherein the illuminated pattern further indicates the instruction for navigating around the intersection.

7. A computer-implemented method comprising:
   accessing, by a computing device, directional information for a waypoint along a route of travel for a rider associated with a personal mobility vehicle;
   determining, by the computing device and based on the directional information, a direction to the waypoint from a current location of the personal mobility vehicle;

and displaying, via a directional device associated with the personal mobility vehicle, an illuminated pattern that indicates the direction corresponding to the directional information for the rider to take, wherein:
- the directional device comprises a plurality of separate light-emitting devices that form a non-continuous geometric shape, each of the plurality of separate light-emitting devices being independently controllable, wherein a first subset of the plurality of separate light-emitting devices form an outer non-continuous perimeter, and wherein a second subset of the plurality of separate light-emitting devices are located inside the outer non-continuous perimeter formed by the first subset of the plurality of separate light-emitting devices; and
- the directional device is configured to control, based on the direction, the plurality of separate light-emitting devices, respectively, wherein the controlling causes one or more light-emitting devices in the first subset to constantly illuminate and one or more light-emitting devices in the second subset to animate as the illuminated pattern.

8. The computer-implemented method of claim 7, wherein the illuminated pattern comprises sequentially illuminating one or more of the plurality of separate light-emitting devices for indicating an upcoming change in direction along the route of travel.

9. The computer-implemented method of claim 7, wherein the illuminated pattern comprises illuminations of less than all of the plurality of separate light-emitting devices.

10. A non-transitory computer-readable medium comprising computer-readable instructions that, when executed by at least one processor of a computing device, cause the computing device to perform operations comprising:
- accessing directional information for a waypoint along a route of travel for a rider associated with a personal mobility vehicle;
- determining, based on the directional information, a direction to the waypoint from a current location of the personal mobility vehicle; and
- displaying, via a directional device associated with the personal mobility vehicle, an illuminated pattern that indicates the direction corresponding to the directional information for the rider to take, wherein:
  - the directional device comprises a plurality of separate light-emitting devices that form a non-continuous geometric shape, each of the plurality of separate light-emitting devices being independently controllable, wherein a first subset of the plurality of separate light-emitting devices form an outer non-continuous perimeter, and wherein a second subset of the plurality of separate light-emitting devices are located inside the outer non-continuous perimeter formed by the first subset of the plurality of separate light-emitting devices; and
  - the directional device is configured to control, based on the direction, the plurality of separate light-emitting devices, respectively, wherein the controlling causes one or more light-emitting devices in the first subset to constantly illuminate and one or more light-emitting devices in the second subset to animate as the illuminated pattern.

11. The non-transitory computer-readable medium of claim 10, wherein the illuminated pattern comprises a sequence of illuminations of one or more of the plurality of separate light-emitting devices for indicating a match between the personal mobility vehicle and a transportation requester.

12. The non-transitory computer-readable medium of claim 10, wherein the illumination pattern comprises blinking one or more of the plurality of separate light-emitting devices at an increasing rate for indicating the personal mobility vehicle is moving closer to the waypoint.

13. The non-transitory computer-readable medium of claim 10, the operations further comprise: accessing directional information for a next waypoint along the route of travel for the rider associated with the personal mobility vehicle; determining, based on the directional information for the next waypoint, a direction to the next waypoint from the waypoint; determining that the personal mobility vehicle has reached the waypoint; and displaying, via the directional device, an indication of the direction to the next waypoint based on the illuminated pattern.

* * * * *